(12) United States Patent
Neophytou et al.

(10) Patent No.: US 11,235,787 B2
(45) Date of Patent: *Feb. 1, 2022

(54) TUBE TRANSPORTATION SYSTEMS USING A GASEOUS MIXTURE OF AIR AND HYDROGEN

(71) Applicant: HYPERLOOP TRANSPORTATION TECHNOLOGIES, INC., Culver City, CA (US)

(72) Inventors: Alexandre Neophytou, Toulouse (FR); Michael Sarin, Phoenix, AZ (US); Alexandre Zisa, Colomiers (FR)

(73) Assignee: Hyperloop Transportation Technologies, Inc., Culver City, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 16/456,711

(22) Filed: Jun. 28, 2019

(65) Prior Publication Data
US 2020/0001899 A1 Jan. 2, 2020

Related U.S. Application Data

(63) Continuation-in-part of application No. 16/411,065, filed on May 13, 2019, which is a continuation of
(Continued)

(51) Int. Cl.
*B61B 13/10* (2006.01)
*B61C 15/04* (2006.01)
(Continued)

(52) U.S. Cl.
CPC ............ *B61C 15/045* (2013.01); *B61B 13/10* (2013.01); *B65G 51/04* (2013.01); *B65G 51/08* (2013.01)

(58) Field of Classification Search
CPC ....... B61C 15/045; B61C 11/06; G05D 11/02; G05D 1/0005; G05D 11/00; B61B 13/10;
(Continued)

(56) References Cited

U.S. PATENT DOCUMENTS 5,950,543 A * 9/1999 Oster ...................... B61B 13/10
104/130.05
8,006,625 B2 8/2011 Yang
(Continued)

FOREIGN PATENT DOCUMENTS

CN 106068418 A 11/2016
DE 2213210 10/1973
(Continued)

OTHER PUBLICATIONS

Miller, "Hydrogen tube vehicle for supersonic transport: 3. Atmospheric merit," International Journal of Hydrogen Energy, 37(2012), pp. 14598-14602.
(Continued)

*Primary Examiner* — Mark T Le
(74) *Attorney, Agent, or Firm* — IP Authority, LLC; Ramraj Soundararajan

(57) ABSTRACT

A tubular transportation system is disclosed for transporting one or more passengers or one or more cargos via a capsule along a predetermined route. The tubular transportation system has: (1) a plurality of substantially evacuated tubes arranged along the predetermined route, where each tube is maintained at a pressure that is below atmospheric pressure; and (2) means for maintaining within each tube in the plurality of substantially evacuated tubes, a gaseous composition comprising a mixture of a first percentage, x, of hydrogen and a second percentage, (100-x), of air, and
(Continued)

wherein the first percentage, x, of hydrogen is picked based on a predetermined power value and a leak rate associated with the tube.

30 Claims, 57 Drawing Sheets

Related U.S. Application Data application No. 16/022,696, filed on Jun. 29, 2018, now Pat. No. 10,286,927.

(51) Int. Cl.
  *B65G 51/04* (2006.01)
  *B65G 51/08* (2006.01)

(58) Field of Classification Search
  CPC ....... B61B 13/122; B61B 13/12; B65G 51/04; B65G 51/08; B65G 51/16; B60L 2200/26; Y02T 30/30
  See application file for complete search history.

(56) References Cited

U.S. PATENT DOCUMENTS

| | | |
|---|---|---|
| 8,534,197 B2 | 9/2013 | Miller |
| 2005/0125169 A1 | 6/2005 | Loose |
| 2005/0166785 A1 | 8/2005 | Schramek et al. |
| 2010/0192799 A1* | 8/2010 | Miller ................ B60L 13/04 104/138.1 |
| 2013/0125779 A1 | 5/2013 | De Matias Jimenez |
| 2016/0230350 A1 | 8/2016 | Bambrogan et al. |
| 2017/0276284 A1 | 9/2017 | Finodeyev |

FOREIGN PATENT DOCUMENTS

| | | |
|---|---|---|
| GB | 1332138 | 10/1973 |
| TW | 386593 | 4/2000 |
| WO | 03/104058 A1 | 12/2003 |
| WO | 2011074739 A1 | 6/2011 |
| WO | 2016108953 A1 | 7/2016 |
| WO | 2017/211674 A1 | 12/2017 |

OTHER PUBLICATIONS

Miller, "Hydrogen tube vehicle for supersonic transport: 1. Speed and energy," International Journal of Hydrogen Energy, 35(2010), pp. 5745-5753.
Miller et al., "Hydrogen tube vehicle for supersonic transport: 7. Experimental vehicle," International Journal of Hydrogen Energy, 40(2015), pp. 4269-4279.
Chin et al., "Open-Source Conceptual Sizing Models for the Hyperloop Passenger Pod," 56th AIAA/ASCE/AHS/ASC Structures, Structural Dynamics, and Materials Conference, Jan. 5-9, 2015, Kissimmee, Florida, 20 pgs.
Decker et al., "Conceptual Feasibility Study of the Hyperloop Vehicle for Next-Generation Transport," AIAA SciTech 2017, Jan. 9-13, 2017, Grapevine, Texas, 22 pgs.

* cited by examiner

Drag Coefficient vs. Mach Number

| Gas | Formula | Molecular weight | density -ρ- | |
|---|---|---|---|---|
| | | | (kg/m³) | (lb/ft³) |
| Acetylene (ethyne) | $C_2H_2$ | 26 | 1.092[1] 1.170[2] | 0.0682[1] 0.0729[2] |
| Air | | 29 | 1.205[1] 1.293[2] | 0.0752[1] 0.0806[2] |
| Ammonia | $NH_3$ | 17.031 | 0.717[1] 0.769[2] | 0.0448[1] 0.0480[2] |
| Argon | Ar | 39.948 | 1.661[1] 1.7837[2] | 0.1037[1] 0.111353[2] |
| Benzene | $C_6H_6$ | 78.11 | 3.486 | 0.20643 |
| Blast furnace gas | | | 1.250[2] | 0.0780[2] |
| Butane | $C_4H_{10}$ | 58.1 | 2.489[1] 2.5[2] | 0.1554[1] 0.156[2] |
| Butylene (Butene) | $C_4H_6$ | 56.11 | 2.504 | 0.148[2] |
| Carbon dioxide | $CO_2$ | 44.01 | 1.842[1] 1.977[2] | 0.1150[1] 0.1234[2] |
| Carbon disulphide | | 76.13 | | |
| Carbon monoxide | CO | 28.01 | 1.165[1] 1.250[2] | 0.0727[1] 0.0780[2] |
| Carbureted Water Gas | | | | 0.048 |
| Chlorine | $Cl_2$ | 70.906 | 2.994[1] | 0.1869[1] |
| Coal gas | | | 0.58[2] | |
| Coke Oven Gas | | | | 0.034[2] |
| Combustion products | | | 1.11[2] | 0.069[2] |
| Cyclohexane | | 84.16 | | |
| Digester Gas (Sewage or Biogas) | | | | 0.062 |
| Ethane | $C_2H_6$ | 30.07 | 1.264[1] | 0.0789[1] |
| Ethyl Alcohol | | 46.07 | | |
| Ethyl Chloride | | 64.52 | | |
| Ethylene | $C_2H_4$ | 28.03 | 1.260[2] | 0.0786[2] |
| Helium | HE | 4.02 | 0.1664[1] 0.1785[2] | 0.01039[1] 0.011143[2] |
| N-Heptane | | 100.20 | | |
| Hexane | | 86.17 | | |
| Hydrogen | $H_2$ | 2.016 | 0.0899[2] | 0.0056[2] |
| Hydrochloric Acid | | 36.47 | 1.63[2] | |
| Hydrochloric Chloride | HCl | 36.5 | 1.528[1] | 0.0954[1] |
| Hydrogen Sulfide | $H_2S$ | 34.076 | 1.434[1] | 0.0895[1] |
| Krypton | | | 3.74[2] | |
| Methane | $CH_4$ | 16.043 | 0.668[1] 0.717[2] | 0.0417[1] 0.0447[2] |

| Gas | Speed of Sound | |
|---|---|---|
| | (m/s) | ft/s |
| Acetaldehyde | 278 | 907 |
| Acetylene | 329 | 1073 |
| Air | 331 | 1086 |
| Air, 20°C | 343 | 1125 |
| Ammonia (30°C) | 440 | 1436 |
| Argon | 307.85 | 1005 |
| Benzene (90°C) | 200 | 653 |
| Bromine (58°C) | 149 | 486 |
| Carbon dioxide (51°C) | 280 | 913 |
| Carbon disulfide (35°C) | 206 | 672 |
| Carbon Monoxide | 336 | 1096 |
| Carbon tetrachloride (22°C) | 133 | 434 |
| Chloroform (22°C) | 154 | 503 |
| Cyclohexan (30°C) | 181 | 591 |
| Deuterium | 888 | 2898 |
| Diethyl ether (40°C) | 187 | 610 |
| Ethane (31°C) | 316 | 1031 |
| Ethylene (20°C) | 327 | 1067 |
| Fluorine (102°C) | 332 | 1083 |
| Trichlorofluoromethane R11 (18°C) | 143 | 467 |
| 1,1,2-trichloro-1,2,2-trifluorethane R113 (53°C) | 124 | 405 |
| Dichlorodifluoromethane R12 (17°C) | 140 | 457 |
| Chlorodifluoromethane R22 (17°C) | 179 | 584 |
| Helium | 972 | 3171 |
| Hydrogen | 1290 | 4209 |
| Hydrogen bromide | 200 | 653 |
| Hydrogen chloride | 296 | 966 |
| Hydrogen iodide | 157 | 512 |
| Hydrogen sulfide (24°C) | 309 | 1008 |
| Krypton (30°C) | 224 | 731 |
| Methane (41°C) | 466 | 1521 |
| Neon (30°C) | 461 | 1504 |
| Nitric oxide (16°C) | 334 | 1090 |
| Nitrogen (29°C) | 354.4 | 1156 |
| Nitrous oxide (25°C) | 268 | 875 |
| Oxygen | 316 | 1031 |
| Oxygen (30°C) | 332.2 | 1083 |
| Sulfur hexafluoride (11°C) | 133 | 434 |
| Water vapor (100°C) | 477.5 | 1558 |
| Water vapour 6 MPa (350°C) | 571 | 1863 |

| Gas | Chemical Symbol | $\bar{l} \cdot p$ [m hPa] |
|---|---|---|
| Hydrogen | $H_2$ | $11.5 \cdot 10^{-5}$ |
| Nitrogen | $N_2$ | $5.9 \cdot 10^{-5}$ |
| Oxygen | $O_2$ | $6.5 \cdot 10^{-5}$ |
| Helium | He | $17.5 \cdot 10^{-5}$ |
| Neon | Ne | $12.7 \cdot 10^{-5}$ |
| Argon | Ar | $6.4 \cdot 10^{-5}$ |
| Air |  | $6.7 \cdot 10^{-5}$ |
| Krypton | Kr | $4.9 \cdot 10^{-5}$ |
| Xenon | Xe | $3.6 \cdot 10^{-5}$ |
| Mercury | Hg | $3.1 \cdot 10^{-5}$ |
| Water vapor | $H_2O$ | $6.8 \cdot 10^{-5}$ |
| Carbon monoxide | CO | $6.0 \cdot 10^{-5}$ |
| Carbon dioxide | $CO_2$ | $4.0 \cdot 10^{-5}$ |
| Hydrogen chloride | HCl | $3.3 \cdot 10^{-5}$ |
| Ammonia | $NH_3$ | $3.2 \cdot 10^{-5}$ |
| Chlorine | $Cl_2$ | $2.1 \cdot 10^{-5}$ |

FIG. 9
(PRIOR ART)

| Height_tunnel | m | 4.000 |
|---|---|---|
| Height_pod | m | 2.048 |
| Ratio_Abypass_Apod | | 0.488 |
| Operating Pressure | Pa | 100 |
| density_in_Air | kg/m3 | 0.00116 |
| density_in_Helium | kg/m3 | 0.00016 |

FIG. 11

Bypass Ratio Comparison
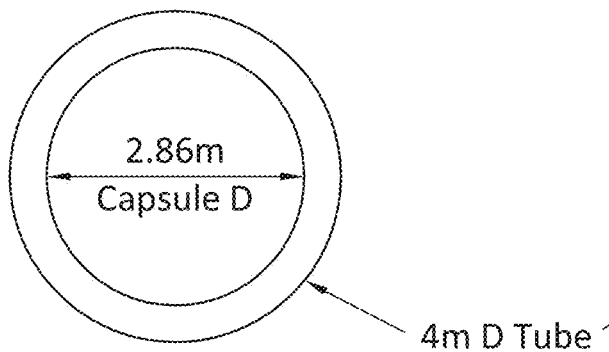
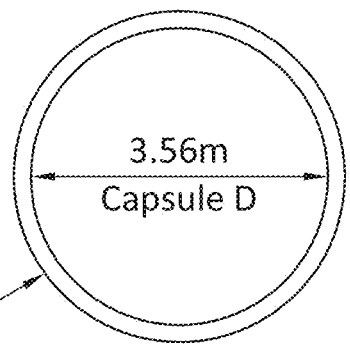
.489 Bypass — 2.86m Capsule D, 4m D Tube
$$\frac{(4^2)-(2.86^2)}{4^2} = 0.489$$
.208 Bypass — 3.56m Capsule D
$$\frac{(4^2)-(3.56^2)}{4^2} = 0.208$$
FIG. 21

| % He/Air Target | Ratio of He/air | Air Leak (std l/m) | He added (slm) | Added volume (slm) |
|---|---|---|---|---|
| 1.00% | 1/99 | 50 | 0.50 | 50.50 |
| 10.00% | 10/90 | 50 | 5.56 | 55.56 |
| 20.00% | 20/80 | 50 | 12.50 | 62.50 |
| 30.00% | 30/70 | 50 | 21.43 | 71.43 |
| 40.00% | 40/60 | 50 | 33.33 | 83.33 |
| 50.00% | 50/50 | 50 | 50.00 | 100.00 |
| 60.00% | 60/40 | 50 | 75.00 | 125.00 |
| 70.00% | 70/30 | 50 | 116.67 | 166.67 |
| 80.00% | 80/20 | 50 | 200.00 | 250.00 |
| 90.00% | 90/10 | 50 | 450.00 | 500.00 |
| 95.00% | 95/5 | 50 | 950.00 | 1000.00 |
| 97.00% | 97/3 | 50 | 1616.67 | 1666.67 |
| 98.00% | 98/2 | 50 | 2450.00 | 2500.00 |
| 99.00% | 99/1 | 50 | 4950.00 | 5000.00 |
| 99.50% | 99.5/0.5 | 50 | 9950.00 | 10000.00 |
| 99.90% | 99.9/0.1 | 50 | 49950.00 | 50000.00 |
| 100% | 100/0 | 50 | infinite | infinite |

FIG. 23

| % He/Air Target | Ratio of He/air | Air Leak (std l/m) | He added (slm) | Added volume (slm) |
|---|---|---|---|---|
| 1.00% | 1/99 | 5 | 0.05 | 5.05 |
| 10.00% | 10/90 | 5 | 0.56 | 5.56 |
| 20.00% | 20/80 | 5 | 1.25 | 6.25 |
| 30.00% | 30/70 | 5 | 2.14 | 7.14 |
| 40.00% | 40/60 | 5 | 3.33 | 8.33 |
| 50.00% | 50/50 | 5 | 5.00 | 10.00 |
| 60.00% | 60/40 | 5 | 7.50 | 12.50 |
| 70.00% | 70/30 | 5 | 11.67 | 16.67 |
| 80.00% | 80/20 | 5 | 20.00 | 25.00 |
| 90.00% | 90/10 | 5 | 45.00 | 50.00 |
| 95.00% | 95/5 | 5 | 95.00 | 100.00 |
| 97.00% | 97/3 | 5 | 161.67 | 166.67 |
| 98.00% | 98/2 | 5 | 245.00 | 250.00 |
| 99.00% | 99/1 | 5 | 495.00 | 500.00 |
| 99.50% | 99.5/0.5 | 5 | 995.00 | 1000.00 |
| 99.90% | 99.9/0.1 | 5 | 4995.00 | 5000.00 |
| 100% | 100/0 | 5 | infinite | infinite |

FIG. 24

| | | |
|---|---|---|
| Height_tunnel (2D) | m | 4 |
| Height_pod (2D) | m | 2.048 |
| Ratio_Abypass_Apod | | 0.488 |
| Operating Pressure | Pa | 100 |
| density_in_Air (20C@100Pa) | kg/m3 | 0.001189 |
| density_in_hydrogen (20C@100Pa) | kg/m3 | 0.0000827 |

FIG. 34

| % H2/Air Target | Ratio of H2/air | Air Leak (std l/m) | H2 added (slm) | Added volume (slm) |
|---|---|---|---|---|
| 1.00% | 1/99 | 50 | 0.50 | 50.50 |
| 10.00% | 10/90 | 50 | 5.56 | 55.56 |
| 20.00% | 20/80 | 50 | 12.50 | 62.50 |
| 30.00% | 30/70 | 50 | 21.43 | 71.43 |
| 40.00% | 40/60 | 50 | 33.33 | 83.33 |
| 50.00% | 50/50 | 50 | 50.00 | 100.00 |
| 60.00% | 60/40 | 50 | 75.00 | 125.00 |
| 70.00% | 70/30 | 50 | 116.67 | 166.67 |
| 80.00% | 80/20 | 50 | 200.00 | 250.00 |
| 90.00% | 90/10 | 50 | 450.00 | 500.00 |
| 95.00% | 95/5 | 50 | 950.00 | 1000.00 |
| 97.00% | 97/3 | 50 | 1616.67 | 1666.67 |
| 98.00% | 98/2 | 50 | 2450.00 | 2500.00 |
| 99.00% | 99/1 | 50 | 4950.00 | 5000.00 |
| 99.50% | 99.5/0.5 | 50 | 9950.00 | 10000.00 |
| 99.90% | 99.9/0.1 | 50 | 49950.00 | 50000.00 |
| 100% | 100/0 | 50 | Infinite | Infinite |

FIG. 45

| % H2/Air Target | Ratio of H2/air | Air Leak (std l/m) | H2 added (slm) | Added volume (slm) |
|---|---|---|---|---|
| 1.00% | 1/99 | 5 | 0.05 | 5.05 |
| 10.00% | 10/90 | 5 | 0.56 | 5.56 |
| 20.00% | 20/80 | 5 | 1.25 | 6.25 |
| 30.00% | 30/70 | 5 | 2.14 | 7.14 |
| 40.00% | 40/60 | 5 | 3.33 | 8.33 |
| 50.00% | 50/50 | 5 | 5.00 | 10.00 |
| 60.00% | 60/40 | 5 | 7.50 | 12.50 |
| 70.00% | 70/30 | 5 | 11.67 | 16.67 |
| 80.00% | 80/20 | 5 | 20.00 | 25.00 |
| 90.00% | 90/10 | 5 | 45.00 | 50.00 |
| 95.00% | 95/5 | 5 | 95.00 | 100.00 |
| 97.00% | 97/3 | 5 | 161.67 | 166.67 |
| 98.00% | 98/2 | 5 | 245.00 | 250.00 |
| 99.00% | 99/1 | 5 | 495.00 | 500.00 |
| 99.50% | 99.5/0.5 | 5 | 995.00 | 1000.00 |
| 99.90% | 99.9/0.1 | 5 | 4995.00 | 5000.00 |
| 100% | 100/0 | 5 | Infinite | Infinite |

FIG. 46

Air Leak = 5 slm/km

TUBE TRANSPORTATION SYSTEMS USING A GASEOUS MIXTURE OF AIR AND HYDROGEN

RELATED APPLICATIONS

This application is a Continuation-in-Part of U.S. Ser. No. 16/411,065 filed May 13, 2019, which is a Continuation of U.S. Ser. No. 16/022,696 filed Jun. 29, 2018, now U.S. Pat. No. 10,286,927.

BACKGROUND OF THE INVENTION

Field of Invention

The present invention relates generally to the field of tube transportation. More specifically, the present invention is related to tube transportation systems using a gaseous mixture of air and hydrogen.

Discussion of Prior Art

The recent effort to develop a high-speed and efficient new mode of transportation, which Elon Musk termed the Hyperloop, began in 2013 with the release of his technical white paper. A team of Space-X and Tesla scientists wrote this paper to define technical advantages and engineering requirements to build such a device.

Essentially, the Hyperloop is a system where a capsule is levitated in a tube at low-pressure (and in turn low air density). Levitation reduces substantially ground friction. Low air density reduces substantially air drag.

The white paper proposed an air-ski supported capsule riding inside of an evacuated tube, 100 Pascal (Pa) absolute, and propelled by linear induction motors. An air compressor was placed at the nose of the capsule to provide air to the ski pads and to improve the speed capability of the capsule. The inclusion of a large compressor improved the capsule speed but required a large battery array to power it during the Hyperloop journey. It additionally took valuable space from the passenger compartment and added significant complexity. Several groups took immediate notice of the white paper and began development of the system proposed in the white paper.

Some design teams involved in such development moved away from the air-ski concept as it required a ski-to-tube distance of only 0.020"-0.040", which would make it difficult to maintain a smooth ride while accommodating tube and installation tolerances. One replacement of the air-ski was a Maglev (Magnetic Levitation) based system. Such a Maglev system would remove the need of a compressor, thereby reducing capsule size/weight, and would provide developers with the added advantage of increased space and decreased vibration.

However, removing the compressor in the design made way for another major problem in such tube-based transportation systems. In the original design as outlined in Musk's white paper, the compressor serves as an important component for improving the speed of the capsule, where such improvement is not due to the thrust provided to push the capsule down the tube but is due to the reduction in the effective frontal area of the capsule. In Musk's design, the compressor provided a second path to direct air from in front of the capsule to the rear of capsule, adding to the annular region between the capsule and tube. The ratio of this annulus to total tube area, known as the bypass ratio, is a key predictor of choking. Once the capsule reaches a speed where choking occurs in the bypass area, the capsule would act as a huge plunger, creating a type of syringe effect. At that key point, known as the Kantrowitz limit (or K limit), immense drag due to the long column of air in front of the capsule being pushed requires significantly more energy and power to overcome. Overcoming the choking, or K limit, and achieving a significant reduction in the K limit effects is a key technological concern.

A discussion is now presented with regards to the issues associated with drag and the choked flow phenomenon. FIG. 1 depicts a schematic of a vehicle (also referred to as pod or capsule) within a tube (Source: see paper to Chin et al. titled "Open-Source Conceptual Sizing Models for the Hyperloop Passenger Pod", dated 5-9 Jan. 2015).

Drag is mainly the contribution of two components: pressure drag and friction drag. Pressure drag is the pressure exerted as the vehicle moves forward and pushes the air. Friction drag is the viscous force exerted by the air that flows around the vehicle surface. Drag is given by the equation below:

$$D = C_D \tfrac{1}{2} \rho_{tube} V_{pod}^2 S_{pod} \qquad (\text{EQN. 1})$$

where:
$\rho_{tube}$ Pressure in the tube, absolute;
$V_{pod}^2$ = Velocity of the pod squared;
$S_{pod}$ = Surface area of pod; and
where $C_D$ is the drag coefficient that includes pressure drag and drag due to friction effects.

In EQN. 1, the drag is proportional to density. Consequently, reducing density has a substantial effect on drag and in turn on propulsion power. This can be obtained with a low-pressure tube. In EQN. 1, the drag is proportional to the square of the velocity. Thus, drag rises fast with increasing velocity.

Reducing density around vehicle is a historical idea that was first applied in the field of aeronautics. Aircraft fly at high altitude where they experience low density and therefore low drag. In a low-pressure tube, the environment is controlled to reduce the density. However, reducing the pressure is just one of the different options to reduce density (other options are increasing temperature and using light gases). Hence, in a low-pressure tube, it is expected that drag will be substantially reduced due to the much lower density, even at high velocities (this is true until a certain limit velocity).

An undesired flow phenomenon occurs when the vehicle reaches high subsonic speed. The air that flows around the vehicle in the bypass gap in FIG. 1 gets choked. This results in a large increase of pressure in front of the vehicle. In turn, drag increases and the required propulsion power becomes greater. A description of the physical phenomenon of choked flow is now provided where the key physics relates to the speed of sound.

As the vehicle moves forward, it pushes the air in front which increases upstream pressure. Since the back of the vehicle is still at low-pressure, a pressure difference is created. Pressure waves travelling from the vehicle's back to the vehicle's front communicates the downstream pressure state forward, and it informs of the pressure difference, like a spring. In reaction, the mass of air in front of the vehicle escapes through the bypass gap. As long as enough air escapes to the back, an equilibrium is created, and the pressures remain relatively low. Hence, the amount of air flow must compensate for the pressure difference between the front and the back. Then, an equilibrium exists. This equilibrium mechanism is illustrated in FIG. 2.

However, when the vehicle reaches high speed, the air flow gets accelerated in the bypass gap and can reach the speed of sound. Hence, the air flow in the bypass becomes as fast as pressure waves in the opposite direction. As a result, pressure waves cannot travel back against the air flow and never reach upstream location. Consequently, the information of the pressure state downstream can no longer reach through the sonic flow point and communicate the pressure difference to the front of the capsule. The upstream air is not well informed of the pressure difference and the right amount of air no longer flows toward the low-pressure region behind the capsule. This choking scenario is depicted in FIG. 3. A column of air builds up in front of the vehicle and upstream pressure rises. This choking flow is referred to as the Kantrowitz limit. The result is that upstream pressure increases substantially due the vehicle motion which acts as a large plunger and the drag increases accordingly. Consequently, the power requirement to maintain the vehicle speed becomes very high.

FIG. 4 depicts a graph of drag versus vehicle speed which identifies the critical vehicle speed that demarcates the pressure equilibrium scenario depicted in FIG. 2 and the choked flow scenario depicted in FIG. 3.

One key physics is therefore to let pressure waves reach the front of the vehicle, where the pressure waves must be faster than the air flow in the bypass gap. It should be noted that this phenomenon occurs if the bypass gap is small, because the air flow gets accelerated even more in small sections. Unfortunately, for engineering application, the vehicle size is to be maximized to accommodate passengers or cargo. In other words, the bypass gap size should be minimized. The question, therefore, is: how fast can a vehicle go with a small bypass size?

Formally, a maximum vehicle speed can be defined at which choking flow occurs. This maximum speed has been studied in the previously noted paper to Chin et al. (2015). FIG. 5, extracted from the Chin et al. (2015) article, depicts a graph of the bypass area ratio (Bypass/Tube) versus the bypass air flow Mach number. FIG. 5 demonstrates that, for a reasonable vehicle size (bypass area less than 50% of tube area), the maximum vehicle speed is about Mach 0.25. This corresponds to 300 km/h. This is clearly unacceptable for such a novel transportation system.

There are several ways to get around this issue. One solution noted in Elon Musk's White Paper is to use an axial compressor at the front of the capsule. Such a design is depicted in the previously noted Chin et al. paper, which is reproduced in FIG. 6(A). In the scenario depicted in FIG. 6(A), the compressor forces a portion of air into an internal path inside the vehicle instead of going only in the bypass gap. The effect is to increase dramatically the net bypass area for the air flow and thereby avoid acceleration and choking phenomenon at low vehicle speed. FIG. 6(B) depicts a drag curve (as noted in the above noted Chin et al. paper) which shows that the maximum vehicle speed is Ma=0.6 before choking phenomenon. This corresponds to 600 km/h. While the increase in speed is interesting, it is still far from higher speeds (such as a target speed of 1,000 km/h, for example).

The drawback of the approach depicted in FIGS. 6(A)-(B) is that the installation of a compressor introduces significant cost, complexity in the design of the vehicle, and safety issues. Regarding safety, Uncontained Engine Failure (UERF) where the blade of the compressor can break and damage the vehicle itself, the tube, and other vehicles, and induce high constraints in the development of such a transport system.

Another solution is to decrease the tube environment to extremely low-pressure, as mentioned in the previously mentioned Elon Musk's White Paper. It could be expected that at low enough tube pressures, the spacing of the gas molecules would become so distant that they would flow around the capsule without choking. In the event there would still be a choking effect, the drag increase, and power to push the air column at this very low air density would be insignificant. At extremely low-pressure, below 0.1 Pa-1 Pa, the air can no longer be considered as a physical continuum, as in classical fluid dynamics, but must be treated with molecular flow theory. It is expected that in this flow regime, the choking phenomenon does not occur or has less impact. And even if it exists, pressure would be so low that drag could be insignificant.

The drawback with this second solution is that the power requirements, cost and engineering design to maintain extremely low-pressure in such a large volume can be tremendous. The pump power requirement to maintain vacuum rises in an exponential manner as the target tube pressure goes below 100 Pa. It becomes tremendous when going below 1 Pa. However, the limit between classical fluid dynamics and molecular flow, has not been clearly demonstrated in such transport systems. Thus, the effort turned towards modeling the flow dynamics versus pressure to find the key pressure below which high speeds and low drag could be achieved.

Computational fluid dynamics (CFD) was used to explore this problem. One difficulty in CFD modeling is that the low-pressure ranges that needed to be modeled were beyond normal continuum flow mechanics, and thus standard computer models struggled to give reliable outputs. Worse yet, the level of vacuum (tube pressure) that was required would necessitate very large vacuum pump systems and consume much energy. Thus, a tradeoff was made to explore pressure ranges of 1-10 Pascals absolute, which were thought to be low enough to provide a Kantrowitz limit work around, but also high enough that vacuum pump systems were economical.

Several difficulties with the CFD models became quickly apparent: (1) this pressure range is in a transition flow region between continuum and molecular flow; since different modeling tools must be used in each region it became problematic to get reliable data through that pressure region, (2) many assumptions needed to be made which had yet to be verified; thus, test apparatus would need to be developed to validate the computer models, and (3) there are currently no computers available in the commercial arena with the ultra-high processing capability required to handle the complexity of a moving capsule inside of a tube. This leads to another untested assumption—whether the validity of modeling a fixed capsule with moving air around it, instead of a moving capsule through still air inside of the tube is accurate. Testing the validity of this assumption would again require a test apparatus.

The effort to find the theoretical and economical pressure that allowed high speeds and low drag became a focus of various development groups. It was clear that at some pressure the choking phenomena would be insignificant. This is demonstrated by craft flying in near earth orbit pressures, near and beyond the transition region to molecular flow, that experience nearly zero drag. Below this key pressure point and with a particular tube/capsule geometry there would be the ability to have high velocity and low drag.

Prior art approaches have suggested using hydrogen to accomplish this speed improvement. In such prior art systems, a tube operating at atmospheric pressure (or slightly above) and has at least the following disadvantages:

1) The standardized volume of hydrogen (or other small diameter gas) required to fill a 4-meter diameter tube, perhaps 100 to 500 km long, at atmospheric pressure is significantly beyond anything currently built. However, this preferred art operates at $1/1,000$ to $1/10,000$ of an atmosphere and thus the gas mass required is also $1/1000$ to $1/10,000$ less per kilometer, 2) No method is described suggesting how to replace the air inside the tube with hydrogen, and 3) Although hydrogen is not flammable above 75% concentration, a distinct safety issue occurs in the event of a tube breach which will introduce air into the tube and has the potential to create flammable or explosive ratios. A tube breach event must be planned for and can be expected at some point due to earthquake, damage due to operations or even sabotage.

Another prior art, German patent publication, DE 2054063 A1, discloses a high-speed passenger and container mass transit system using helium. However, the German patent publication, much like the current tube-based transportation systems, fails to utilize a mixture of air and helium, where the composition of each gas in the mixture is dynamically determined to optimize drag. Furthermore, the German patent publication, much like the current tube-based transportation systems, fails to utilize a mixture of air and helium, where the composition of each gas is dynamically determined depending on the desired velocity of the capsule.

Whatever the precise merits, features, and advantages of the above cited references and above noted prior art systems, none of them achieves or fulfills the purposes of the present invention.

SUMMARY OF THE INVENTION

In one embodiment, the present invention provides a tubular transportation system for transporting one or more passengers or one or more cargos via a capsule along a predetermined route, the tubular transportation system comprising: a plurality of substantially evacuated tubes arranged along the predetermined route, each tube in the plurality of substantially evacuated tubes maintained at a pressure that is below atmospheric pressure; means for maintaining within each tube in the plurality of substantially evacuated tubes, a gaseous composition comprising a mixture of a first percentage, x, of hydrogen and a second percentage, (100-x), of air, and wherein the first percentage, x, of hydrogen is picked based on a predetermined power value and a leak rate associated with each tube.

In another embodiment, the present invention provides a tubular transportation system for transporting one or more passengers or one or more cargos via a capsule along a predetermined route, the tubular transportation system comprising: a plurality of substantially evacuated tubes arranged along the predetermined route, each tube in the plurality of substantially evacuated tubes maintained at a pressure that is below atmospheric pressure; means for maintaining within each tube in the plurality of substantially evacuated tubes, a gaseous composition comprising a mixture of a first percentage, x, of hydrogen and a second percentage, (100-x), of air; and wherein the first percentage, x, of hydrogen is picked based on a predetermined power value and a leak rate associated with each tube, wherein the predetermined power value is a function of a first power to pump each tube to the substantially evacuated state and a second power to overcome aerodynamic drag.

In yet another embodiment, the present invention provides a tubular transportation system for transporting one or more passengers or one or more cargos via a capsule along a predetermined route, the tubular transportation system comprising: a plurality of substantially evacuated tubes arranged along the predetermined route, each tube in the plurality of substantially evacuated tubes maintained at a pressure that is below atmospheric pressure; means for maintaining within each tube in the plurality of substantially evacuated tubes, a gaseous composition comprising a mixture of a first percentage, x, of hydrogen and a second percentage, (100-x), of air, and wherein the first percentage, x, of hydrogen is picked based on a predetermined power value, a desired speed of the capsule, and a leak rate associated with each tube.

In yet another embodiment, the present invention provides an injection system for injecting and maintaining a gaseous composition within a tube, the gaseous composition comprising at least hydrogen and air, the tube being a part of a tubular transportation system for transporting one or more passengers or one or more cargos via a capsule, the tube pumped to a pressure that is below atmospheric pressure until the tube is substantially evacuated, the tube being arranged along at least one predetermined route, the system comprising: (a) at least one hydrogen gas source; (b) at least one injection nozzle to inject hydrogen into the tube; (c) a valve connecting the at least one hydrogen gas source to the at least one injection nozzle; (d) at least one sensor monitoring hydrogen concentration within the tube; (e) a controller controlling the valve to release hydrogen into the tube when the hydrogen concentration is below a predetermined hydrogen concentration, and wherein the predetermined hydrogen concentration is picked based on a predetermined power value and a leak rate associated with the tube.

In yet another embodiment, the present invention provides an injection system for injecting and maintaining a gaseous composition within a tube, the gaseous composition comprising at least hydrogen and air, the tube being a part of a tubular transportation system for transporting one or more passengers or one or more cargos via a capsule, the tube pumped to a pressure that is below atmospheric pressure until the tube is substantially evacuated, the tube being arranged along at least one predetermined route, the system comprising: (a) at least one hydrogen gas source; (b) at least one injection nozzle to inject hydrogen into the tube; (c) a valve connecting the at least one hydrogen gas source to the at least one injection nozzle; (d) at least one sensor monitoring hydrogen concentration within the tube; (e) a controller communicating with a remote operations command center (OCC) and reporting the hydrogen concentration within the tube as measured by the at least one sensor and, when the hydrogen concentration is below a predetermined hydrogen concentration, receiving at least one instruction from the OCC which, upon execution by the controller, controls the valve to release hydrogen into the tube to raise the hydrogen concentration in the tube to the predetermined hydrogen concentration, and wherein the predetermined hydrogen concentration is picked based on a predetermined power value and a leak rate associated with the tube.

In yet another embodiment, the present invention provides an injection system for injecting and maintaining a gaseous composition within a tube, the gaseous composition comprising at least hydrogen and air, the tube being a part of a tubular transportation system for transporting one or more passengers or one or more cargos via a capsule, the tube pumped to a pressure that is below atmospheric pressure until the tube is substantially evacuated, the tube being arranged along at least one predetermined route, the system comprising: (a) a source of hydrogen gas located on board the capsule; (b) an injection nozzle to inject hydrogen from the source into the tube; and (c) a controller on board the capsule controlling a release of hydrogen into the tube when a detected hydrogen concentration within the tube is below a predetermined hydrogen concentration, the detected hydrogen concentration in the tube determined via at least one sensor located within the tube and reported to a remote operations command center (OCC), wherein the OCC communicates with the controller on board the capsule and, when the detected hydrogen concentration within the tube is below the predetermined hydrogen concentration, receives at least one instruction from the OCC which, upon execution by the controller on board the capsule, controls the release of hydrogen from the source of hydrogen located on board the capsule into the tube to raise the hydrogen concentration in the tube.

BRIEF DESCRIPTION OF THE DRAWINGS

FIG. 7 depicts Table 2 showing the distinguishing features of lightest weight gases, of which helium and hydrogen have the lowest densities.

FIG. 8 depicts Table 3 noting a list of the speed of sound entries for various gases.

FIG. 9 depicts Table 4 showing the mean free path for different molecules.

FIG. 11 depicts Table 5 which compares air density to helium at 100 Pa.

FIG. 21 illustrates a comparison of two non-limiting bypass ratio examples used in this disclosure, along with a sample calculation of how the bypass ratio is calculated in each instance.

FIG. 23 illustrates a table depicting volume loading at 50 slm/km by percentage of helium.

FIG. 24 illustrates a table depicting volume loading at 5 slm/km by percentage of helium.

FIG. 34 depicts a table which compares air density to hydrogen at 100 Pa.

FIG. 45 illustrates a table depicting volume loading at 50 slm/km by percentage of hydrogen.

FIG. 46 illustrates a table depicting volume loading at 5 slm/km by percentage of hydrogen.

DESCRIPTION OF THE PREFERRED EMBODIMENTS

Figure 1:
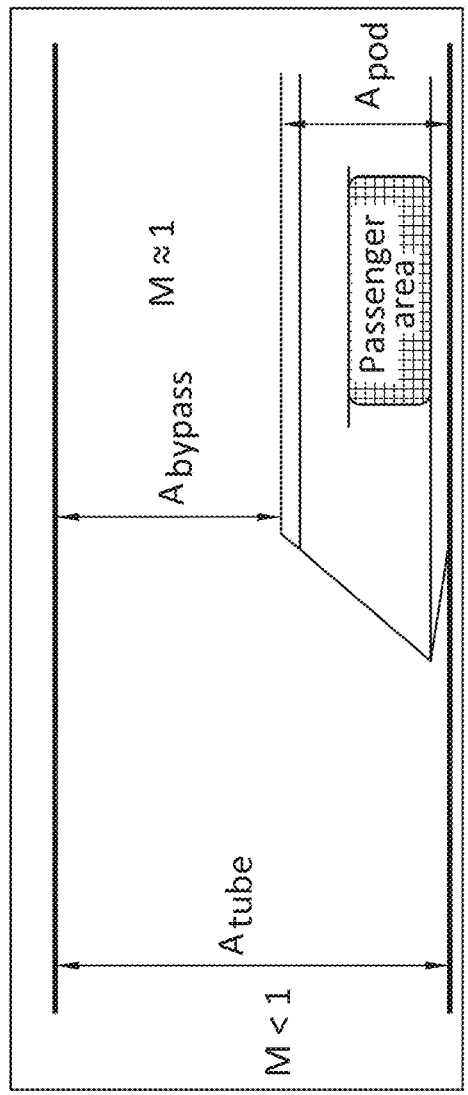
FIG. 1 depicts a schematic of a vehicle (also referred to as pod or capsule) within a tube-based transportation system.
Figure 2:
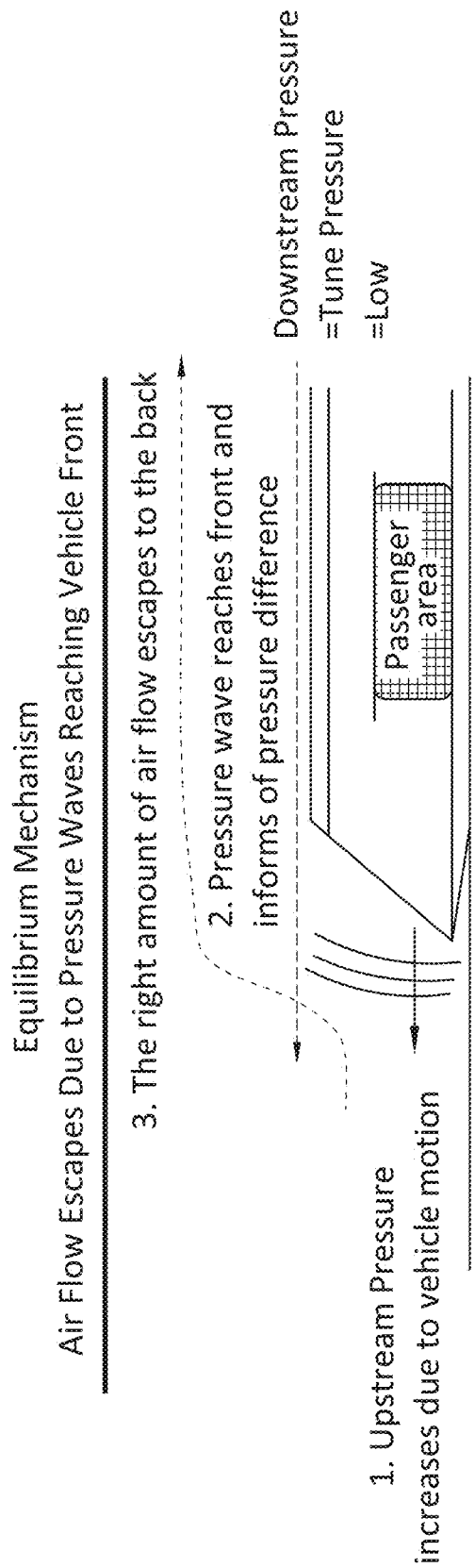
FIG. 2 depicts the equilibrium mechanism where when pressure waves reach the front of the vehicle, the right amount of air flow escapes to the back of the vehicle.
Figure 3:
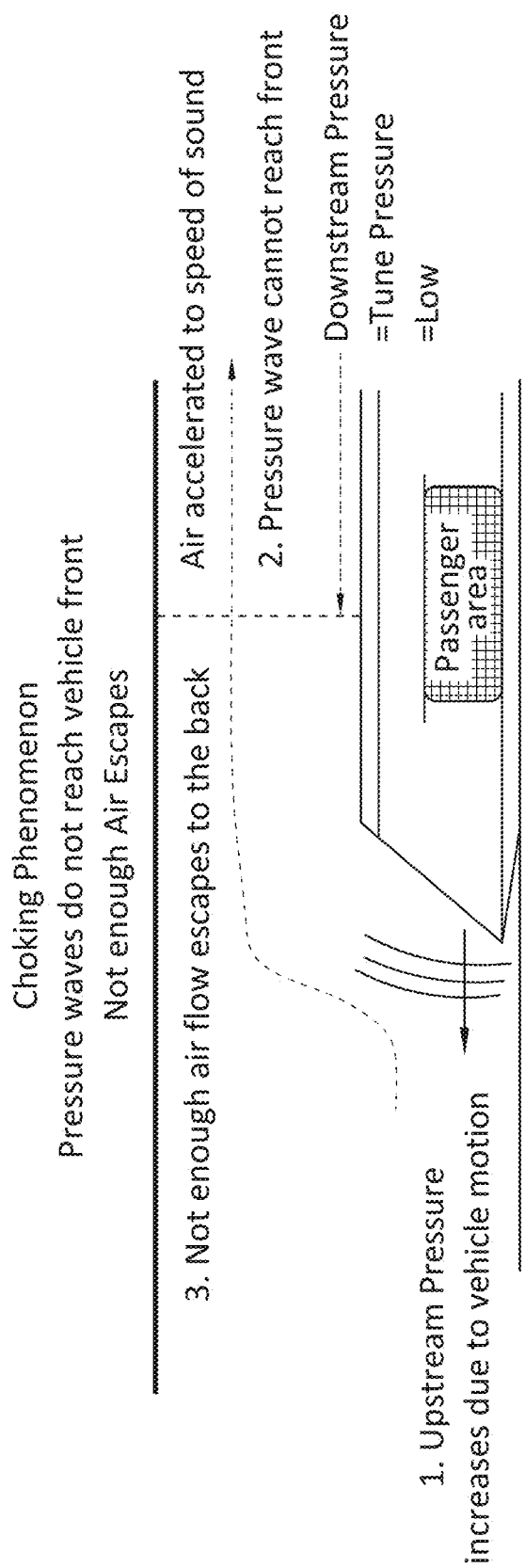
FIG. 3 depicts the choking phenomenon that results when the pressure waves from the back of the vehicle do not reach the front of the vehicle.
Figure 4:
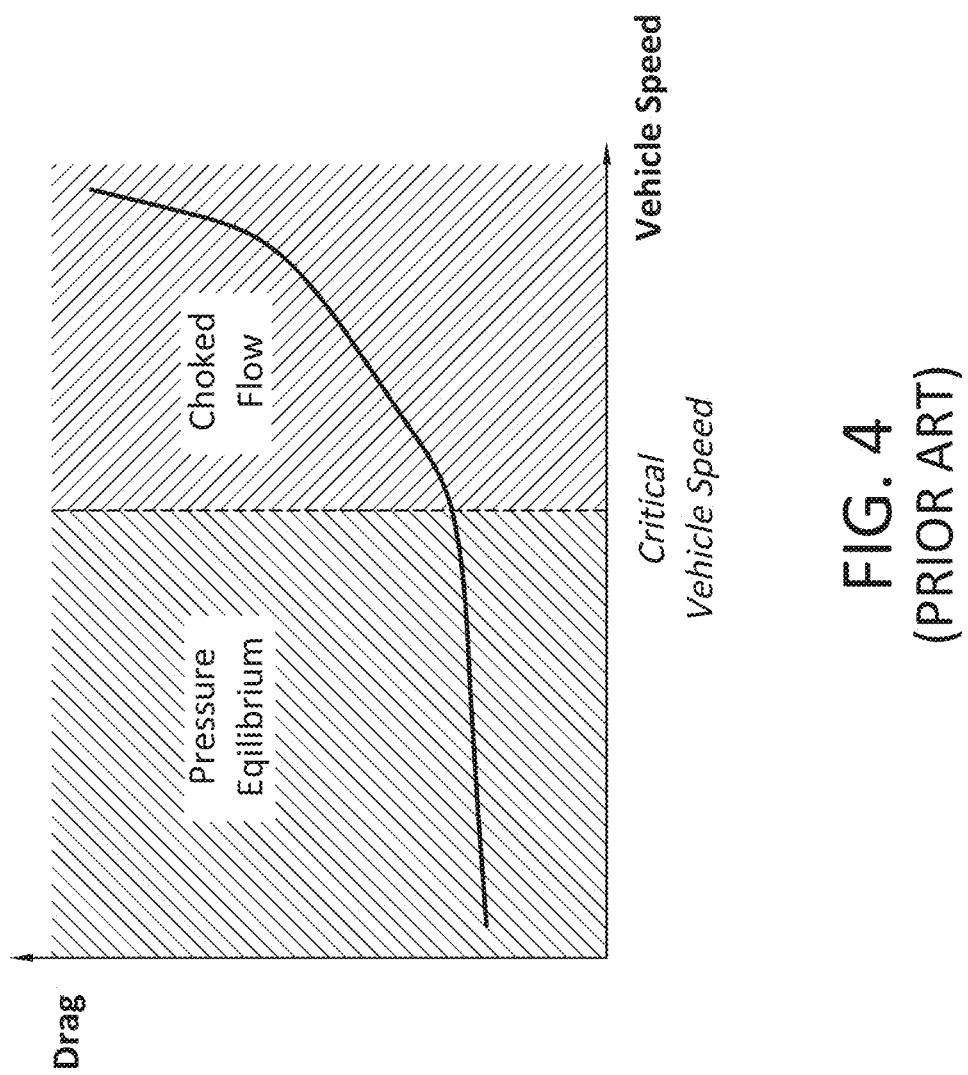
FIG. 4 depicts a graph of drag versus vehicle speed which identifies the critical vehicle speed that demarcates the pressure equilibrium scenario depicted in FIG. 2 and the choked flow scenario depicted in FIG. 3.
Figure 5:
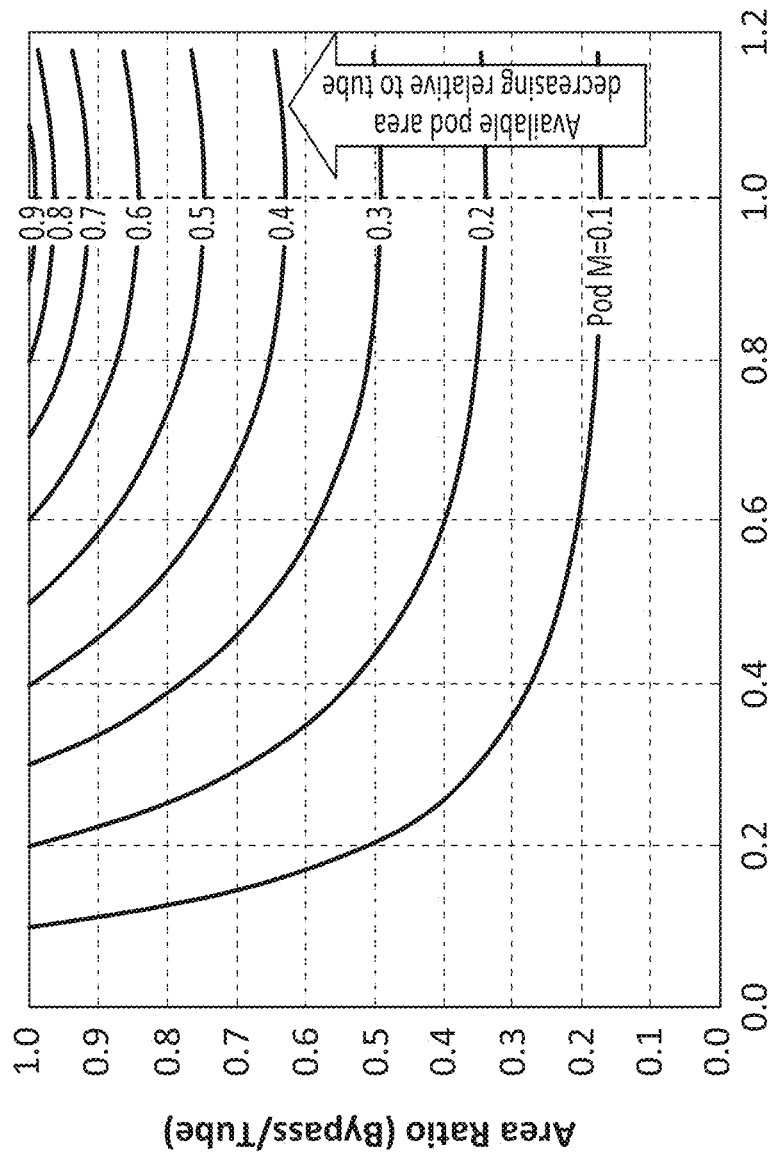
FIG. 5 depicts a graph of the bypass area ratio (Bypass/Tube) versus the bypass air flow Mach number.
Figure 6A:
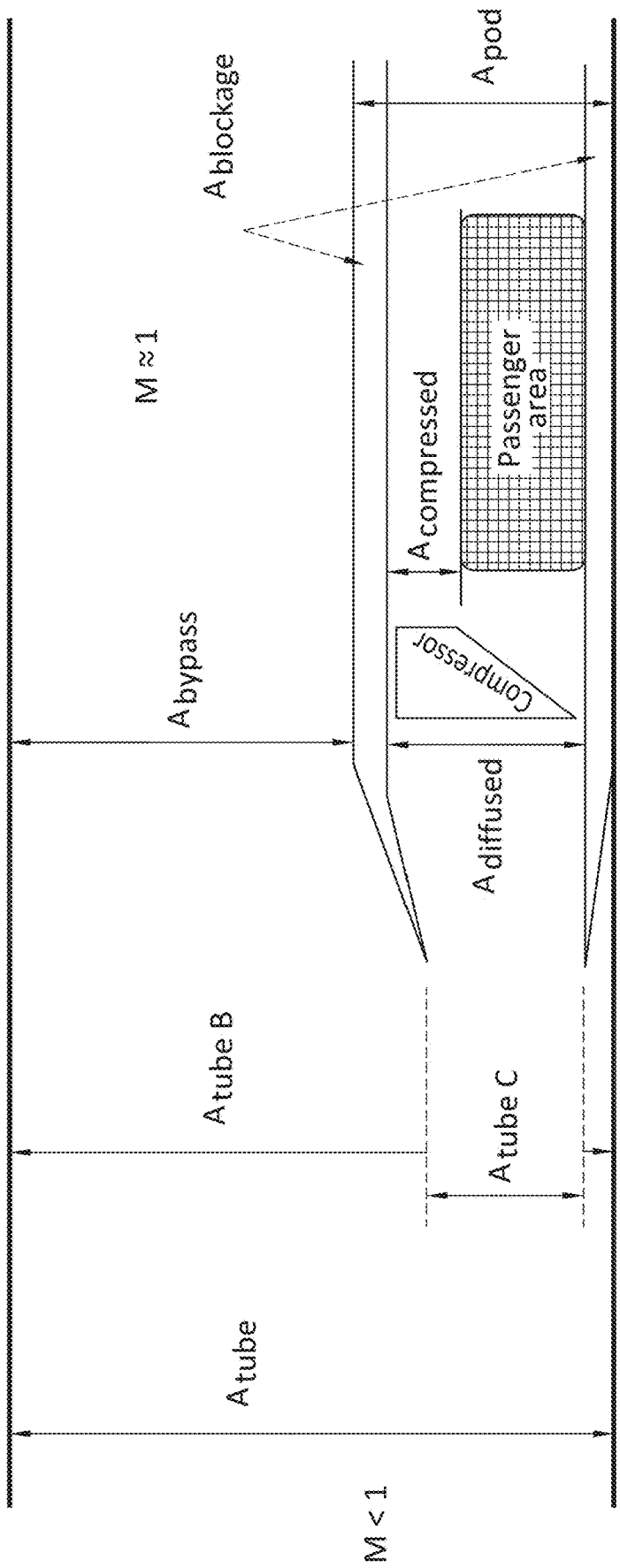
FIG. 6(A) depicts a scenario where an axial compressor is used at the front of the capsule in a tube-based transportation system.
Figure 6B:
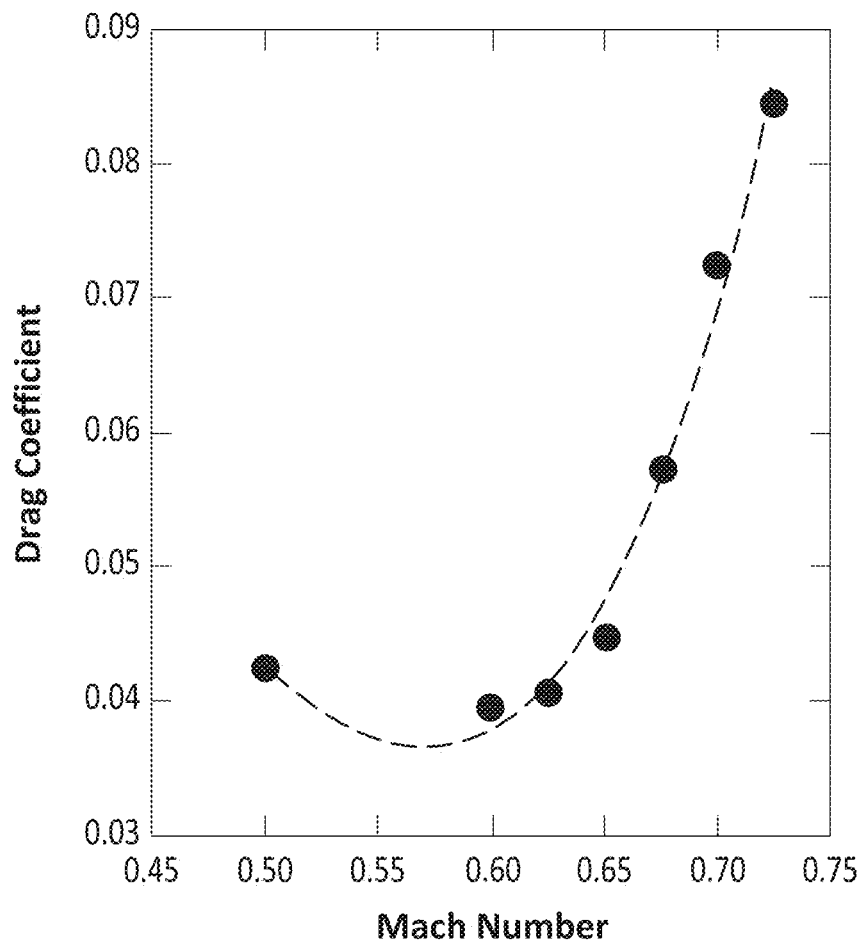
FIG. 6(B) depicts the drag as a function of the vehicle speed in the scenario of FIG. 6(A).

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

As noted in the background, recent efforts to increase the capsule speed have focused on reducing the tube pressure or improving the bypass ratio with the use of a compressor. As mentioned previously, a reduced tube pressure does have merit at some key vacuum level, but it comes at the price of substantial increases in vacuum pump capacity and cost. Adding a compressor to the front of the capsule has some merit, but it only increases speed marginally and is also costly and complex.

The present invention overcomes the pitfalls associated with the prior art by using a mixture of air and helium (in various ratios to be described later) to modify the fluid properties such as speed of sound, which enables reaching high vehicle speed at acceptable propulsion power. Advantages of using a mixture of air and helium include obtaining different fluid properties, such as, reduced density, higher speed of sound and higher free molecular path. These different fluid properties can substantially reduce the drag on the vehicle and the propulsion power needed.

It should be noted that having a lower density (by a factor of seven) has a substantial and direct effect on drag and propulsion power. Drag is directly proportional to density (and any means to reduce density is useful in a tube-based transportation scenario), which is why aircraft fly at high altitude (low density) and which is why low-pressure tubes are considered (low density). The present invention notes another way to reach low density, i.e., by using light gases instead of standard air. In addition, the present invention goes further than just reducing density because it also takes advantage of higher speed of sound and higher free molecular path as possible ways to counter the Kantrowitz limit.

The present invention discloses mixing different gases that are lighter than air, where these gases have smaller molecular diameter. There are numerous gasses which meet the requirement of a gas molecule smaller than air. The subject of this patent application is the use of helium, which has attractive properties that can be exploited in tube-based transportation systems. While, the air in the tube could be replaced completely by helium, this could be hard to achieve. Instead, the present invention discloses using a mixture of air and helium in various ratios (which is discussed in detail later in this patent application), which still has interesting properties, while also providing an implementation at a lower cost (when compared to previously described prior art systems and when compared to equivalent systems that use just helium).

It must be noted that the cost associated with replacing the air completely or partly by other gases may be reasonable. Since the pressure is low, about 100 Pa in standard applications, the amount of injected gas in the tube should remain low. Table 1 below shows the mass of gas in the tube for a mixture of air and helium at different percentages.

TABLE 1

| | Length of Tube | 10 km |
|---|---|---|
| | Diameter of Tube | 4 m |
| | Pressure in Tube | 100 Pa |
| | Temperature in Tube | 20° C. |
| Mass of Gas | Tube filled with air | 150 kg |
| | Tube filled with helium | 21 kg |
| | Tube filled with (17% air; 83% helium) by Volume corresponding to (60% air; 40% helium) by Mass | 43 kg = 25 kg (air) + 17 kg (helium) |

Table 1 demonstrates that the amount of helium to be injected in a 10 km tube is low, whether considering pure helium or a mixture of helium and air. At 100 Pa, the entire 10 km tube could be filled with pure helium at current cost of less than $300 (~$14.00/kg He). However, it is not possible to maintain a 100% helium content in a large welded tube due to leakage of air from outside the tube. It is the intent of this art to define optimum percentages of helium and air which reduce drag in the tube.

Some of the advantages of the present invention are listed below. Gases that are lighter than air have a lower density, a higher speed of sound, and higher free mean path. This offers at least three advantages, simultaneously. The first advantage is the possibility of significantly reducing the density of the gas. Since drag is proportional to the density, a reduction of the density of the gas directly impacts the drag. Table 2 below shows the density at atmospheric pressure for usual gases, extracted from the website (Source: Engineering Toolbox website).

Table 2, as shown in FIG. 7, depicts the distinguishing features of lightest weight gases, of which helium and hydrogen have the lowest densities. Helium has a density seven times lower than air at atmospheric pressure. This ratio is the same in a tube pressure of 100 Pa, which means that drag can be expected to be reduced by a factor of about seven. This is a major advantage that goes to the root of high speed transportation: reducing drag by reducing density.

Replacing a portion of the air by a lighter gas offers two possibilities:
either benefit from lower density at the same environmental pressure (therefore reducing propulsion power); or
operate at higher environmental pressure and achieve equal density (therefore reducing the pumping power).

Hence, smaller diameter gases are of less density, which reduces the drag on the capsule. The use of a combination of air and helium (in specific, predetermined proportions, as will be detailed later) allows higher capsule speeds, reduces vacuum pump size and cost. Such a combination of gases provides a significant improvement in high-speed tube-based transportation technology and will reduce costs, and improve economics, and commercial viability.

Another advantage is the possibility to increase the speed of sound. As shown in above section, a high speed of sound allows a higher vehicle speed without choked flow. The speed of sound for a gas is given by below formula:

$$c_{sound} = \left(\gamma \frac{R_{gas}}{W_{gas}} T\right)^{0.5} \quad \text{(EQN. 2)}$$

where $\gamma$ is the specific ratio, $R_{gas}$ is the gas constant (8.3145 J/kg/K), $W_{gas}$ is the gas molecular mass (kg/mol) and T is the temperature of the fluid. From EQN. 2, the speed of sound can be increased by changing the molecular mass. In particular, a lightweight gas has a high speed of sound.

Table 3, as shown in FIG. 8, is a list of the speed of sound entries for various gases (Source: Engineering Toolbox Website).

From Table 3, it is seen that the lightest weight gases stand out in terms of their speed of sound entry. Helium and hydrogen have the highest speed of sound. Helium has a speed of sound three times higher than air while hydrogen has a speed of sound four times higher than air. For the purposes of this patent application, it is preferred to use Helium in the tube (since flammability issues would have to be addressed with hydrogen, which would require some design changes).

Referring again to the example from the previously described paper to Chin et al. (2015), it was shown that in a tube filled with air, maximum vehicle speed occurred around Mach 0.25, i.e. 300 km/h for air. Since helium has a speed of sound three times higher than air, Mach 0.25 in helium corresponds 900 km/h. The present invention, therefore, provides a substantial gain, by only changing nature of the gas, and without modifying anything else in the tube or the capsule design.

Referring to the same example, consider now a mixture of air and helium in the tube, which might be more easily obtained. The speed of sound of the mixture is $$c = (R_{mix} \gamma_{mix} T)^{0.5} \quad \text{(EQN. 3)}$$

where $R_{mix}$ is the specific gas constant of the mixture, $\gamma_{mix}$ is the specific heat ratio of the mixture, and T is the Temperature. For a mixture of (17% air; 83% helium) by volume, which corresponds to (60% air; 40% helium) by mass, the speed of sound is 664 m/s, which is twice the speed of sound in pure air. Referring to the example in Chin et al. (2015), the maximum speed of Mach 0.25, which was 300 km/h in air, now, based on the teachings of the present invention, becomes 600 km/h in the above noted mixture of air and helium. This gain is obtained without any other change in tube or capsule design.

A simpler way to look at this makes the solution easier to understand. The Kantrowitz limit occurs when gas flowing around the capsule becomes choked, i.e., at a speed of Mach 1. Mach 1 for air is 331 m/s at standard temperatures. Smaller molecular gases have higher speed of sound which allow them to flow much faster before choking. The capsule will not be subject to choking flows until the preferred, and much higher Mach speed is reached.

Thus, smaller molecular diameter gas allows higher speeds before going into the sonic region. The geometry of the capsule and tube will still determine when choking occurs, but in the case of air it occurs at the relatively low speed of 331 m/s. By switching to a gas or mixture of gases with much higher Mach speeds, such as 972 m/s for helium, and 1,290 m/s for hydrogen, much higher capsule speeds can be attained before choking occurs. It is noted that the capsule does not avoid the K-limit, but the speed at which the K limit becomes a problem is increased.

Lastly, another advantage is the possibility of increasing the free path of the gases. If the mean free path is large enough, the assumption of fluid continuum is no longer true, and the fluid must be treated by molecular flow theory. As explained above, this opens the possibility that choking phenomena do not exist because the physics becomes different.

The Knudsen number is used to estimate whether the gas can be treated as a continuum or as a molecular flow. Continuum is true if Kn<0.001, and molecular flow is true for Kn>0.01. In between, a transition region occurs, which can also be interesting.

$$Kn = \frac{\lambda}{L} \quad \text{(EQN. 4)}$$

The Knudsen number compares to the mean free path, $\lambda$, of the molecules and the vehicle characteristic size L (length or diameter). Hence, molecular flow region can be attained by increasing the mean free path.

The mean free path is given by the below formula:

$$\lambda = \frac{kT}{\sqrt{2\pi P d_m^2}} \quad \text{(EQN. 5)}$$

where k is the Botzmann constant, P is the pressure, and d is the molecular diameter.

From EQN. 5, it is seen that an increase in the mean free path is obtained by reducing the pressure, P, or reducing the molecular diameter, $d_m$.

But a key insight comes from rearranging the basic Knudsen equation (i.e., EQN. 4). A pressure term appears in the denominator of EQN. 5 and one can look directly at what pressures are required to create a Kn number in the molecular range. Suitably low numbers of pressure do create a large Kn number and lead us to the conclusion that pressure is again the best path to finding the operating region in which K-limit becomes insignificant.

The most effective Kn number can be derived not from just lowering the pressure, but rather from changing the diameter of the gas molecule, $d_m$, in the denominator of the expanded free mean path (EQN. 5).

Previously, it was explained that to achieve molecular flow, the pressure had to be reduced below 1 Pa for a tube with air. This demands very large pump power to achieve such low pressure. Instead, by using a gas with smaller diameter (light-weight gas), it is possible to increase the mean free path. Table 4, depicted in FIG. 9, shows the mean free path for different molecules (Source: Pfeiffer-Vacuum website).

From Table 4 it is seen that helium has one of the highest mean free paths, about three times higher than air. This means that it is possible to reach the molecular flow region with a higher pressure, about three times higher than if it were air. Hence, in the present invention, the pump requirement to achieve molecular flow is significantly reduced.

Computational Fluid Dynamics (CFD) Simulations with a two-dimensional configuration of the Tube Transportation System were performed. The configuration is 2D planar. It is an approximation of the reality which is 3D. Still, it gives a useful insight on the dependence of the drag on vehicle velocity and on gas. The 2D planar CFD provides drag coefficient at different vehicle speed. These drag coefficients can then be used to estimate the actual drag on the 3D actual capsule. Both drag coefficient and estimated drag on 3D actual capsule are presented.

Figure 10:
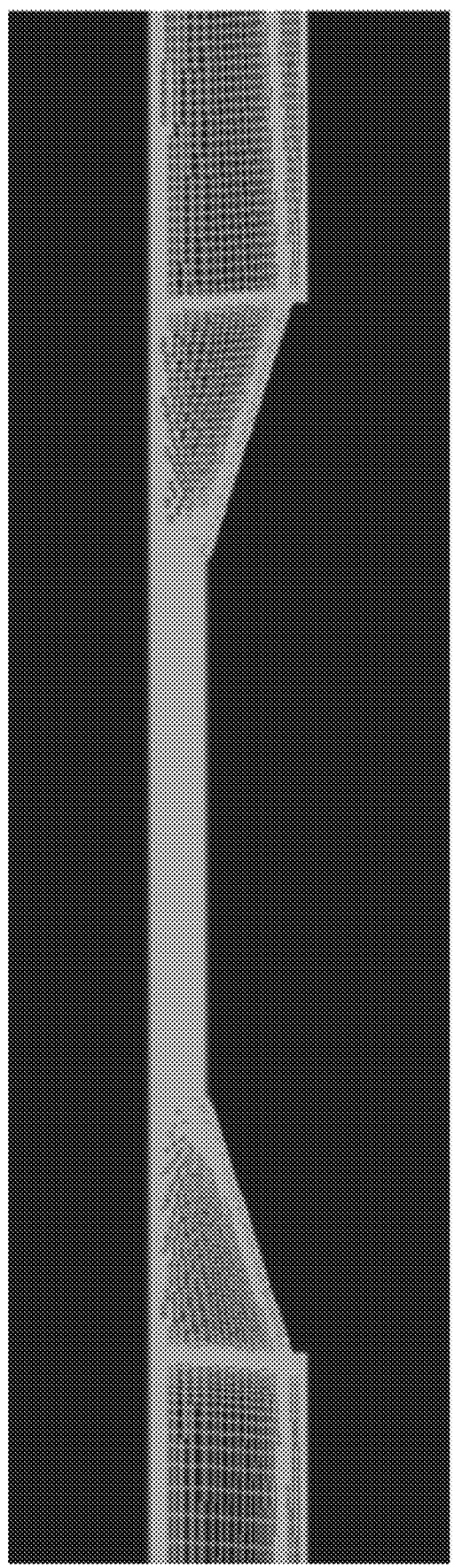
FIG. 10 depicts a view of the 2D mesh used in the present simulations.

The schematic of Chin et al. (2015) shown in FIG. 1 was used and a view of the 2D mesh used in the present simulations is depicted in FIG. 10. The tube is 4 m diameter and the Bypass-to-Tube-Area Ratio is about 0.489. These numbers are similar to the previous study from Chin et al. (2015). However, in stark contrast to Chin et al. (2015), the present invention operates at a pressure of 100 Pa, with a mixture of air and helium. Note that the operating density of helium is about seven times lower than air. Hence, a reduction of drag is expected by a factor of 7.

FIG. 11 depicts Table 5 which lists the density by mass figures for both air and helium at 100 Pa. As mentioned previously, the reduction in density of over seven times (0.00116/0.00016) reduces drag in a similar ratio (i.e., seven times). This advantage holds true at differing pressures in the continuum range. (Note: Due to round off errors the bypass ratio is sometimes shown as 0.488 or 0.489)

In the results below, both the drag coefficient and the estimated drag on the actual 3D configuration are presented.

Drag, as previously noted in EQN. 1, is related to the drag coefficient by $$D = C_D \tfrac{1}{2} \rho_{tube} V_{pod}^2 S_{pod} \quad \text{(EQN. 1)}$$

The 2D simulations provide the Drag Coefficient at different pod velocities. The estimated 3D drag is then obtained by multiplying the drag coefficient $\tfrac{1}{2}\rho_{tube}V_{pod}^2 S_{pod}$ where $\rho_{tube}$ is the tube operating density, $V_{pod}$ is the pod velocity, and $S_{pod}$ is the frontal surface area of the pod.

Figure 12:
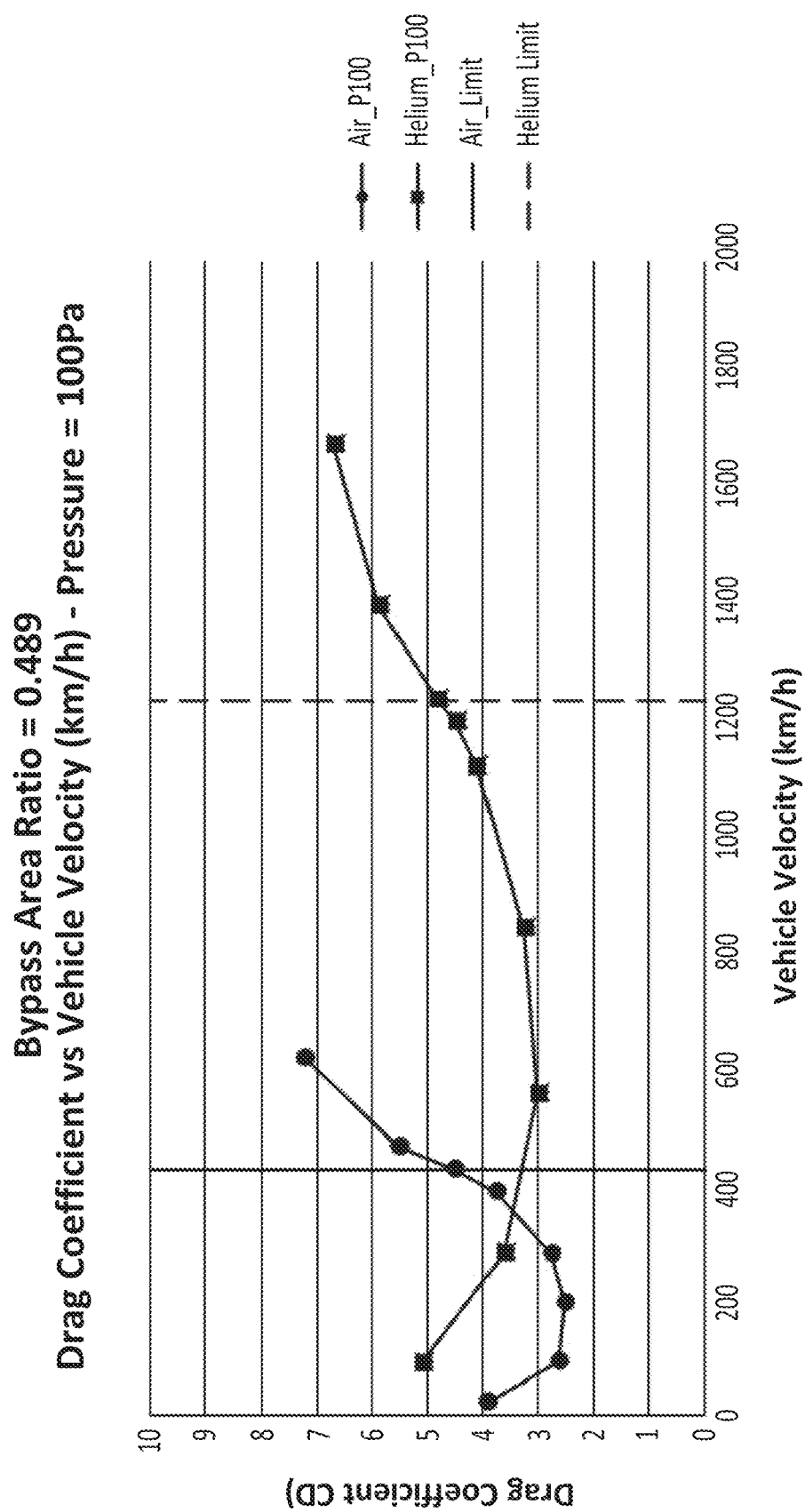
FIG. 12 depicts a graph showing the drag coefficient from 2D simulation for air and helium.

FIG. 12 depicts a graph showing the drag coefficient from 2D simulation for air and helium. The drag coefficient increases substantially when the velocity goes above the Kantrowitz limit. It is noted that the Kantrowitz limit for helium is reached at a speed about three times higher than that of air, which is in line with what was expected. It is also noted that below the Kantrowitz limit, the drag coefficients of helium and for air are similar (about 3.5 at 375 km/h). This is because the drag coefficient formula is drag divided by density.

Figure 13:
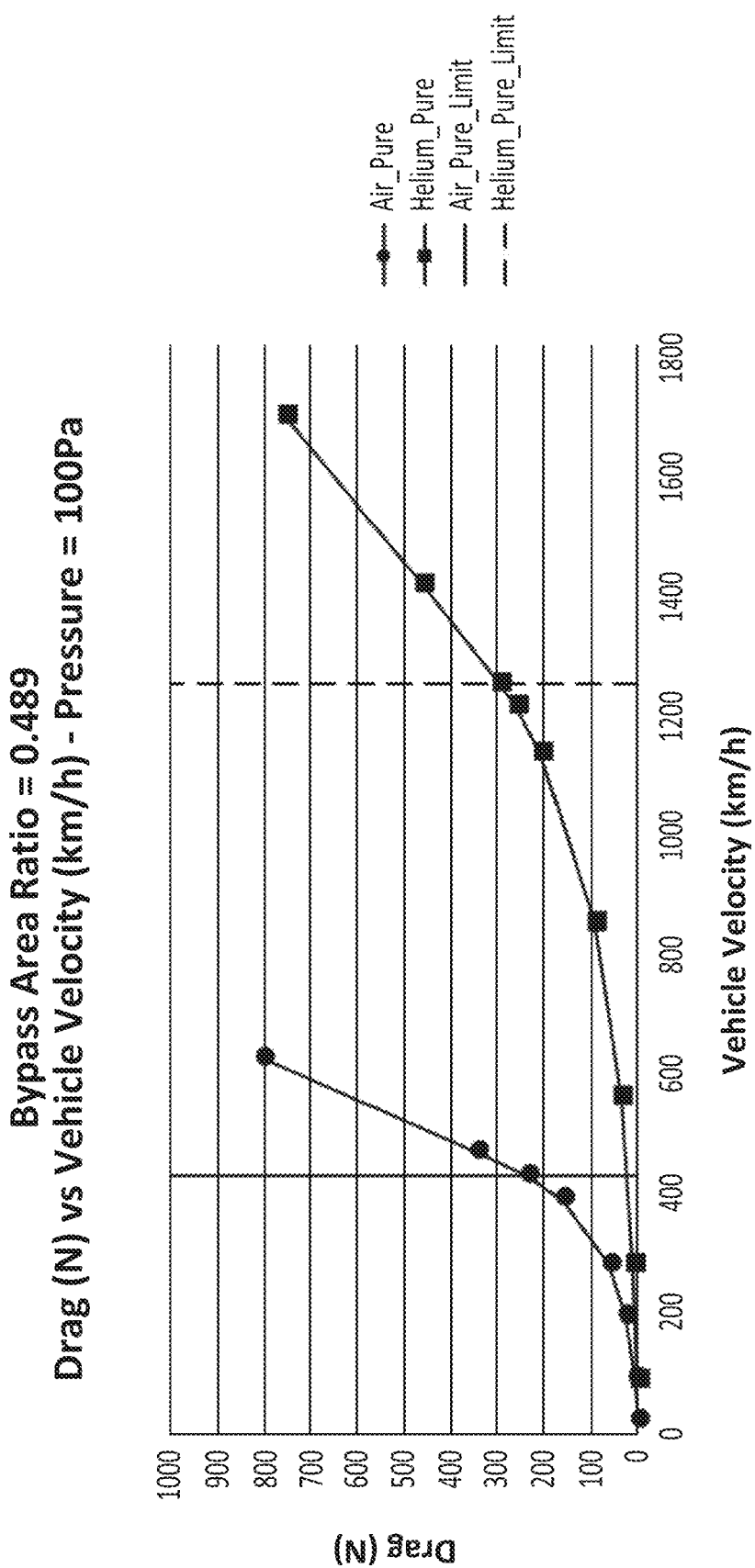
FIG. 13 investigates the effect of density by plotting the actual drag for a 3D capsule against the capsule velocity.

FIG. 13 investigates the effect of density by plotting the actual drag for a 3D capsule against the capsule velocity. The graph below illustrates the behavior of the estimated Drag of the actual 3D pod for helium and air. The 3D drag is estimated using 2D Drag Coefficients and multiplying it by $\tfrac{1}{2}\rho_{tube}V_{pod}^2 S_{pod}$.

The graph in FIG. 13 confirms two important claims of the present invention:

1. Benefits of Low Density

Consider the region of Vehicle Velocity below the Kantrowitz limit of both helium and air. The drag of helium is lower than that of air. For the same pod speed of 300 km/h, the drag with helium is about 5.5 times lower than with air. This is close to the ratio of density of 7 between air and helium.

2. Higher Speed Before Reaching Kantrowitz Limit

The Kantrowitz limit Velocity for helium is about three times higher than that of air. Above the Kantrowitz limit, the drag starts rising substantially with velocity due to choking. Results shown in FIG. 13 confirm that helium can go to a velocity three times higher than that of air before reaching the Kantrowitz limit. Hence, helium can go to a velocity three times higher for a reasonable demand of power. Helium, therefore, can allow a capsule speed of nearly 1,000 km/h before the necessity of overcoming the Kantrowitz limit.

The benefits of low drag directly correspond to lower power requirements for propulsion. Lower power equates to less operating cost which is a key to putting this technology into practice. Less cost provides cheaper tickets and more ridership bringing this technology to mainstream adoption.

Figure 14:
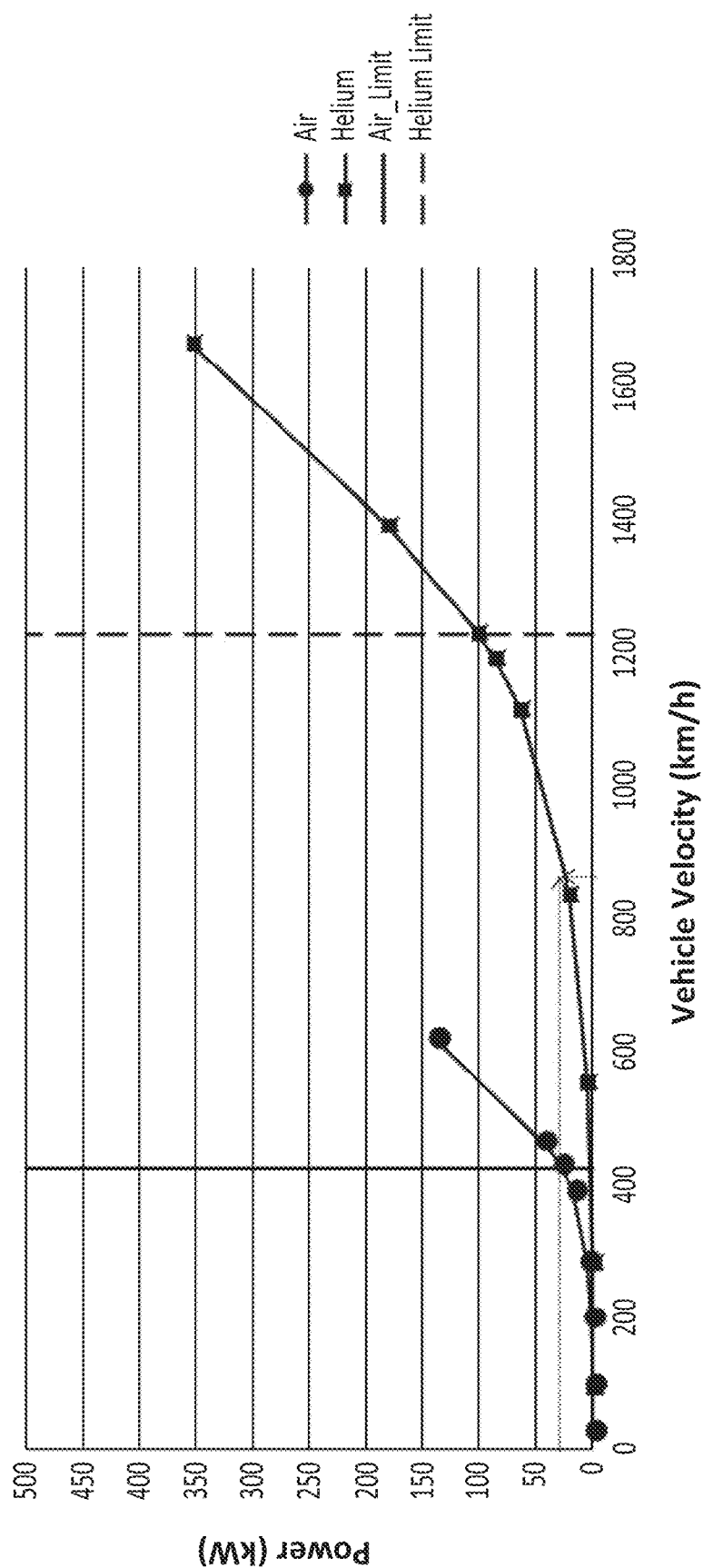
FIG. 14 depicts a graph illustrating power reduction based on using light-weighted gas.

FIG. 14 depicts a graph illustrating power reduction based on using light-weighted gas, where the graph compares requirements to overcome aerodynamic drag with air versus helium (at 100 Pa). The same power to offset aerodynamic drag can achieve speeds of over 900 kph in a helium-based system but can only achieve 425 kph in an air-based tube. Twice the speed is achieved for the same cost in aerodynamic power.

Therefore, replacing air or part of air in the tube by light-weight gases provides at least the following advantages: lower density (and, hence, lower drag, implying lower propulsion power), higher speed of sound (and, hence, higher vehicle speed before occurrence of the choking phenomenon), and higher mean free path (and, hence, lower pump power to achieve molecular flow as molecular flow may avoid choke phenomenon and thus decrease propulsion power).

As explained previously, implementing a mixture of air and light-weight gases, such as helium, in the tube can substantially reduce the drag on the vehicle and in turn the propulsion power needed to overcome drag. Some further charts are valuable in determining the optimum mixture percentages and pressure ranges of air and the light-weight gas.

Figure 15:
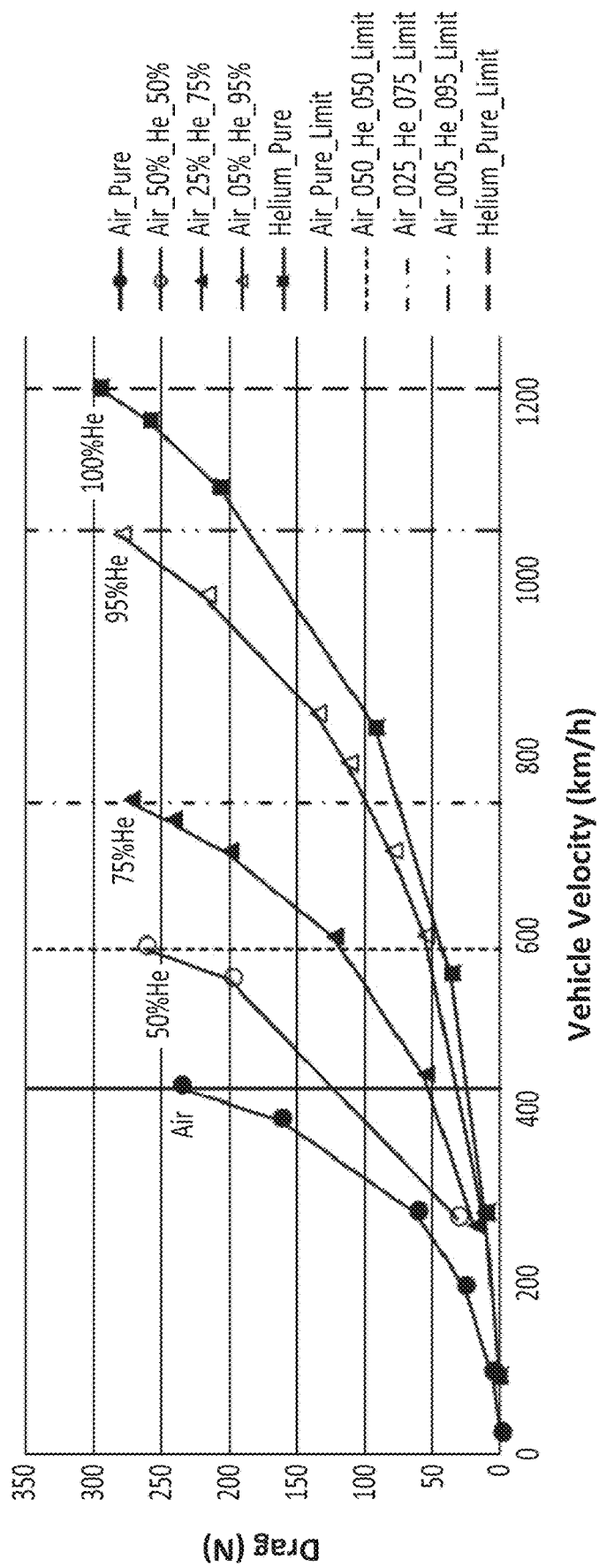
FIG. 15 depicts the results of CFD studies comparing maximum velocities at the K-limit attainable due to variations in the helium-air mixtures.

FIG. 15 depicts the results of CFD studies comparing maximum velocities at the K-limit attainable due to variations in the helium-air mixtures. Drag is a useful indicator to chart against velocity as there is no economic advantage to achieving higher speeds if the drag increases correspondingly.

At 100 Pa tube pressure, we see the increasing speeds attainable with increasing helium percentages. The dashed vertical lines show the speed at the K limits, first, on the left, for pure air and lastly for pure helium. The second vertical line, on the right, is for a 100% by volume helium filled tube and shows a maximum speed of exceeding 1,200 km/hr with an only nominal increase in drag. Comparing that to the air maximum speed line it is noted that the achievable speed has increased nearly three times from 425 km/hr to over 1,225 km/hr.

Figure 16:
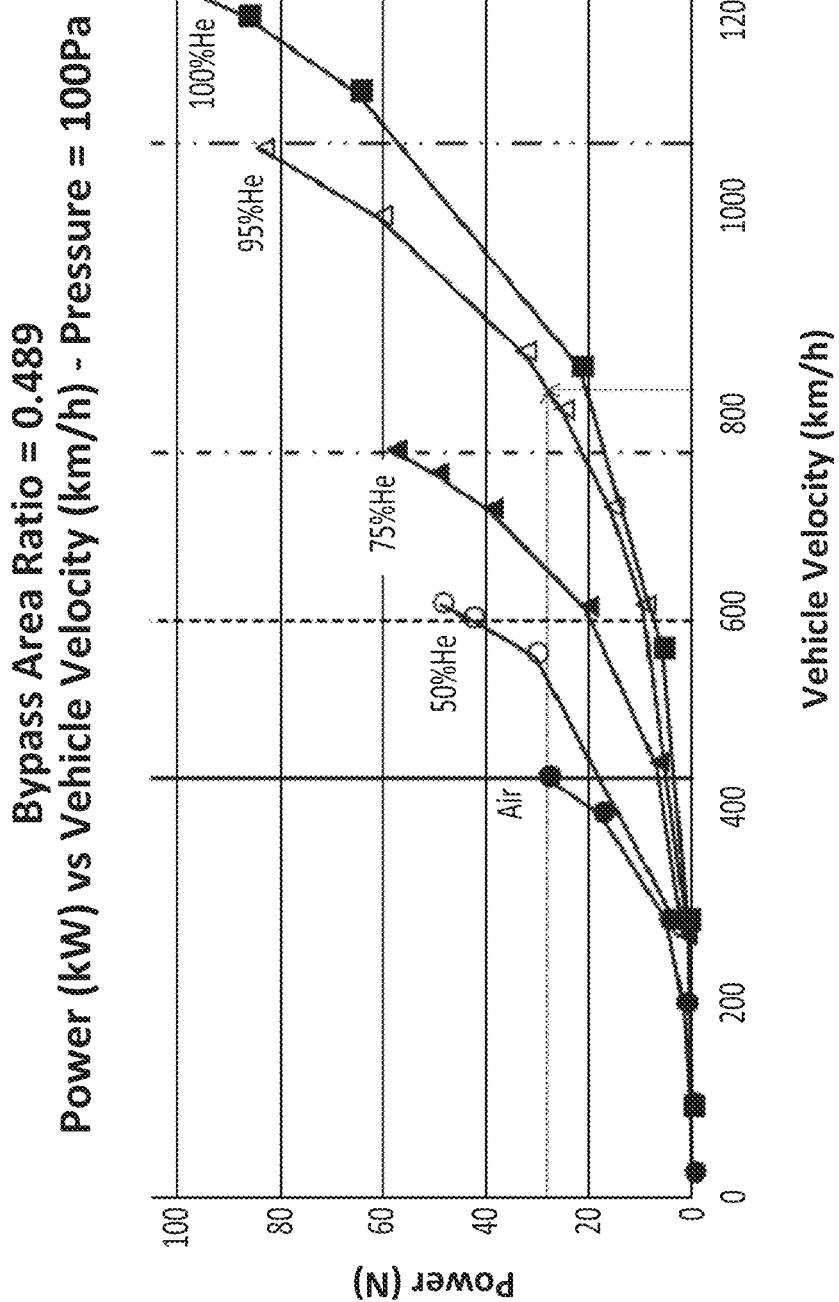
FIG. 16 depicts identifying a capsule speed given a power requirement for a specific combination of air and helium.

As mentioned previously, the operational cost is a function of power. Choosing an optimal speed with reference to cost can be qualitatively seen from the power versus gas mixture graph shown in FIG. 16. For example, given a power potential of approximately 27 kW, a target velocity of 800 km/hr may be achieved using a gaseous mixture of 5% air+95% helium.

Speed is nearly doubled (when compared to pure air) with the same power using a conservative 95% helium/5% air mixture. Additionally, this mixture allows much higher capsule speeds, but at the cost of higher thrust power. This is an important consideration as it is anticipated that in long and remote sections of the route it will be necessary to power the propulsion from the capsule. This can only be provided by onboard power until improved methods of non-contact power transfer becomes proven. Thus, keeping power low allows the use of smaller and lighter capsule power packs. Maximum speeds do not guarantee optimum operation costs as the economics rely on the length, curvature and elevation changes within the route and the source of propulsion power.

Performance with light-weighted gas has been shown primarily at 100 Pa pressures to keep the discussions similar and, also, due to the ease of maintaining this vacuum. But, there is a much wider range of pressures achievable that have trade-offs. Results for different ranges of pressures are next presented as we further optimize gas percentages with operating pressures.

Figure 17:
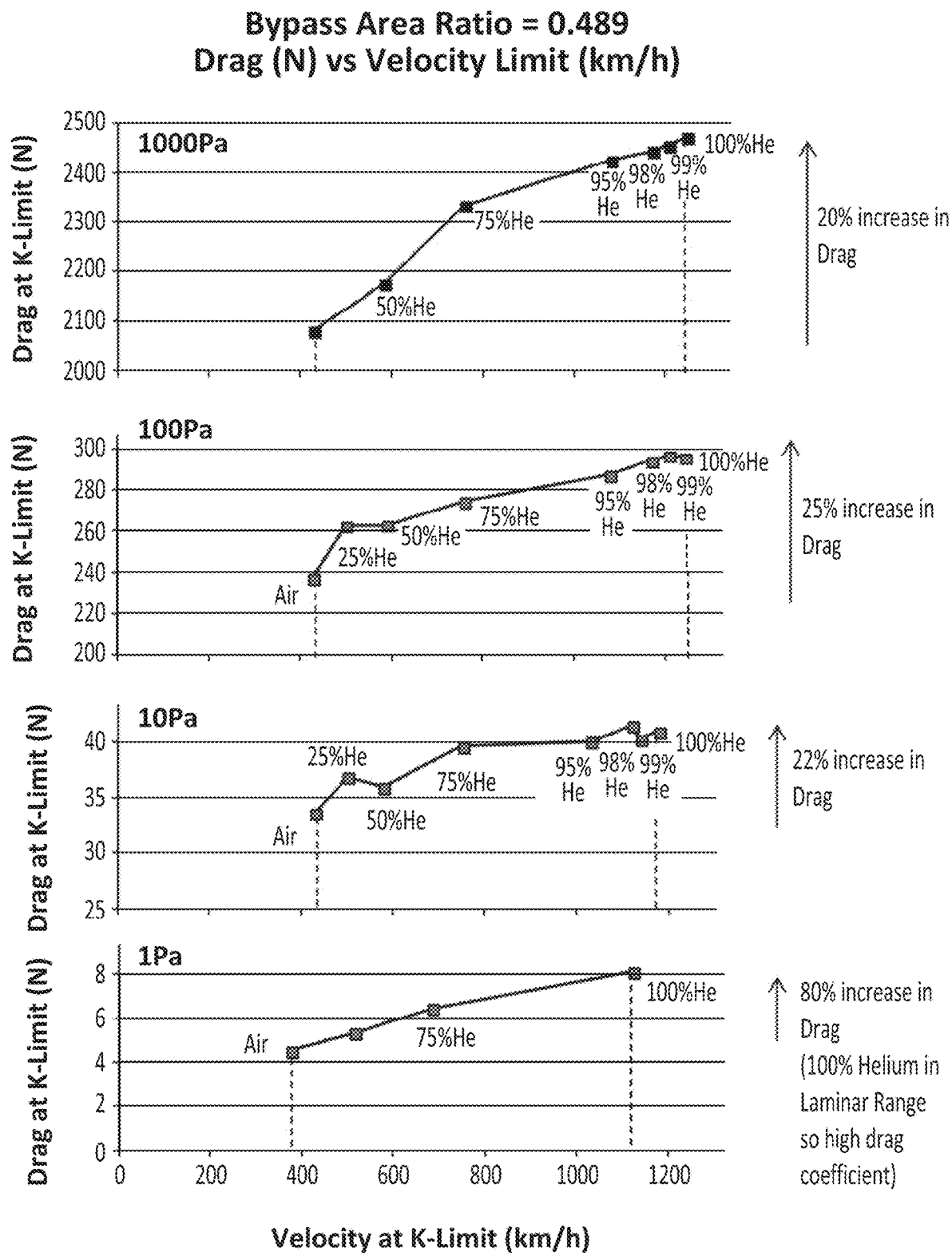
FIG. 17 illustrates a comparison of drag versus velocity, at the Kantrowitz limit, graphs for four basic tube pressures from 1-1000 Pa along with percentages of helium in air.

FIG. 17 illustrates a comparison of drag versus velocity, at the Kantrowitz limit, graphs for four basic tube pressures from 1-1000 Pa along with percentages of helium in air. First, it is noted that the velocity at Kantrowitz Limit increases as the percentage of helium increases in the mixture, for all pressures. The increase in velocity at the Kantrowitz limit has a relatively low dependence on pressure. Now, different graphs for various pressures are examined. These pressure comparisons are first made on the basis of drag and are most interesting for the lowest pressure regime, 1 Pa, where the low pressure and high helium percentage transforms the flow to laminar, thus increasing drag 80% in the 1-100% helium range. The 1000 Pa tube is also seen to create very high drag despite all combinations of air and helium. This will certainly result in high propulsive power requirements leading to impractical capsule onboard energy storage systems.

It is seen from the 1 Pa pressure graph that drag, in spite of laminar flow, is quite low and power requirements will also be low. But, the pumping power to achieve that vacuum level, combined with expected air leakage rates (45 SLM (standard liter per minute)/km), will result in that pressure not being viable without major, and more than offsetting, costs in capital expenditures.

At higher pressures, such as 10 Pa, we see that the drag increases minimally as the vehicle speed more than doubles. This is a critical point to consider. Drag is one of the key consumers of power that must be overcome by the propulsion system, the others being acceleration and gravity. Once the vehicle is at operational speed and running on level terrain, drag is the major drain on power consumption for propulsion purposes. Thus, economic operation depends on minimizing drag at the highest operation speeds and obtainable vacuum levels. Notice above that aerodynamic drag is shown to be increasing at a low rate (<25%) with significant speed increases. Operation at higher speeds is achievable with only incremental drag increases. Current high-speed rail does not have this advantage and thus is constrained to lower speeds or much higher power requirements or both.

Figure 18:
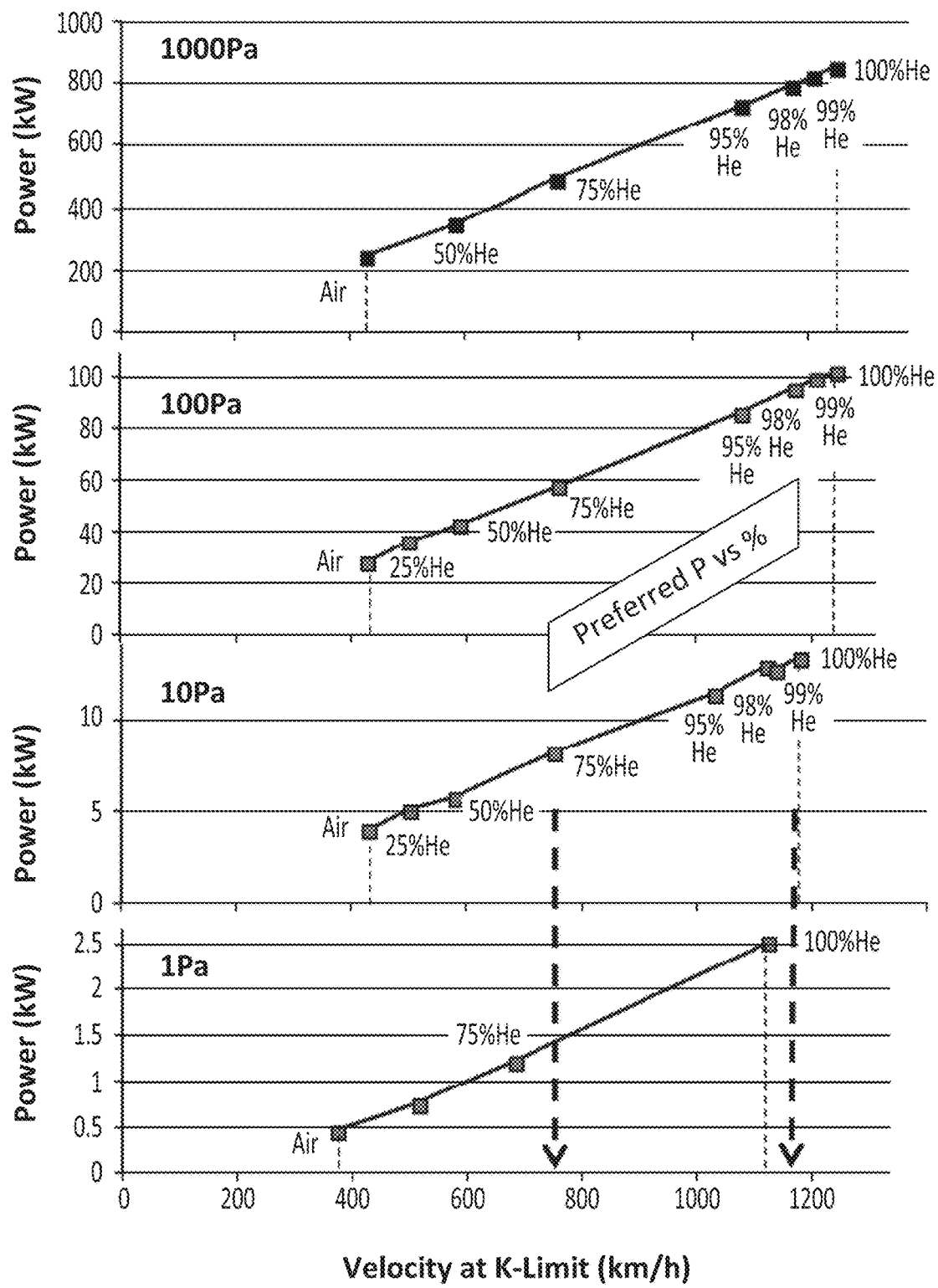
FIG. 18 illustrates a power versus velocity graph where the power requirements are reviewed for various pressures and various air-helium mixtures to identify optimal operational ranges.

FIG. 18 illustrates a power versus velocity graph where the power requirements are reviewed for various pressures and various air-helium mixtures to identify optimal operational ranges. Aerodynamic power consumption graphs with varying helium percentages at pressures of 1, 10, 100 and 1000 Pascals are shown.

Based on extensive CFD runs, proven gas properties and behavior at various pressures, we can narrow our operating ranges based on power requirements. This is the primary factor in determining operating costs—how much energy is required and practical—to operate at high speeds. The power ranges depicted in FIG. 18 for 100 Pa and 10 Pa are achievable with current battery technology for onboard storage systems. Existing Li-Ion batteries used in cars have capacity of 30-100 kwh and thus with several of these packs would be suitable to sustain capsule propulsion (to overcome shown aerodynamic drag) for smooth and straight routes and have suitable safety reserves. As mentioned previously, variations in elevation and curve radii will all affect the power requirements, as will drag due to other elements of propulsion, life-support, etc. Due to limited volume and available weight for battery storage capacity on board the capsule, the opportunity to reduce battery power is closely examined and must be compared to the increased vacuum pumping power to obtain those lower pressures. At this very large scale, low power regimes can be achieved with modest percentages of helium and at reasonable vacuum levels.

The present invention identifies that helium percentages in air ranging from 75%-99% are practical and effective for increasing capsule speeds from a base of 400 kph in pure air to as high as 1,150 kph in a mix of 99% He and 1% air. Lower percentages of helium also provide improvements as shown, but due to the relative low cost of helium, do not provide optimum or most cost effective operating points. Helium percentages in the 75%-99% range are practical to control with current state-of-the-art mass flow controllers, sensors and control systems.

The present invention also shows optimum tube pressures which are economical to achieve, ranging from 10-100 Pa. Pressures below 10 Pa, such as 1-10 Pa, show promise in reducing drag, but move into the range of laminar flow and transition to a lower maximum speed at K limit. It is apparent, however, that even at these very low-pressure ranges below 1-10 Pa, helium shows an increase in attainable speeds and thus this operational environment will gain improvement from the addition of helium from the speed perspective. But, it is similarly interesting that the change in power requirements is very little compared to a pure air system. Thus, the range of power at 1 Pa with and without helium is only 0.5 to 2.5 kW. A light-weighted gas system does not derive much incremental advantage at these pressure ranges (1-10 Pa) in the drag/power regimes. However, top speeds do enjoy a large incremental increase of 400 kph to 1,150 kph and thus it is expected that operations below 10 Pa will also include large percentages of helium similar to the ranges at 10 to 100 Pa.

All of the previous analysis was performed with a bypass ratio of 0.489 (4 m tube diameter and 6.4 $m^2$ pod area) and showing examples of pressures and helium percentages for optimum performance. Now, a different bypass ratio is analyzed.

Figure 19:
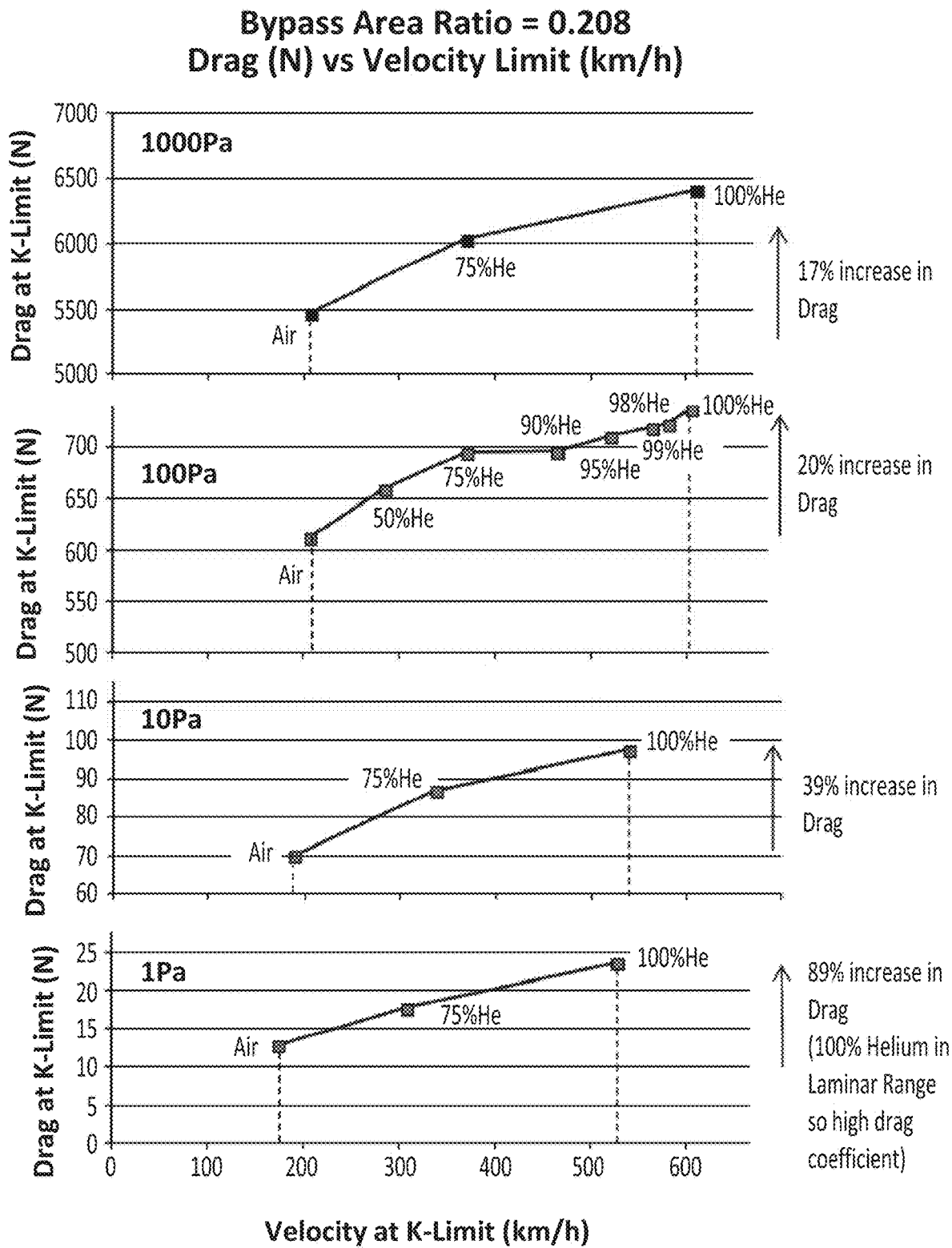
FIG. 19 illustrates a drag versus velocity graph, just as FIG. 17, but for a lower bypass ratio of 0.208.

FIG. 19 illustrates a drag versus velocity graph, just as FIG. 17, but for a lower bypass ratio of 0.208. FIG. 19 depicts a low bypass system of 0.208 (4 m tube diameter and 10 $m^2$ pod area) and its aerodynamic drag improvements due to use of light-weighted gas mixtures. The advantages of larger bypass ratio can be clearly seen in any of the above pressure graphs as the attainable speeds are more than double with the 0.489 bypass vs 0.208. Top speed will be a major advantage on long routes and thus larger bypass ratios preferred, but on short routes the speed advantage is diminished, and smaller ratios may be acceptable. Likewise, smaller bypass ratios may be relevant for low-speed cargo operations during off hours and enables the use of larger cargo capsules in the same tube. Although top speeds are reduced with the smaller bypass ratio, the advantages over pure air systems are still attained.

It is worth noting that for these two quite different bypass ratios of 0.489 and 0.208, the power requirements stay within similar ranges. The different bypass ratios impact the maximum speed more than the power. As capsule power may be limited (e.g., due to battery energy density and space available), the low bypass system will be capable of operating under such limited power, but at the disadvantage of much reduced speeds.

Figure 20:
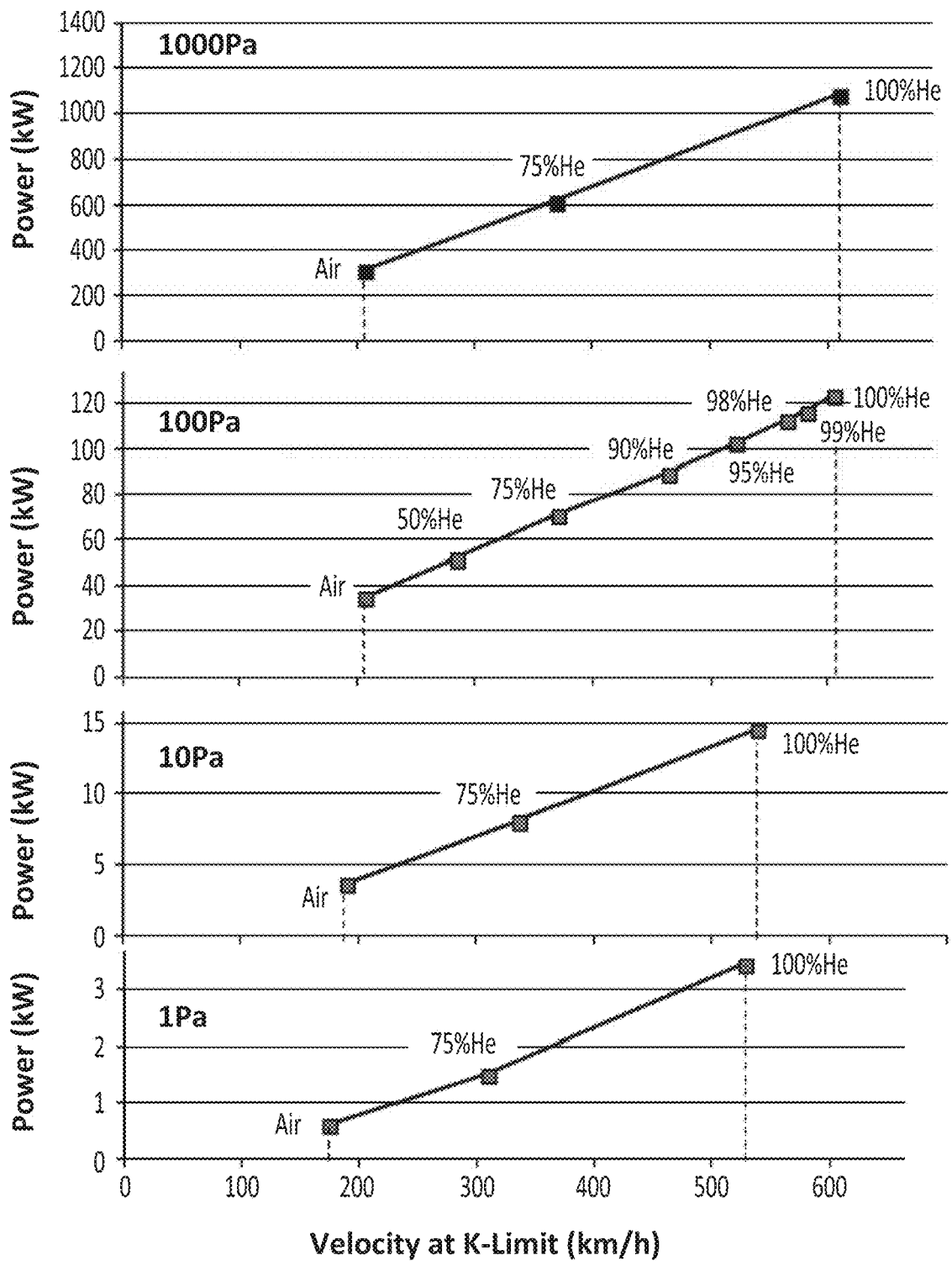
FIG. 20 illustrates a power versus velocity graph, just as FIG. 18, but for the lower bypass ratio of 0.208.

FIG. 20 illustrates a power versus velocity graph, just as FIG. 18, but for the lower bypass ratio of 0.208. Just as in FIG. 18, the power requirements may be reviewed for various pressures and various Air-helium mixtures to identify optimal operational ranges. Due the higher drag of the low ratio systems at same speeds, more power is required to attain the same speed. However, with the 0.208 bypass system, maximum speeds are still significantly increased over 100% air systems.

FIG. 21 illustrates a comparison of two non-limiting bypass ratio examples used in this disclosure, along with a sample calculation of how the bypass ratio is calculated in each instance. It should be noted that while this disclosure uses two bypass ratios, i.e., 0.489 bypass ratio for a capsule to transport humans and 0.208 bypass ratio for a cargo capsule, these ratios should in no way be used to limit the scope of the present invention, as the teaching of the present invention can be applied to other bypass ratios.

Figure 22:
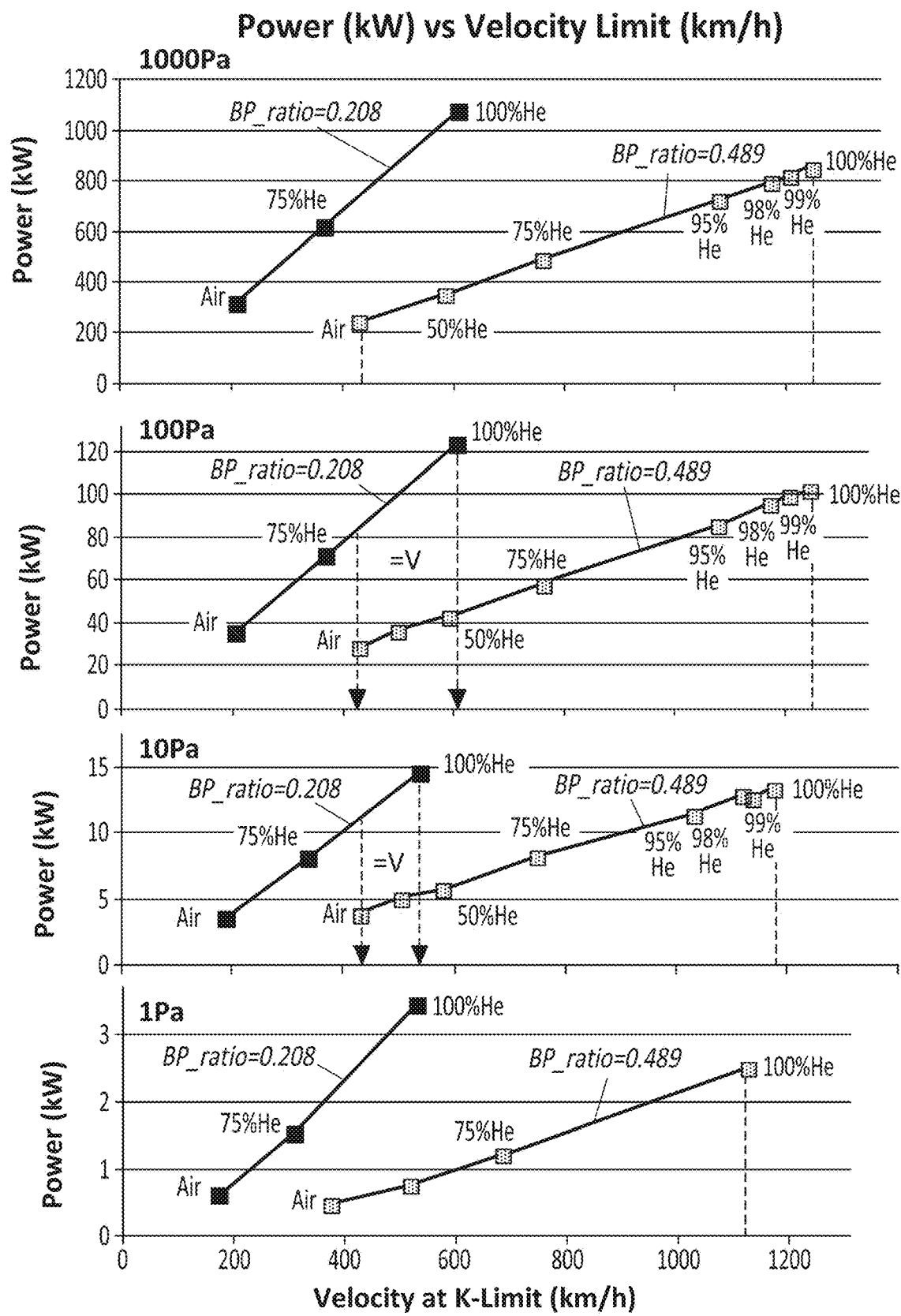
FIG. 22 illustrates helium in the low bypass system (0.208) does allow speeds compared to the high bypass (0.489) region for certain gaseous mixtures of helium and air.

As seen in FIG. 22, using helium in the low bypass system (0.208) does allow speeds compared to the high bypass (0.489) region for certain mixes, as indicated by the velocities bounded by the dotted lines in both the 10 Pa and 100 Pa graphs.

Much can be deduced about optimum operating conditions from comparing the power for the two different bypass ratios as seen in FIG. 22. First of all, the maximum speed attainable (before K-limit) with low bypass is severely reduced. Even at the lowest of tube pressures (1 and 10 Pa) it is seen that even with 100% helium, the attainable velocity is only half of the velocity with much lower He percentages that incorporate the higher bypass ratio. Second, for the smaller bypass ratio, those lower velocities are all at nearly three times the power than similar speeds utilizing a higher bypass ratio. It is, therefore, noted that optimizations of capsule-to-tube geometry, creating the largest bypass possible, result in much greater speed with much less power.

Greater system operational flexibility for speed and power is achieved by adding specific mixtures of Air and helium for either of the described bypass ratios. For lower bypass ratios (i.e., 0.208) equivalent speeds to high bypass ratios (i.e., 0.489) can be obtained as seen in the figures above between the vertical dashed arrows.

At tube pressures of 10 Pa and 100 Pa, ranges of equal speed for both bypass ratios are shown. At 100 Pa, the drag in the small bypass ratio scenario increases almost three times at the same speed, but only by adding 75-100% helium. For larger bypass, equal speeds are attainable, but with a third of the drag. Adding helium helps significantly for the small bypass system scenario (versus a pure air system), where such an addition can be leveraged for larger capsules, such as cargo types. Such addition of helium allows nearly three times the speed (when to compared to a pure air system), with only marginal increases in drag. A significant speed penalty is paid for by the smaller bypass system as the maximum speed is limited to about half of that of the larger bypass system. Using much lower pressures (e.g., down to even 1 Pa) does not overcome the overwhelming advantages of large bypass systems.

A key to putting He-Air mixtures for high-speed tube travel into practical use is narrowing the proper mixture percentages based on an economic model. That process is outlined next and identifies clearly why many higher percentages of He are not optimal, and which ranges are not even achievable.

While higher percentages (e.g., 99% or 100%) of helium are preferred, it should be noted that such higher percentages are not possible with commercial pipe construction, due to residual air leakage through welds, joints, feedthroughs, and material imperfections. The amount of air leakage does not change with tube pressure as each leak can be modeled like an orifice. In this model, each orifice follows standard gas laws and chokes at pressures drops above approximately 0.53 $\Delta P$ and will be limited to flow at sonic speeds. The choking of each orifice maintains constant flow up to a tube pressure approximately 53,700 Pa. Tube pressures in the region of 1-1000 Pa essentially creates equal air leaks. Thus, each of these orifices will contribute small amount of Air into the vacuum vessel which must continuously be pumped if base pressure is to be maintained. This continuous leakage makes achieving 100% He content impossible unless a perfectly leak tight tube can be designed. However, practical implementations of such tube-based transportation systems will suffer from the effects of these leaks, making reaching 100% helium not a practical solution.

A range of leaks that can be expected per km of tube is noted based on experience of experts in the field and under conditions seen with other large tube vacuum systems. For this patent disclosures, the upper range of 50 slm/km (standard liter per minute/km) is chosen as a worst case, and 5 slm/km a best case. FIG. 23 illustrates a table depicting volume loading at 50 slm/km by percentage of helium. FIG. 24 illustrates a table depicting volume loading at 5 slm/km by percentage of helium. Such leak rates are merely provided as examples and should not be used to limit the scope of the invention. A discussion is now presented regarding how this leak rate must be accounted for in calculating preferred helium ratios as well as ideal operating pressure.

This leak rate is directly related to methods and materials of construction of the tube, where with knowledge of such methods and materials, one can populate table in FIG. 23 or 24 with more accurate numbers. The leak rate may be calculated using standard vacuum system practices and should be measured for each part of the route. Such estimated data associated with different portions of the route is critical in estimating base tube pressures and percentages of helium that can be reasonably achieved within each portion of the route.

As seen above in FIGS. 23 and 24, with increasing helium percentages, the Added Volume column increases geometrically at constant leak rates. Very high percentages of helium require increasing amounts of injected helium where such injected amounts approach infinity as the helium requirement reaches 100%. This added volume of air/helium mixture must be pumped out to maintain required vacuum levels, and thus may load the pumps beyond their capacity. Although from earlier discussions it appears that higher percentages of helium are always preferred there is a counter trend of increasing pump loads that must also be considered.

Figure 25:
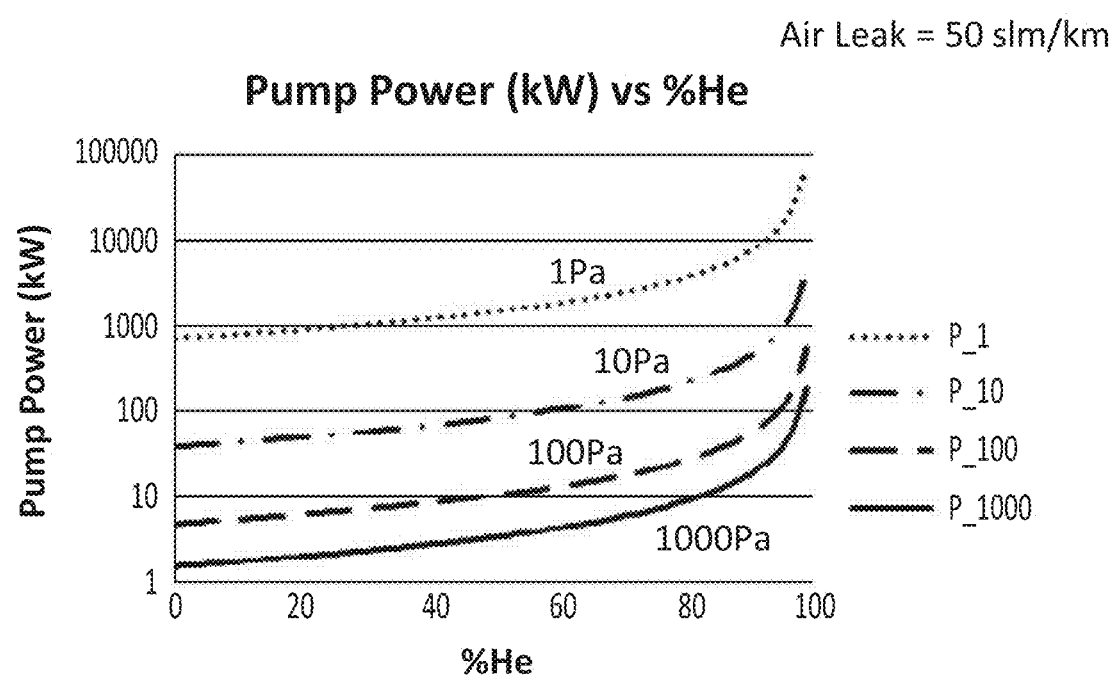
FIG. 25 depicts a graph of pump power (in kW) versus the percentage of helium for various pressures.

FIG. 25 depicts a graph of pump power (in kW) versus the percentage of helium for various pressures. As can be seen from FIG. 25, vacuum pumps are very sensitive to volumetric flow rates with power (kW), increasing in a geometric fashion at He-Air percentages beyond approximately 90%. These pumping power curves show the diminishing returns of trying to maintain high percentages of helium with respect to pumping power (kW). This deleterious effect is most pronounced at low tube pressures which is counter to the desire to operate at low pressure to reduce drag. FIG. 25 shows the negative effects of high helium percentages versus necessary pump power to maintain those percentages. More is not better. The present invention leverages this effect to achieve optimum performance within a tube-based transportation system. In one embodiment, the most economical operating percentages can be deduced when coupling this result with the power required to overcome aerodynamic drag.

There is a complex interaction of tube pressure, speed, bypass ratio, Air leakage, He-Air %, drag and pump power which heretofore has not been presented in an organized manner in the prior art. All these physical parameters constrain the ideal operating speed. Those key tradeoffs have been analyzed in several typical regimes and now can present a system and method of finding optimum operating conditions. The number of combinations is vast, but by simulation and using physical properties, while operating in typical or expected ranges of those regimes, one can formulate the most practical and economic use of a tube-based transportation system.

The present invention discloses a system and method for identifying optimum He-Air ranges based on the economics of power usage, both for pumping the tube to vacuum, and also for overcoming drag at operational speeds. Ideally, 100% He results in the lowest drag and highest speeds due to its reduced molecular size (improved speed) and lower density (reduced drag). The calculations following show that not only is 100% helium not possible.

First, particular pump curves are required to be derived for a 1 km long, 4-meter diameter steel pipe at various base pressures. These curves include an allowance for air leakage of a 50 slm of Air per km. As noted earlier, such a leakage rate is merely provided as an example and should not be used to limit the scope of the present invention. Since the basis for optimization is power consumption, the curves show the amount of pumping power required to keep the tube at constant pressure (as depicted in FIG. 25), based on a given leak rate. Different leak rates will change the graph, but the conclusion will always show that at higher He ratios the pumps must operate at higher and higher power to evacuate the increasing volume of the He-Air injected. As the percentage of helium required within the tube increases, incrementally larger amounts of He must be injected to maintain the ratio. The higher the percentage of helium, the more power the pumps require.

Figure 26A:
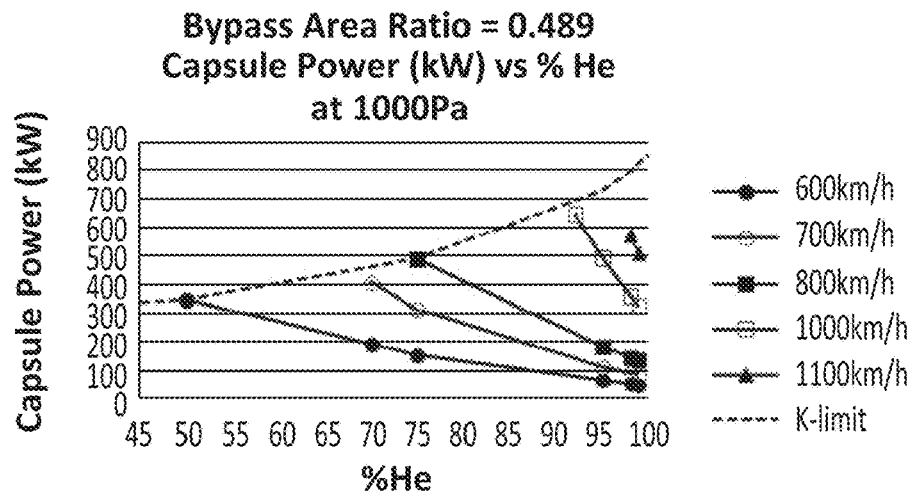
FIGS. 26A-C show a summary of power requirements (kW) to balance aerodynamic drag at a pressures of 1000 Pa, 100 Pa and 10 Pa, respectively, for various capsule speeds versus percentages of helium and Air.
Figure 26B:
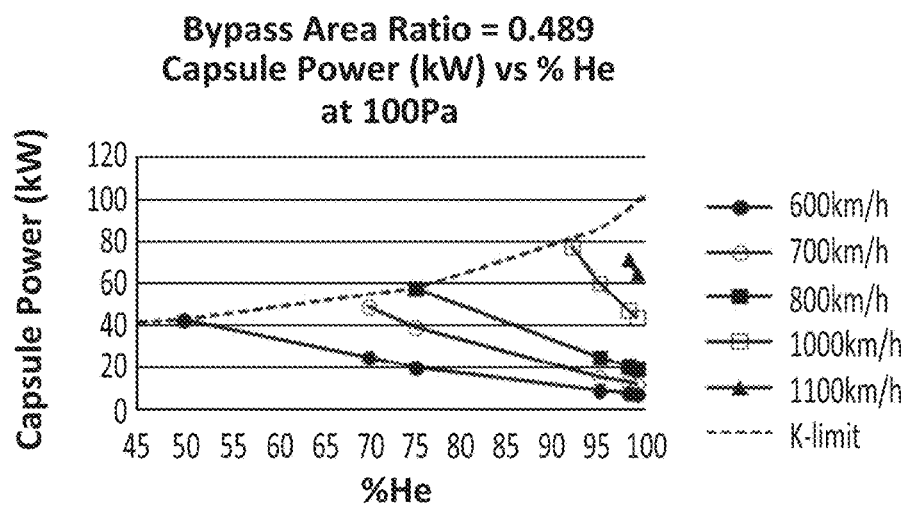
Figure 26C:
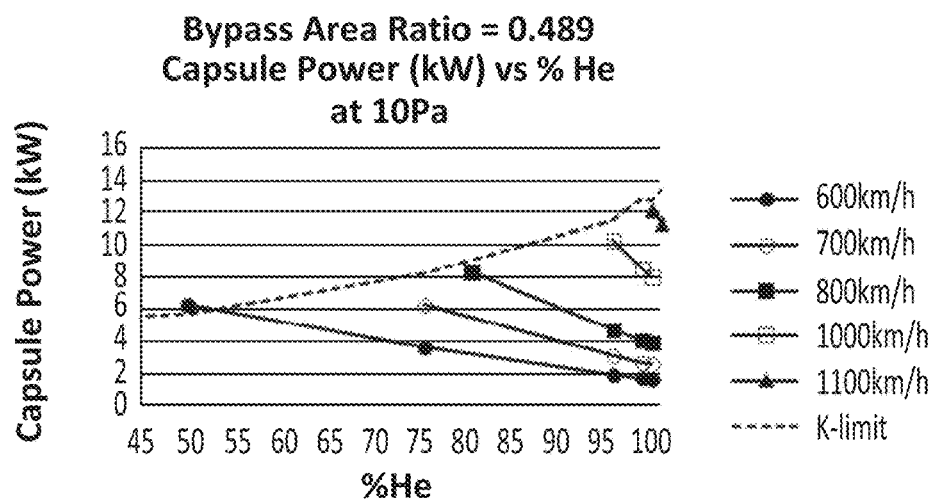
Figure 27:
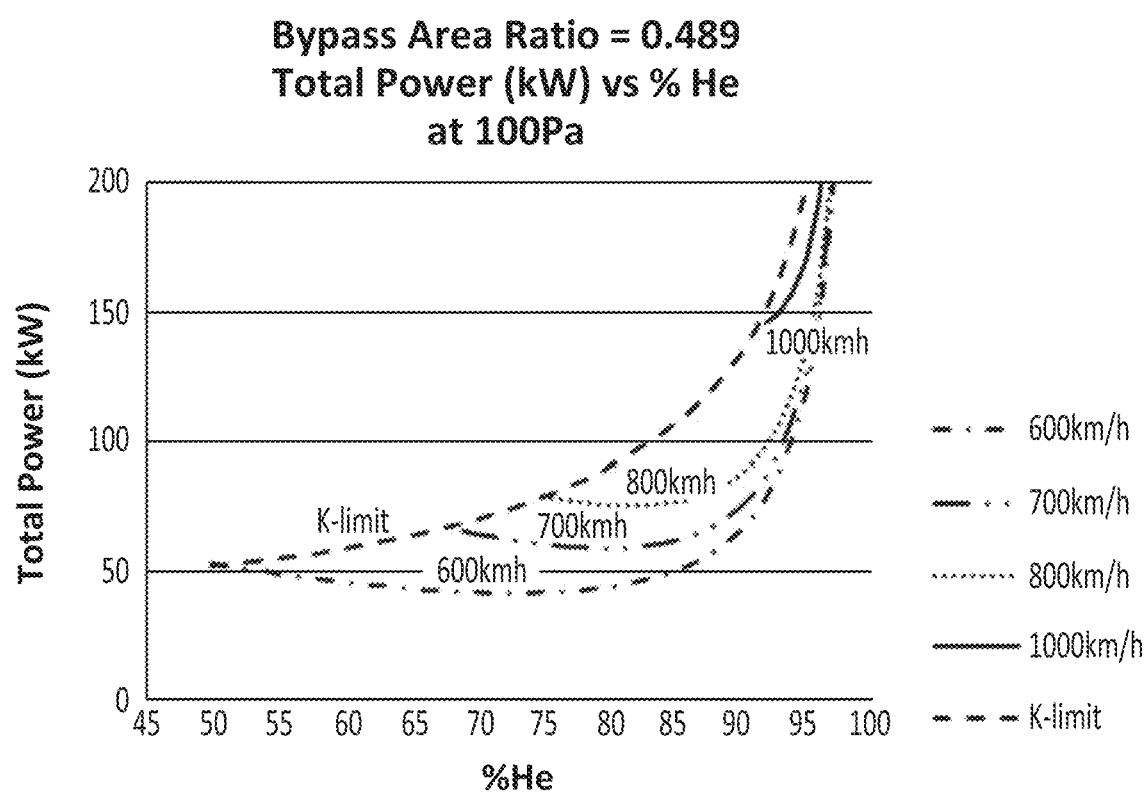
FIG. 27 depicts a graph of total power (in kW) (combining pumping power and aerodynamic power) versus the percentage of helium for various velocities at 100 Pa.

Next, the power required to overcome drag at various speed and percentages is examined. FIGS. 26A-C show a summary of power requirements (kW) to balance aerodynamic drag at a pressures of 1000 Pa, 100 Pa and 10 Pa, respectively, for various capsule speeds versus percentages of helium and Air. As noted previously, the highest speeds can only be attained with the highest percentages of helium. It is seen here that capsule/propulsion power (aerodynamic drag×velocity) is reduced significantly at the highest percentages of helium. But as shown in FIG. 25, those helium rich environments come at the cost of much added pump power. These two interactions need to be combined to formulate the least power and best operating points. FIG. 27 depicts such a combination by way of a graph of total power (in kW) (combining pumping power at a given leak rate and aerodynamic power) versus the percentage of helium for various velocities at 100 Pa.

Before continuing it may be helpful to discuss the impact of varying air leak rates on the present invention's optimization system and method. Leaks affect the pump capacity in two key areas. An order of magnitude smaller leak can allow an order of magnitude lower pressure attainable in the system. Thus, lowering the leak rate is a very efficient method of achieving lower tube pressures. The same relation is seen between pump power and leak rate as the power can be reduced (theoretically) an order of magnitude at the same pressure if the leak rate is reduced by a factor of 10. The present invention's disclosure uses a non-limiting example of 50 slm/km air leakage, but the specific air leakage number should not be used to limit the scope of the present invention. However, it should be noted that the teachings of the present invention may be applied to another leak rate, e.g. 5 slm/km, without departing from the scope of the invention.

Figure 28A:
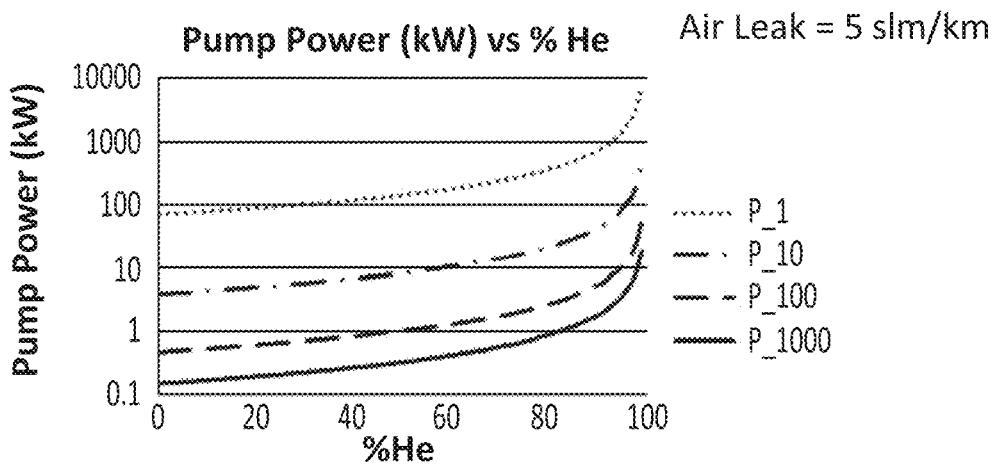
FIGS. 28A-C depict a non-limiting example, where the same analysis as FIGS. 25-27 is performed for a leak of 5 slm/km.
Figure 28B:
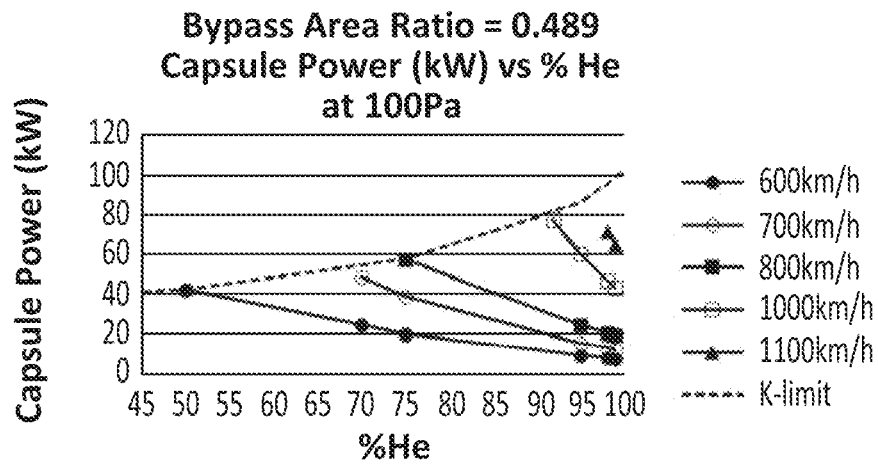
Figure 28C:
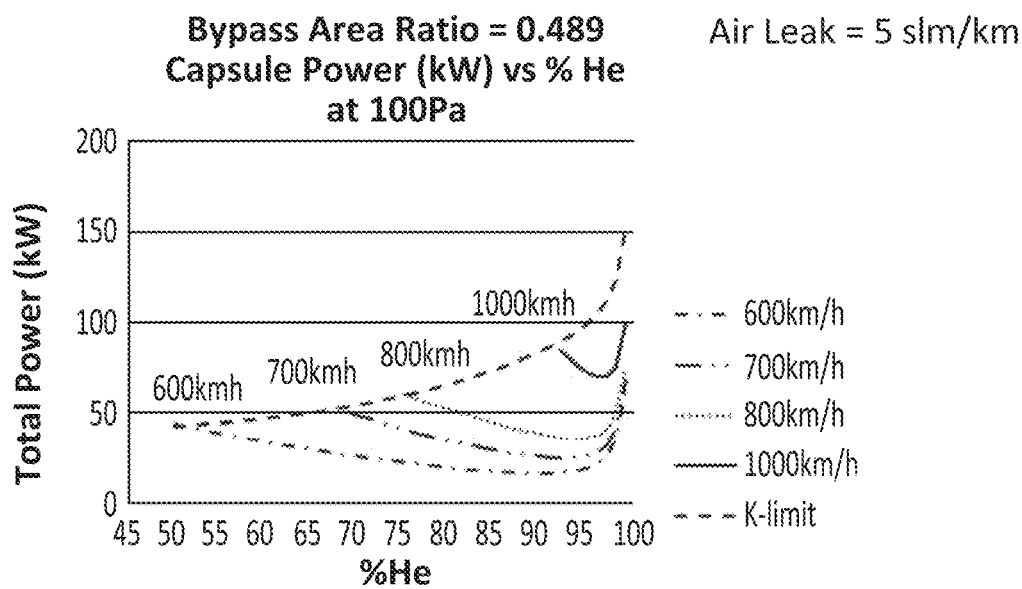

FIGS. 28A-C depict such a non-limiting example, where the same analysis as FIGS. 25-27 is performed for a leak of 5 slm/km. FIG. 28A depicts a graph of pump power (in kW) versus the percentage of helium for various pressures for an air leak of 5 slm/km. FIG. 28B depicts a graph of the capsule power (in kW) at 100 Pa. Since capsule power is not dependent on leak rate this is the same as graph FIG. 26B previously shown. FIG. 28C depicts a graph of total power (in kW) (combining pumping power and aerodynamic power) versus the percentage of helium for various velocities at 100 Pa for an air leak of 5 slm/km. These calculations for the 5 slm/km leak rate validate the effect on the optimization model.

It should be noted that graphs depicted in FIGS. 25-27 relate to a bypass ratio of 0.489 but, similar, but smaller effects, may be obtained for bypass ratios lower than 0.489. The basis of the method is to separate the various inputs, look at the effect of He-Air mixtures on those inputs, then to combine the inputs into a simple graph showing ideal operating conditions. The graphs shown in FIG. 27 summarize results presented in FIGS. 25-26A-C by combining them to allow finding the optimum helium-Air percentages. These are done for expected velocities with pressure of 100 Pa and 0.489 bypass ratio, including as assumption of a 50 slm/km leak.

The graphs in FIG. 27 depicts fairly flat power requirements at 600, 700 and 800 km/h up to 90% He mixtures. Looking closely at the graph in FIG. 27 (and using the data behind the graph to identify more precisely), it is seen that 75%-85% helium in the tube appears acceptable. An operator would not want to operate at 75% He and 800 km/h, however, as there would be very little safety margin before reaching the K-limit and ensuing shock in the bypass area.

Figure 29:
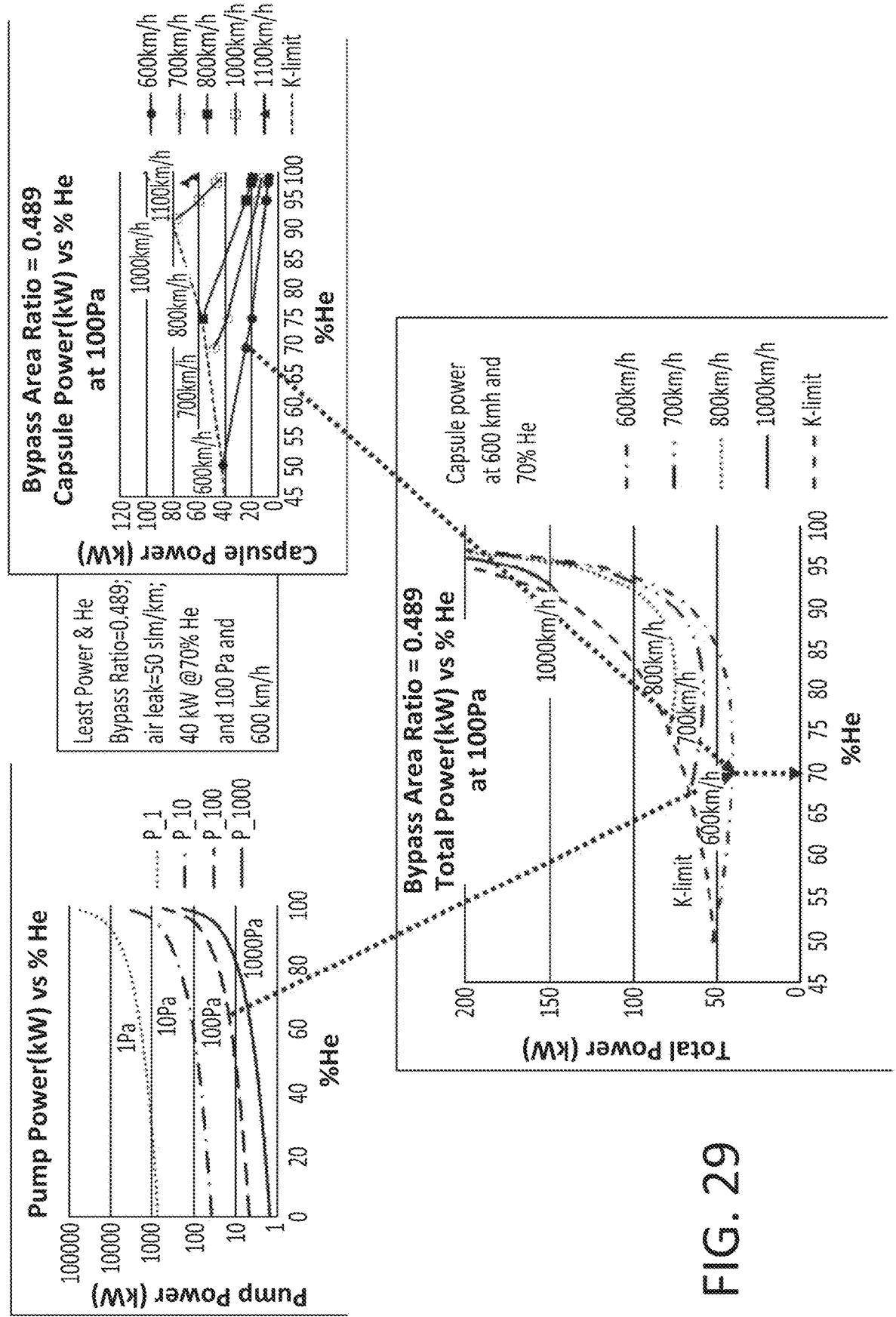
FIG. 29 illustrates how the graphs depicted in FIGS. 25-27 may be combined to provide optimum operating points for power (cost) and helium-air ratios.

FIG. 29 illustrates how the graphs depicted in FIGS. 25-27 may be combined to provide optimum operating points for power (cost) and helium-Air ratios. FIG. 29 shows an optimum helium operating point at 600 kph based solely on power requirements—least cost per km for tube pressures of 100 Pa for this set of speeds. This could be considered the most economic (or eco mode) at that pressure and set of speeds. The same optimization can be done at 700 kph requiring 80% of helium and 20 percentage of Air, with nearly 50% more power expended, but resulting in shorter transit times by 17% (based on increasing the speed from 600 km/h to 700 km/h). We see nearly a maximum operating speed of 1,000 kph requiring over three times the power when compared to 600 kph (145 kW vs 40 Kw), and requiring a 90% helium and 10% air mixture, but which will result in reducing transit times by 67% (based on increasing the speed from 600 km/h to 1,000 km/h).

The restrictions of operating at 1,000-1,100 km/h can be identified by witnessing the need for vastly increased power while also being very sensitive to small changes in the helium-air mixture. While these very high speeds are achievable for this condition, bypass ratio, and pressure, such high speeds may not be not ideal. A practitioner would prefer to reduce the tube pressure or increase the bypass ratio if they wanted to safely and reliability operate in that region. It should be noted that while FIG. 29 is provided merely as an example for specific pressures, velocities, and bypass ratios, similar graphs can be created for other pressures, velocities, specific geometries, to derive the optimum conditions for other operating points in a similar manner.

It is seen that helium concentrations in the high range are desirable but come at a higher cost with respect to power. Also, in one embodiment, the present invention envisions maintaining, or creating, ideal helium-air ratios from both a safety and profit point of views. In the described examples, power consumption has been used as an analog for profit, however, there are several operating power points which may be chosen depending on the motives of the operator. For example, minimum power does not occur at maximum speeds, and thus lengthens the trip time. Some operators (military, medical transport, etc.) may choose the 'optimum' power to attain maximum speeds. The methods as per the present invention identify what percentages of helium are required to achieve such maximum speeds. On the other extreme is operation at minimum power which provides the longest capsule battery life and allows longer routes where trackside power is not available. There will often be a mid-power range, an 'affordable' power that allows some higher speed operations but still allows increase in the route length. Route calculations rely on the length, curvature and elevation changes within the route and the source of propulsion power. Differing motives of operation will dictate what percentage of helium is ideal based on the route and whether operating at 'optimum', 'minimum' or 'affordable' conditions.

In order to optimize for this embodiment, one needs to focus not only on helium percentages, but also on the helium distribution in the tube, and methods to control such distribution. Similar optimizations can be done for 1-1000 Pa and large to small bypass ratios using examples as shown earlier. Power requirements for all combinations of pressure, bypass ratio, leakage, air-helium percentages and velocities can be computed based on the teachings of the present invention. In one embodiment, this process is fully automated with software, whereby optimum speeds and helium-air ratios are quickly determined. As compared with the effort to: change the capsule or tube size (which affects bypass ratio), increase the number and size of vacuum pumps (to reduce pressure), add a compressor to the front of the capsule (to improve bypass ratio), or change tube construction methods (to reduce air leakage), the process of adding helium to the tube is certainly a very cost effective and simple method of improving tube-based transportation system performance. Using helium to optimize improves both capital and operational economics. Using these new techniques, identifying and operating in these optimum spots, and even varying the percentage of helium based on changing operations (passenger vs cargo), can be automated and implemented during daily operations.

It is seen that the percentage of helium is a major determinant of maximum speed and least power along with bypass ratio, air leakage, and tube pressure. Thus, the distribution and percentages of the light-weight gas within the length of the tube is an important consideration to maintain these advantages. The ability to maintain that percentage of helium and homogeneity within the tube is important to achieving these advantages. However, we also see that much higher percentages of the light-weight gas are sometimes desired or required. Different portions of a route may be speed constrained due to curves, stations, elevations changes, etc., while other portions of the route will allow maximum speeds. A homogeneous mixture must be attainable, but there several conditions under which the most helium rich mixture economically attainable is preferred, such as high-speed sections of the route. Methods of achieving both homogeneous and enriched He atmospheres are described below.

A description of the technologies that enable to maintain a homogeneous, or light-weight enriched, mixture of gases in the tube is provided.

First, consider some standard components of the transportation system:

1. The vehicle which carries passengers or cargo
2. The tube that guides and encloses the vehicles
3. The pump that maintains low pressure in the tube and compensates for Air leaks (from atmosphere to the tube)

The present invention proposes additional components to create and to maintain a homogeneous mixture of gases and additionally how to improve some tube areas resulting in increased local percentages of light-weight gases.

A list of components necessary to achieve the system is given below:

1. A source of gas (other than air)
   a. One or many gas tanks integrated on the tube side, distributed along the tube length whose position may be determined by the capsule speed in that tube location,
   b. A series of pipes connected from the gas sources to the tube sides, with injection points distributed along the tube length whose position may be determined by the capsule speed in that tube location,
   c. One or many gas tanks in each vehicle or in some vehicles, located at known critical geometry locations on the capsule which are most prone to shock or disturbances from high speed flow surrounding the capsule. These specifically are near the nose such that light-weighted gas concentration can be increased as the flow begins its movement over the capsule body, along the capsule body at points where flows are near the critical K-limit, near the tail to reduce shock waves and instability created therein, and finally at the tail to increase the gas concentration in preparation for any following capsule.

2. A system to inject light-weighted gases that is comprised of a valve, regulator, mass flow controller, electronic controls and injector nozzles located in any of several locations within the hyperloop system. This system is under control of the operations control center which is continuously monitoring gas concentrations within the tube and supplying commands to the injection system on proper amounts to inject in order to maintain optimum gas ratios.

3. A system to recycle gas. A system integrated into the pumping system, which separates light-weighted gases from the air/gas mix, so that they are not exhausted to atmosphere but are recycled back into the tube. This is comprised of an air separation unit or membrane style gas separation unit which takes the vacuum pump exhaust from the tube and separates out the light-weighted gases for recycling into the gas injection system or to a storage system for future use when the preferred gas ratio is out of balance.

4. A system to monitor gas pressure and gas concentrations including gas sensors, a data feedback and logging function plus a data control system.
   a. A network of pressure transducers and gas concentration transducers integrated along the tube and/or in the vehicles.
   b. The output from these transducers is sent to the OCC unit which uses software algorithms to compare measured vs ideal concentrations and responds with control outputs to the gas injection system.
   c. The gas control system further has optimization routines to provide closed loop control of required gas concentrations and homogeneity based on sensor output.
   d. Off the shelf gas type sensors may be used, where they could be located on the capsule, at points along the tube, or on the vacuum piping at the pump stations. Their output would be directed toward an Operations Control Center (OCC) to track deviations from ideal, changes to perform by gas injection equipment, and results of those changes.

It should be noted that the actual implementation can be as modular as possible, to combine a plurality of the aforementioned components.

The methods used to place the preferred gases into the tube is an area to optimize. Multiple methods are envisioned for filling the tube with these gases. Individual and/or combined methods such as injection through the tube wall, injection from the capsule, from valves placed onto the tube or tube attachments, from the capsule, or potentially from the vacuum pumping system all are viable methods.

Injecting the small diameter gas through various critical points in the capsule has some potential significant advantages to enrichen the helium content in localized areas around the capsule to reduce shock waves, turbulence, and possible capsule instability due to these factors. It can also be surmised that capsules in the tube behind a lead injecting capsule may benefit significantly by these same factors. Such a method of optimized capsule shell injection is another advantage of the present invention.

One important challenge is to compensate for Air leaks, coming from the atmosphere. Air leaks tend both to increase the tube pressure and to change the concentration of gases (increasing the concentration of air). At these vacuum levels, there are conventional air leak rates that have been identified for welded steel piping. As mentioned previously, the estimate from one expert in this science, Leybold Vacuum, is a rate of 45 standard liters per minute based on a 4 m diameter tube of 1 km length. Thus, achieving a 100% helium filled tube is not practical using accepted fabrication and materials. Comparing that leak rate of 45 slm/km (0.05512 kg/km) to the volume of helium in the tube provides a qualitative answer to the level of helium purity attainable.

Fortunately, there is no leak of gases escaping from the tube to the atmosphere because the tube pressure is so low compared to atmospheric air. The only way the gases can leave the tube is due to the pumping system that pumps the tube fluid to decrease its pressure. At the same time, it removes the gas from the tube.

One must carefully design the whole system so that the gases can be recycled and re-injected in the tube, as needed. For example, a gas separator can be coupled to the pumping system. It would separate air and re-inject the recuperated gas. Concerning the previous example of helium, there exist Air/helium separators on the market, although today their practical applications are limited.

Novel methods of capturing the vacuum pump exhaust and separating out the smaller diameter gases through typical air separation units or other types of separation could be used to recycle the gas back into the tube and are also envisioned as part of the present invention.

Additionally, there are certain methods to introduce the gas into the tube that are preferred, such as to evacuate the tube and refill it partially with the preferred gas. Several repetitions of this pump and backfill can be done until the percentage of preferred gas or gas mixture is at the proper level. Such methods are also envisioned as part of the present invention.

Mixture homogeneity is another challenge. Homogeneity can be ensured by the uniformly spaced reservoirs of gas, or gas tanks. Homogeneity can also be ensured by the motion of the vehicle, possibly creating vortices and/or turbulence in their wake that mix the gases.

Figure 30:
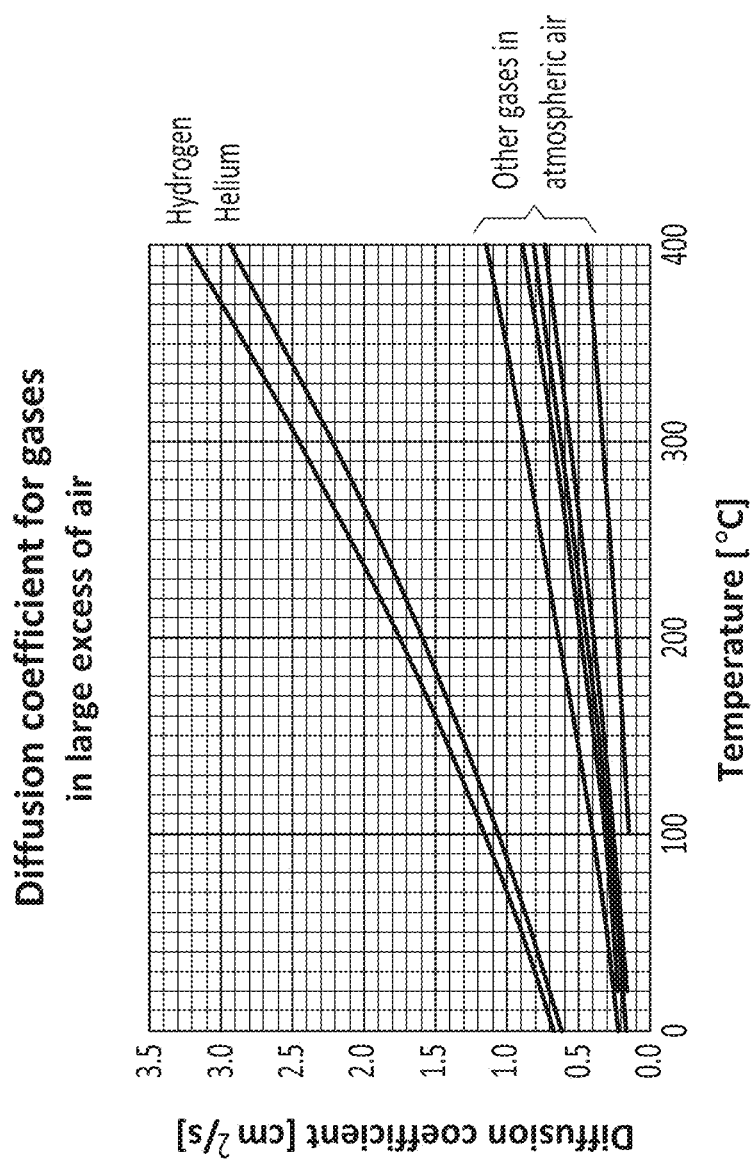
FIG. 30 shows a graph of the diffusion coefficients for various gas in air.

Lastly, the diffusion coefficient is a good indicator of the ability of a gas to mix into air. The diffusion coefficient of a gas in air is the capacity of a gas to homogenize in still air, without stirring or turbulence. FIG. 30 depicts a graph of the diffusion coefficients for various gas in air (source: Engineering Toolbox website). FIG. 30 shows that light-weight gases, such as helium and hydrogen, have much higher diffusion coefficients in air than other gases. At ambient temperature, helium has a diffusion coefficient almost four times higher than methane or water vapor with hydrogen being slightly superior. This makes helium and hydrogen the best candidates to obtain and maintain a homogeneous mixture within the tubes.

Figure 31:
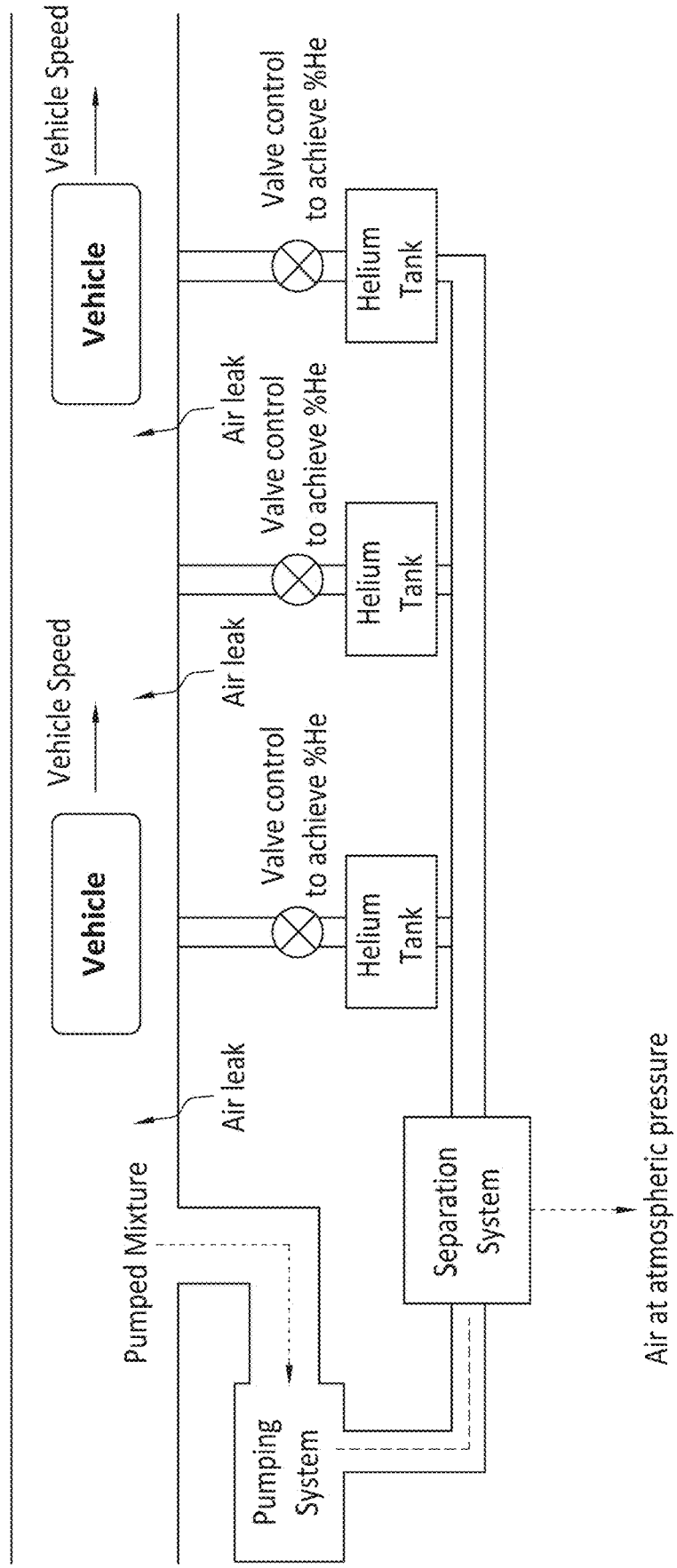
FIG. 31 depicts a first implementation that includes a set of helium tanks uniformly fitted along the tube length, where helium is injected with controlled valves that open or close to maintain the desired level of helium.

Described below are two possible implementations of a tube with helium/air mixture. FIG. 31 depicts a first implementation that includes a set of helium tanks uniformly fitted along the tube length, where helium is injected with controlled valves that open or close to maintain the desired level of helium. The pumping system is linked to a separator system that removes air and re-injects helium in the tank. For a system without losses, the helium that left the tube because of the pump is constantly refilled in the tank.

Figure 32:
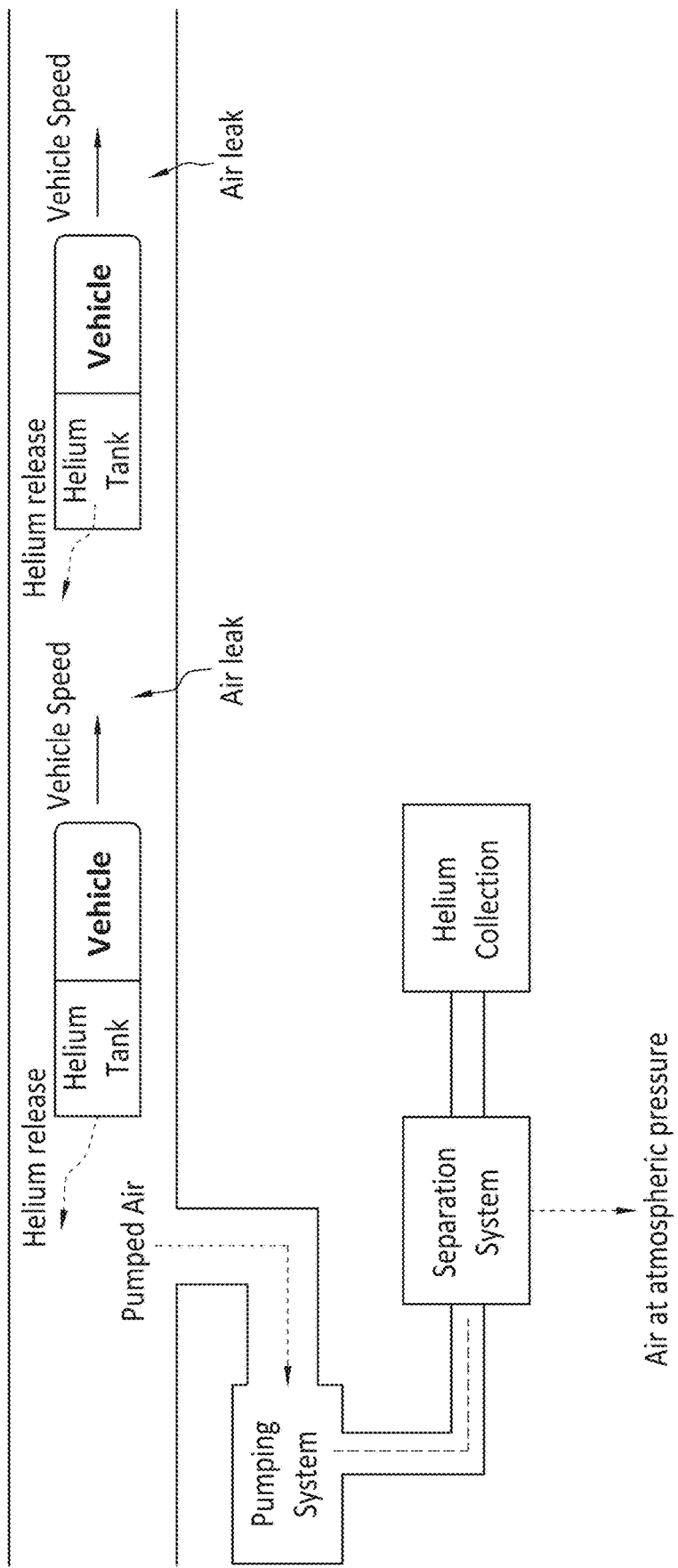
FIG. 32 depicts a second implementation that includes helium tanks embedded in the vehicles.

FIG. 32 depicts a second implementation that includes helium tanks embedded in the vehicles. The tanks open helium release via command control. The helium can be released in the wake of the vehicle, taking advantage of the vortices for good mixing. The helium tank can be filled when vehicles are docked. Helium is collected by the separation system integrated in the Pumping System.

Figure 33:
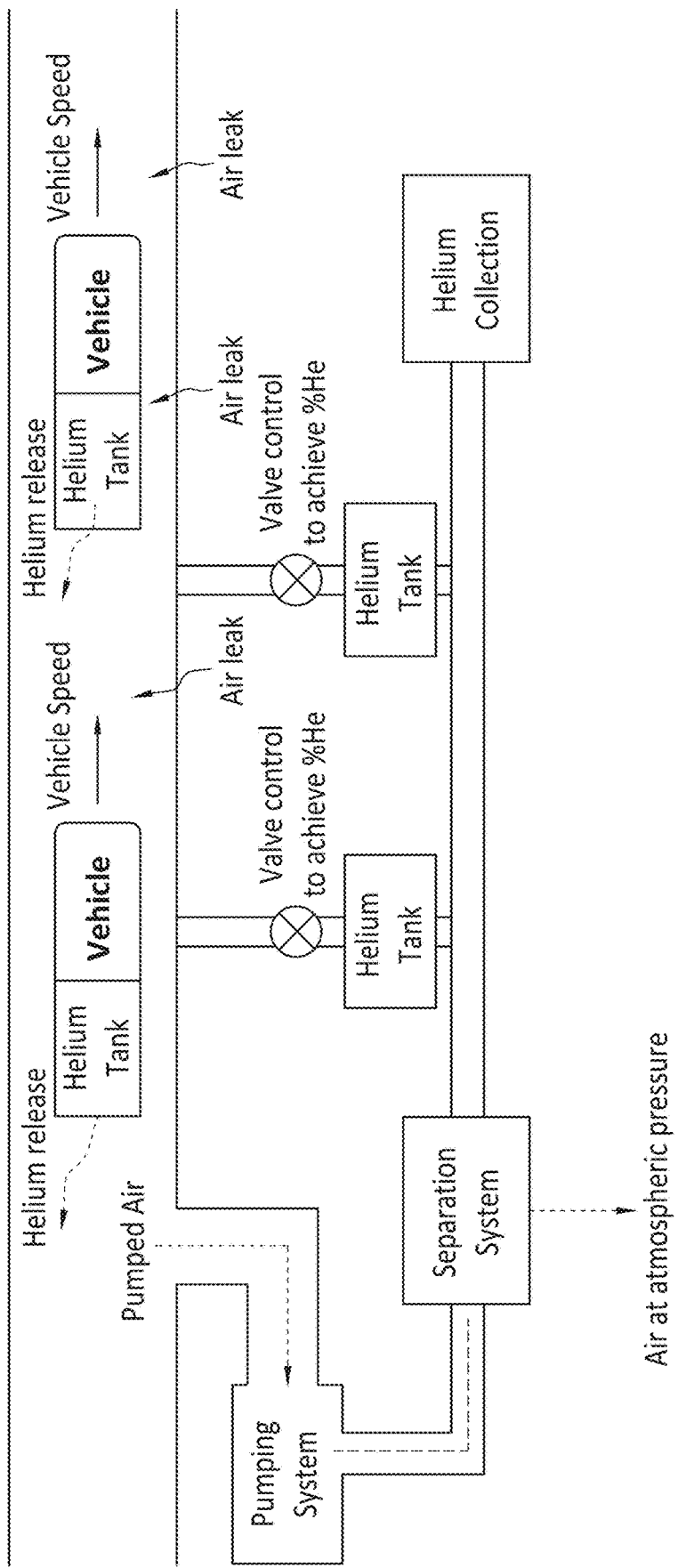
FIG. 33 depicts an approach that combines the approaches of FIGS. 31 and 32.

Since the present invention's approach is modular, it is possible to combine the first and the second implementations to get a third one with helium Tanks, both along the tube and in the vehicles. FIG. 33 depicts an approach that combines the approaches of FIGS. 31 and 32.

The embodiment depicted in FIG. 31 involves injection of the gases or mixtures directly into the tube via ports connected to mass flow controllers and valves, supplied by gas lines or compressed gas bottles, to precisely control the amounts of each gas introduced. The amount will be dependent on analysis of the gases within the tube and controlled by the Operations Control Center (OCC). The spacing of these injection points needs to be engineered. It may be that injecting He into the tube just in front of the moving capsule will aid the capsule aerodynamics. Injecting He, such that its percentage is very high as the capsule approaches the injection point could aid in reducing shock waves and in reducing drag.

The embodiment depicted in FIG. 32, i.e., capsule body injection, uses, in one embodiment, compressed gas bottles inside the capsule to inject the gas or gas mixture in front, along the body, at the rear or a combination of points along the capsule. This design would more precisely inject the gases to areas most susceptible to drag and shock around the capsule.

The embodiment depicted in FIG. 33 combines the teachings of the embodiments depicted in FIG. 30 and FIG. 31.

The present invention overcomes the pitfalls associated with the prior art by using a mixture of air and hydrogen (in various ratios to be described later) to modify the fluid properties such as speed of sound, which enables reaching high vehicle speed at acceptable propulsion power. Advantages of using a mixture of air and hydrogen include obtaining different fluid properties, such as, reduced density, higher speed of sound and higher free molecular path. These different fluid properties can substantially reduce the drag on the vehicle and the propulsion power needed.

It should be noted that having a lower density (by a factor of over 14) has a substantial and direct effect on drag and propulsion power. Drag is directly proportional to density (and any means to reduce density is useful in a tube-based transportation scenario), which is why aircraft fly at high altitude (low density) and which is why low-pressure tubes are considered (low density). The present invention notes another way to reach low density, i.e., by using light gases instead of standard air. In addition, the present invention goes further than just reducing density because it also takes advantage of higher speed of sound and higher free molecular path as possible ways to counter the Kantrowitz limit.

The present invention discloses mixing different gases that are lighter than air, where these gases have smaller molecular diameter. There are numerous gasses which meet the requirement of a gas molecule smaller than air. The subject of this patent application is the use of hydrogen, which has attractive properties that can be exploited in tube-based transportation systems. While, the air in the tube could be replaced completely by hydrogen, this could be hard to achieve. Instead, the present invention discloses using a mixture of air and hydrogen in various ratios (which is discussed in detail later in this patent application), which still has interesting properties, while also providing an implementation at a lower cost (when compared to previously described prior art systems and when compared to equivalent systems that use just hydrogen).

It must be noted that the cost associated with replacing the air completely or partly by other gases may be reasonable. Since the pressure is low, about 100 Pa in standard applications, the amount of injected gas in the tube should remain low. Table 6 below shows the mass of gas in the tube for a mixture of air and hydrogen at different percentages.

TABLE 6

| | Length of Tube | 10 km |
|---|---|---|
| | Diameter of Tube | 4 m |
| | Pressure in Tube | 100 Pa |
| | Temperature in Tube | 20° C. |
| Mass of Gas | Tube filled with air | 150 kg |
| | Tube filled with hydrogen | 10.4 kg |
| | Tube filled with (17% air; 83% hydrogen) by Volume corresponding to (75% air; 25% hydrogen) by Mass | 34 kg = 25 kg (air) + 9 kg (hydrogen) |

Table 6 demonstrates that the amount of hydrogen to be injected in a 10 km tube is low, whether considering pure hydrogen or a mixture of hydrogen and air. At 100 Pa, the entire 10 km tube could be filled with pure hydrogen at current cost of less than $150 (~$14.00/kg H2). However, it is not possible to maintain a 100% hydrogen content in a large welded tube due to leakage of air from outside the tube. It is the intent of this art to define optimum percentages of hydrogen and air which reduce drag in the tube.

Some of the advantages of the present invention are listed below. Gases that are lighter than air have a lower density, a higher speed of sound, and higher free mean path. This offers at least three advantages, simultaneously. The first advantage is the possibility of significantly reducing the density of the gas. Since drag is proportional to the density, a reduction of the density of the gas directly impacts the drag. Table 2 (as shown in FIG. 7) shows the density at atmospheric pressure for usual gases, extracted from the website (Source: Engineering Toolbox website).

As previously discussed, Table 2, as shown in FIG. 7, depicts the distinguishing features of lightest weight gases, of which helium and hydrogen have the lowest densities. Hydrogen has a density fourteen times lower than air at atmospheric pressure. This ratio is the same in a tube pressure of 100 Pa, which means that drag can be expected to be reduced by a factor of about fourteen. This is a major advantage that goes to the root of high speed transportation: reducing drag by reducing density.

Also, as noted previously, replacing a portion of the air by a lighter gas offers two possibilities:
 either benefit from lower density at the same environmental pressure (therefore reducing propulsion power);
 or
 operate at higher environmental pressure and achieve equal density (therefore reducing the pumping power).

Hence, smaller diameter gases are of less density, which reduces the drag on the capsule. The use of a combination of air and hydrogen (in specific, predetermined proportions, as will be detailed later) allows higher capsule speeds, reduces vacuum pump size and cost. Such a combination of gases provides a significant improvement in high-speed tube-based transportation technology and will reduce costs, and improve economics, and commercial viability.

As noted earlier, another advantage is the possibility to increase the speed of sound. As shown in above section, a high speed of sound allows a higher vehicle speed without choked flow. The speed of sound for a gas is given by EQN. 2 provided previously in the disclosure:

$$c_{sound} = \left(\gamma \frac{R_{gas}}{W_{gas}} T\right)^{0.5} \quad (EQN. 2)$$

where γ is the specific ratio, $R_{gas}$ is the gas constant (8.3145 J/kg/K), $W_{gas}$ is the gas molecular mass (kg/mol) and T is the temperature of the fluid. From EQN. 2, the speed of sound can be increased by changing the molecular mass. In particular, a lightweight gas has a high speed of sound.

Table 3, discussed previously and as shown in FIG. 8, lists the speed of sound entries for various gases (Source: Engineering Toolbox Website.

From Table 3, it is seen that the lightest weight gases stand out in terms of their speed of sound entry. Helium and hydrogen have the highest speed of sound. Helium has a speed of sound three times higher than air while hydrogen has a speed of sound four times higher than air. For the purposes of this patent application, it is preferred to use Hydrogen in the tube as it allows the highest speed of sound with lowest drag. However, issues with safety surrounding the flammability of hydrogen-air mixtures must be considered if this solution is to be considered safe enough for operations. A basic approach to limiting risks with hydrogen-air mixtures will be presented later in this disclosure. More detailed studies are in progress which present methods that can be commercially implemented for safe operations with such mixtures.

Referring again to the example from the previously described paper to Chin et al. (2015), it was shown that in a tube filled with air, maximum vehicle speed occurred around Mach 0.25, i.e. 300 km/h for air. Since hydrogen has a speed of sound nearly 4 times higher than air (3.90 to be precise), Mach 0.25 in hydrogen corresponds 1170 km/h. The present invention, therefore, provides a substantial gain, by only changing nature of the gas, and without modifying anything else in the tube or the capsule design.

Referring to the same example, consider now a mixture of air and hydrogen in the tube, which might be more easily obtained. The speed of sound of the mixture can be calculated using EQN. 3 provided previously, and shown below:

$$c = (R_{mix} \gamma_{mix} T)^{0.5} \quad \text{(EQN. 3)}$$

where $R_{mix}$ is the specific gas constant of the mixture, $\gamma_{mix}$ is the specific heat ratio of the mixture, and T is the Temperature. For a mixture of (17% air; 83% hydrogen) by volume, which corresponds to (75% air; 25% hydrogen) by mass, the speed of sound is 664 m/s, which is twice the speed of sound in pure air. Referring to the example in Chin et al. (2015), the maximum speed of Mach 0.25, which was 300 km/h in air, now, based on the teachings of the present invention, becomes 600 km/h in the above noted mixture of air and hydrogen. This gain is obtained without any other change in tube or capsule design.

As noted earlier, a simpler way to look at this makes the solution easier to understand. The Kantrowitz limit occurs when gas flowing around the capsule becomes choked, i.e., at a speed of Mach 1. Mach 1 for air is 331 m/s at standard temperatures. Smaller molecular gases have higher Mach numbers which allow them to flow much faster before choking. The capsule will not be subject to choking flows until the preferred, and much higher Mach speed is reached.

Thus, smaller molecular diameter gas allows higher speeds before going into the sonic region. The geometry of the capsule and tube will still determine when choking occurs, but in the case of air it occurs at the relatively low speed of 331 m/s. By switching to a gas or mixture of gases with much higher Mach speeds, such as 972 m/s for helium, and 1,290 m/s for hydrogen, much higher capsule speeds can be attained before choking occurs. It is noted that the capsule does not avoid the K-limit, but the speed at which the K limit becomes a problem is increased.

Lastly, also as noted earlier, another advantage is the possibility of increasing the free path of the gases. If the mean free path is large enough, the assumption of fluid continuum is no longer true, and the fluid must be treated by molecular flow theory. As explained above, this opens the possibility that choking phenomena do not exist because the physics becomes different.

Also, as previously noted and as discussed with regards to EQN. 4, the Knudsen number is used to estimate whether the gas can be treated as a continuum or as a molecular flow. Continuum is true if Kn<0.001, and molecular flow is true for Kn>0.01. In between, a transition region occurs, which can also be interesting.

$$Kn = \frac{\lambda}{L} \quad \text{(EQN. 4)}$$

The Knudsen number compares to the mean free path, λ, of the molecules and the vehicle characteristic size L (length or diameter). Hence, molecular flow region can be attained by increasing the mean free path.

Also, as previously discussed, the mean free path is given by the previously noted EQN. 5:

$$\lambda = \frac{kT}{\sqrt{2\pi P d_m^2}} \quad \text{(EQN. 5)}$$

where k is the Botzmann constant, P is the pressure, and d is the molecular diameter.

From EQN. 5, it is seen that an increase in the mean free path is obtained by reducing the pressure, P, or reducing the molecular diameter, $d_m$.

As noted earlier, a key insight comes from rearranging the basic Knudsen equation (i.e., EQN. 4). A pressure term appears in the denominator of EQN. 5 and one can look directly at what pressures are required to create a Kn number in the molecular range. Suitably low numbers of pressure do create a large Kn number and lead us to the conclusion that pressure is again a suitable path to finding the operating region in which K-limit becomes insignificant.

Also, as noted earlier, a more effective Kn number increase can be derived not from just lowering the pressure, but rather from changing the diameter of the gas molecule, $d_m$, in the denominator of the expanded free mean path (EQN. 5).

Previously, it was explained that to achieve molecular flow, the pressure had to be reduced below 1 Pa for a tube with air. This demands very large pump power to achieve such low pressure. Instead, by using a gas with smaller diameter (light-weight gas), it is possible to increase the mean free path. Table 4 depicted in FIG. 9 shows the mean free path for different molecules (Source: Pfeiffer-Vacuum website).

From Table 4, in FIG. 9, it is seen that hydrogen has one of the higher mean free paths, about 1.7 times higher than air. This means that it is possible to reach the molecular flow region with a higher pressure, about 1.7 times higher than if it were air. Hence, in the present invention, the pump requirement to achieve molecular flow is significantly reduced.

Computational Fluid Dynamics (CFD) Simulations with a two-dimensional configuration of the Tube Transportation System were performed. The configuration is 2D planar. It is an approximation of the reality which is 3D. Still, it gives a useful insight on the dependence of the drag on vehicle velocity and on gas. The 2D planar CFD provides drag coefficient at different vehicle speed. These drag coefficients can then be used to estimate the actual drag on the 3D actual capsule. Both drag coefficient and estimated drag on 3D actual capsule are presented.

The schematic of Chin et al. (2015) shown in FIG. 1 was used and a view of the 2D mesh used in the present simulations is depicted in FIG. 10. The tube is 4 m diameter and the Bypass-to-Tube-Area Ratio is about 0.489. These numbers are similar to the previous study from Chin et al. (2015). However, in stark contrast to Chin et al. (2015), the present invention operates at a pressure of 100 Pa, with a mixture of air and hydrogen. Note that the operating density of hydrogen is about fourteen times lower than air. Hence, a reduction of drag is expected by a factor of 14.

FIG. 34 depicts a table which lists the density by mass figures for both air and hydrogen at 100 Pa. As mentioned previously, the reduction in density of over fourteen times (1.225/0.0846) reduces drag in a similar ratio (i.e., fourteen times). This advantage holds true at differing pressures in the continuum range. (Note: Due to round off errors the bypass ratio is sometimes shown as 0.488 or 0.489)

In the results below, both the drag coefficient and the estimated drag on the actual 3D configuration are presented.

Drag, as previously noted in EQN. 1, is related to the drag coefficient by $$D=C_D \tfrac{1}{2}\rho_{tube}V_{pod}^2 S_{pod} \qquad \text{(EQN. 1)}$$

The 2D simulations provide the Drag Coefficient at different pod velocities. The estimated 3D drag is then obtained by multiplying the drag coefficient $\tfrac{1}{2}\rho_{tube}V_{pod}^2 S_{pod}$ where tube is the tube operating density, $V_{pod}$ is the pod velocity, and $S_{pod}$ is the frontal surface area of the pod.

Figure 35:
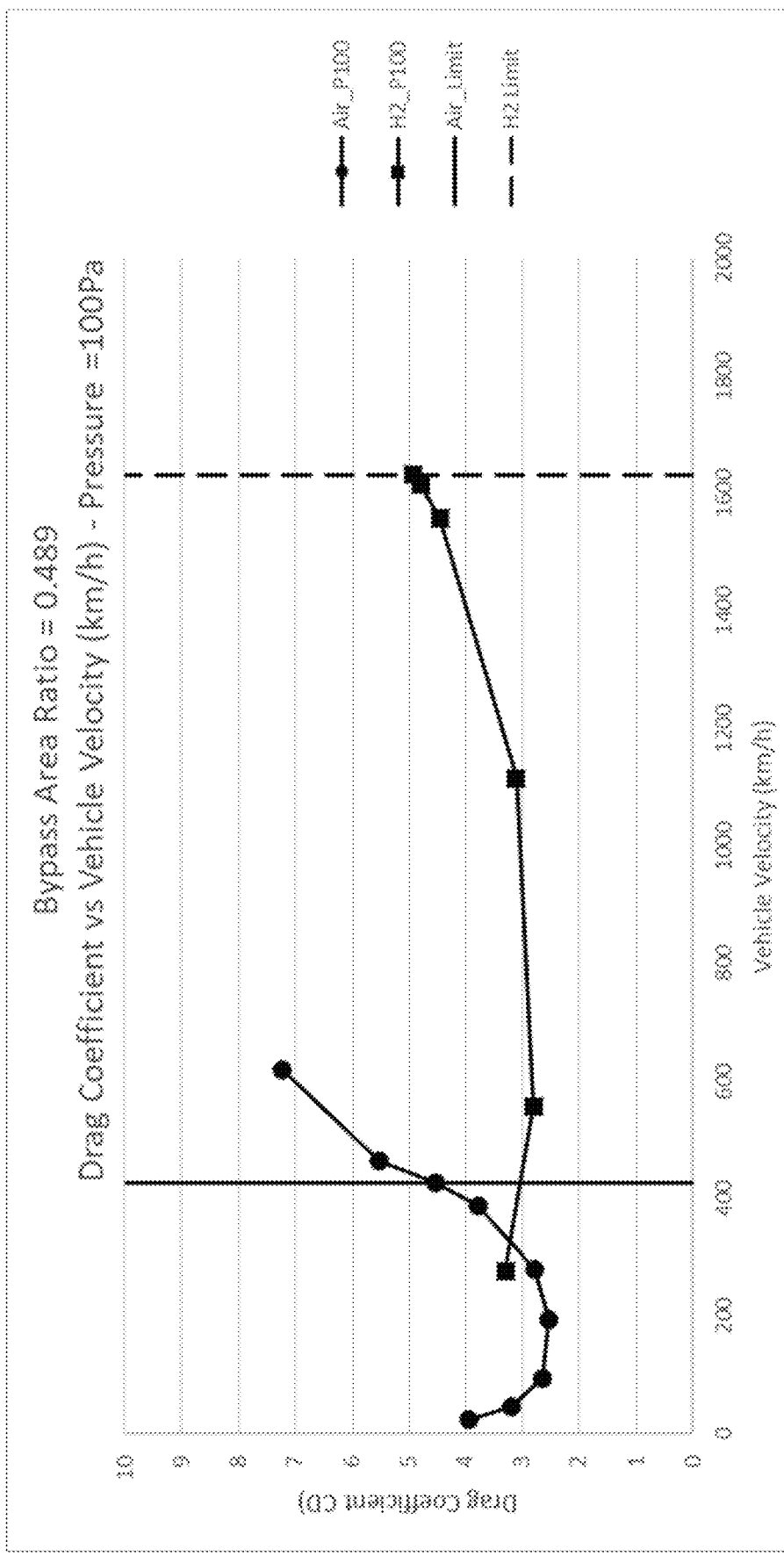
FIG. 35 depicts a graph showing the drag coefficient from 2D simulation for air and hydrogen.

FIG. 35 depicts a graph showing the drag coefficient from 2D simulation for air and hydrogen. The drag coefficient increases substantially when the velocity goes above the Kantrowitz limit. It is noted that the Kantrowitz limit for hydrogen is reached at a speed about four times higher than that of air, which is in line with what was expected. It is also noted that below the Kantrowitz limit, the drag coefficients of hydrogen and for air are similar (about 3.5 at 375 km/h). This is because the drag coefficient formula is drag divided by density.

Figure 36:
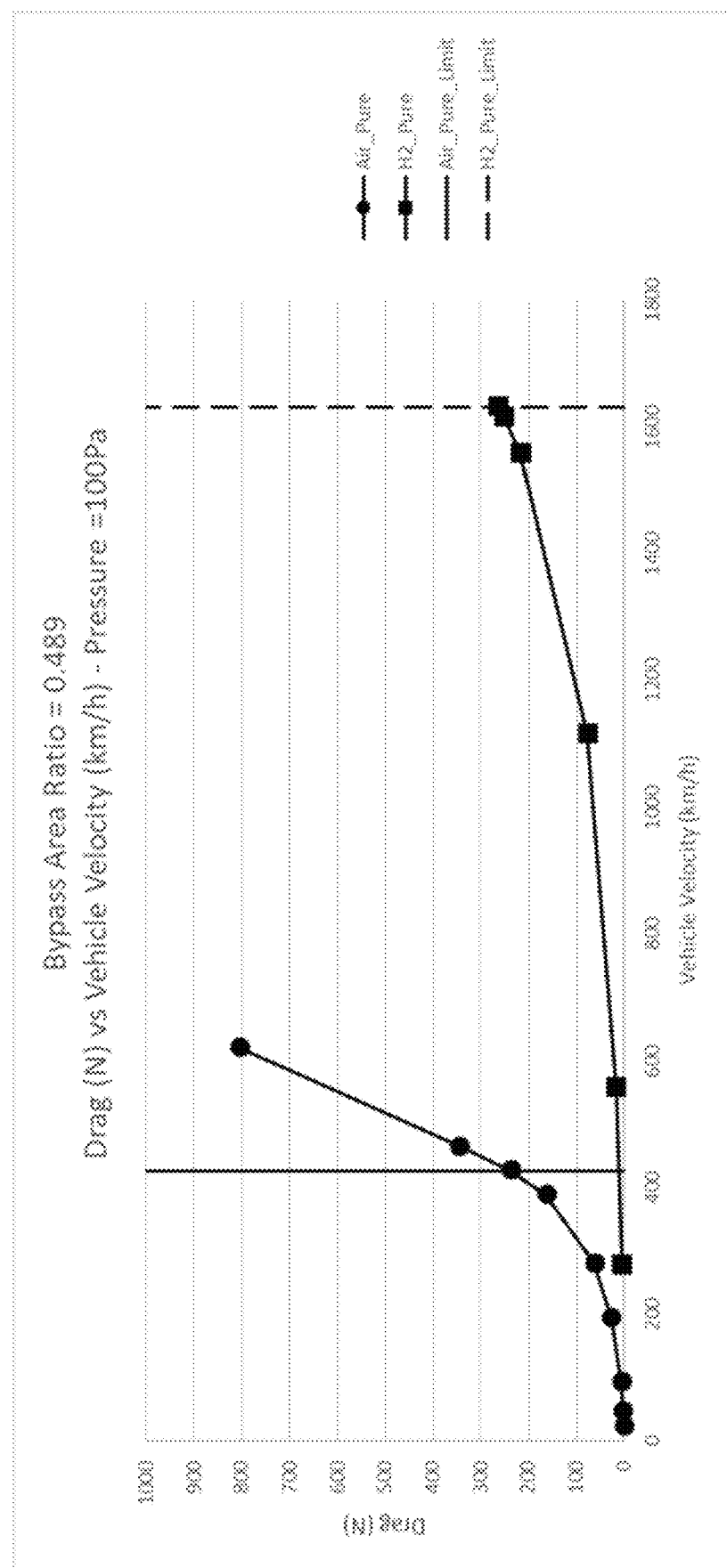
FIG. 36 investigates the effect of density by plotting the actual drag for a 3D capsule against the capsule velocity.

FIG. 36 investigates the effect of density by plotting the actual drag for a 3D capsule against the capsule velocity. The graph below illustrates the behavior of the estimated Drag of the actual 3D pod for hydrogen and air. The 3D drag is estimated using 2D Drag Coefficients and multiplying it by $\tfrac{1}{2}\rho_{tube}V_{pod}^2 S_{pod}$.

The graph in FIG. 36 confirms two important claims of the present invention:

1. Benefits of Low Density

Consider the region of Vehicle Velocity below the Kantrowitz limit of both hydrogen and air. The drag of hydrogen is lower than that of air. For the same pod speed of 300 km/h, the drag with hydrogen is about 12.4 times lower than with air. This is close to the ratio of density of 14 between air and hydrogen.

2. Higher Speed Before Reaching Kantrowitz Limit

The Kantrowitz limit Velocity for hydrogen is about four times higher than that of air. Above the Kantrowitz limit, the drag starts rising substantially with velocity due to choking. Results shown in FIG. 36 confirm that hydrogen can go to a velocity four times higher than that of air before reaching the Kantrowitz limit. Hence, hydrogen can go to a velocity four times higher for a reasonable demand of power. Hydrogen, therefore, can allow a capsule speed of nearly 1,630 km/h before the necessity of overcoming the Kantrowitz limit.

The benefits of low drag directly correspond to lower power requirements for propulsion. Lower power equates to less operating cost which is a key to putting this technology into practice. Less cost provides cheaper tickets and more ridership bringing this technology to mainstream adoption.

Figure 37:
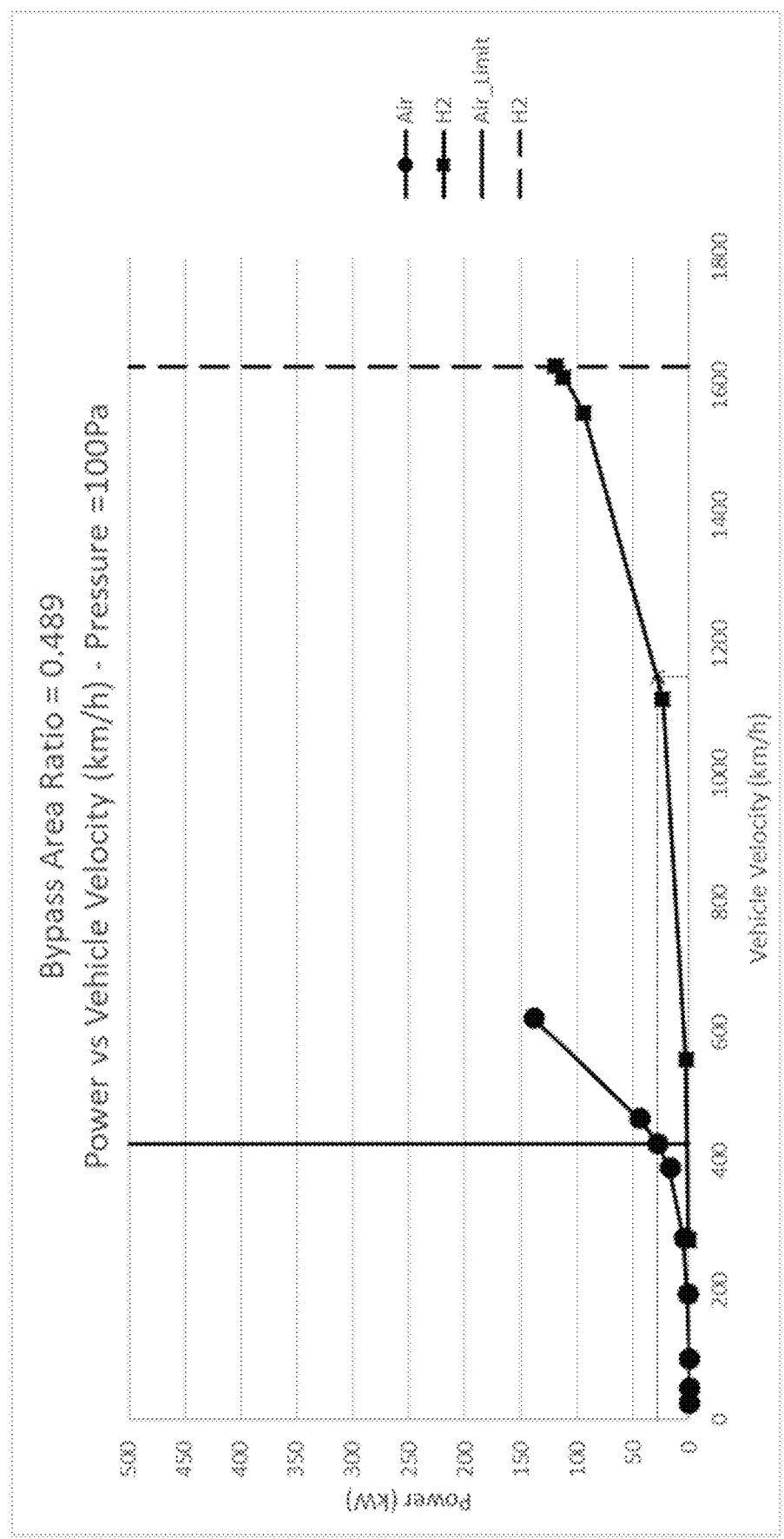
FIG. 37 depicts a graph illustrating power reduction based on using light-weighted gas.

FIG. 37 depicts a graph illustrating power reduction based on using light-weighted gas, where the graph compares requirements to overcome aerodynamic drag with air versus hydrogen (at 100 Pa). The same power to offset aerodynamic drag can achieve speeds of over 1100 kph in a hydrogen-based system but can only achieve 425 kph in an air-based tube. This is 2.6 times the speed of air, achieved for the same cost in aerodynamic power.

Therefore, replacing air or part of air in the tube by light-weight gases provides at least the following advantages: lower density (and, hence, lower drag, implying lower propulsion power), higher speed of sound (and, hence, higher vehicle speed before occurrence of the choking phenomenon), and higher mean free path (and, hence, lower pump power to achieve molecular flow as molecular flow may avoid choke phenomenon and thus decrease propulsion power).

As explained previously, implementing a mixture of air and light-weight gases, such as hydrogen, in the tube can substantially reduce the drag on the vehicle and in turn the propulsion power needed to overcome drag. Some further charts are valuable in determining the optimum mixture percentages and pressure ranges of air and the light-weight gas.

Figure 38:
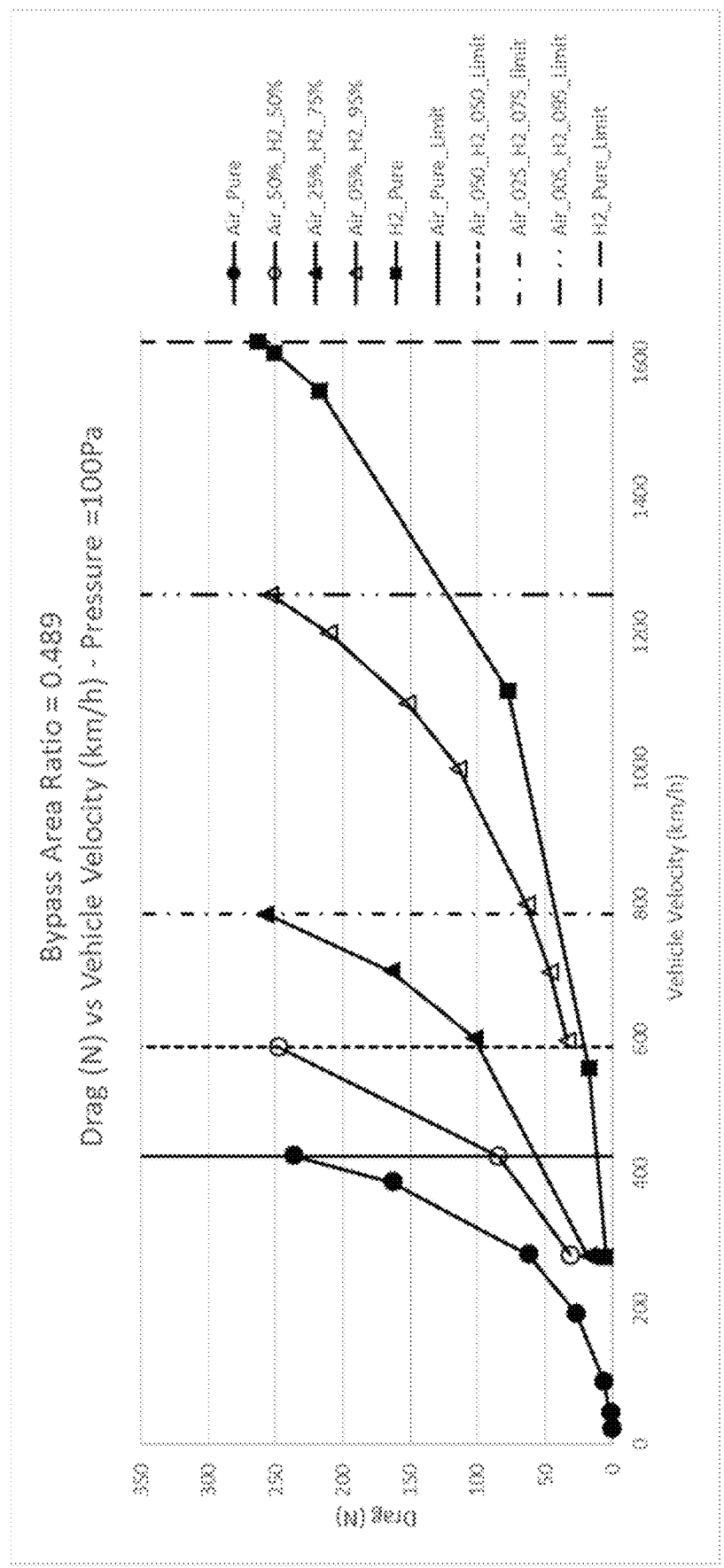
FIG. 38 depicts the results of CFD studies comparing maximum velocities at the K-limit attainable due to variations in the hydrogen-air mixtures.

FIG. 38 depicts the results of CFD studies comparing maximum velocities at the K-limit attainable due to variations in the hydrogen-air mixtures. Drag is a useful indicator to chart against velocity as there is no economic advantage to achieving higher speeds if the drag increases correspondingly.

At 100 Pa tube pressure, we see the increasing speeds attainable with increasing hydrogen percentages. The dashed vertical lines show the speed at the K limits, first, on the left, for pure air and lastly for pure hydrogen. The fifth vertical line, on the right, is for a 100% by volume hydrogen filled tube and shows a maximum speed of exceeding 1,630 km/hr with an only nominal increase in drag. Comparing that to the air maximum speed line it is noted that the achievable speed has increased nearly four times from 425 km/hr to over 1,630 km/hr.

Figure 39:
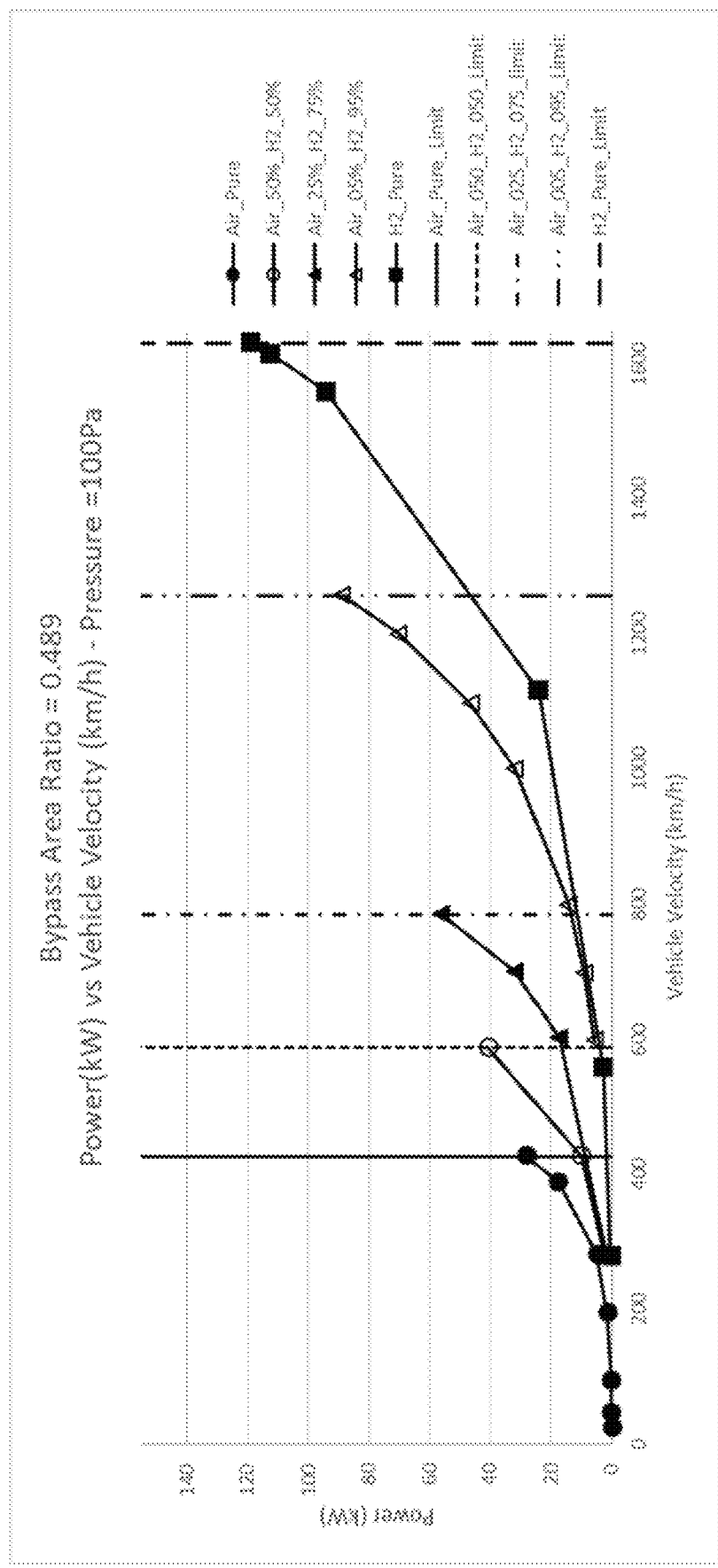
FIG. 39 depicts identifying a capsule speed given a power requirement for a specific combination of air and hydrogen.

As mentioned previously, the operational cost is a function of power. Choosing an optimal speed with reference to cost can be qualitatively seen from the power versus gas mixture graph shown in FIG. 39. For example, given a power potential of approximately 89 kW, a target velocity of about 1260 km/hr may be achieved using a gaseous mixture of 5% air+95% hydrogen.

Speed is more than doubled (when compared to pure air) with the same power using a conservative 95% hydrogen/ 5% air mixture. Additionally, this mixture allows much higher capsule speeds, but at the cost of higher thrust power. This is an important consideration as it is anticipated that in long and remote sections of the route it will be necessary to power the propulsion from the capsule. This can only be provided by onboard power until improved methods of non-contact power transfer becomes proven. Thus, keeping power low allows the use of smaller and lighter capsule power packs. Maximum speeds do not guarantee optimum operation costs as the economics rely on the length, curvature and elevation changes within the route and the source of propulsion power.

Performance with light-weighted gas has been shown primarily at 100 Pa pressures to keep the discussions similar and, also, due to the ease of maintaining this vacuum. But, there is a much wider range of pressures achievable that have trade-offs. Results for different ranges of pressures are next presented as we further optimize gas percentages with operating pressures.

Figure 40:
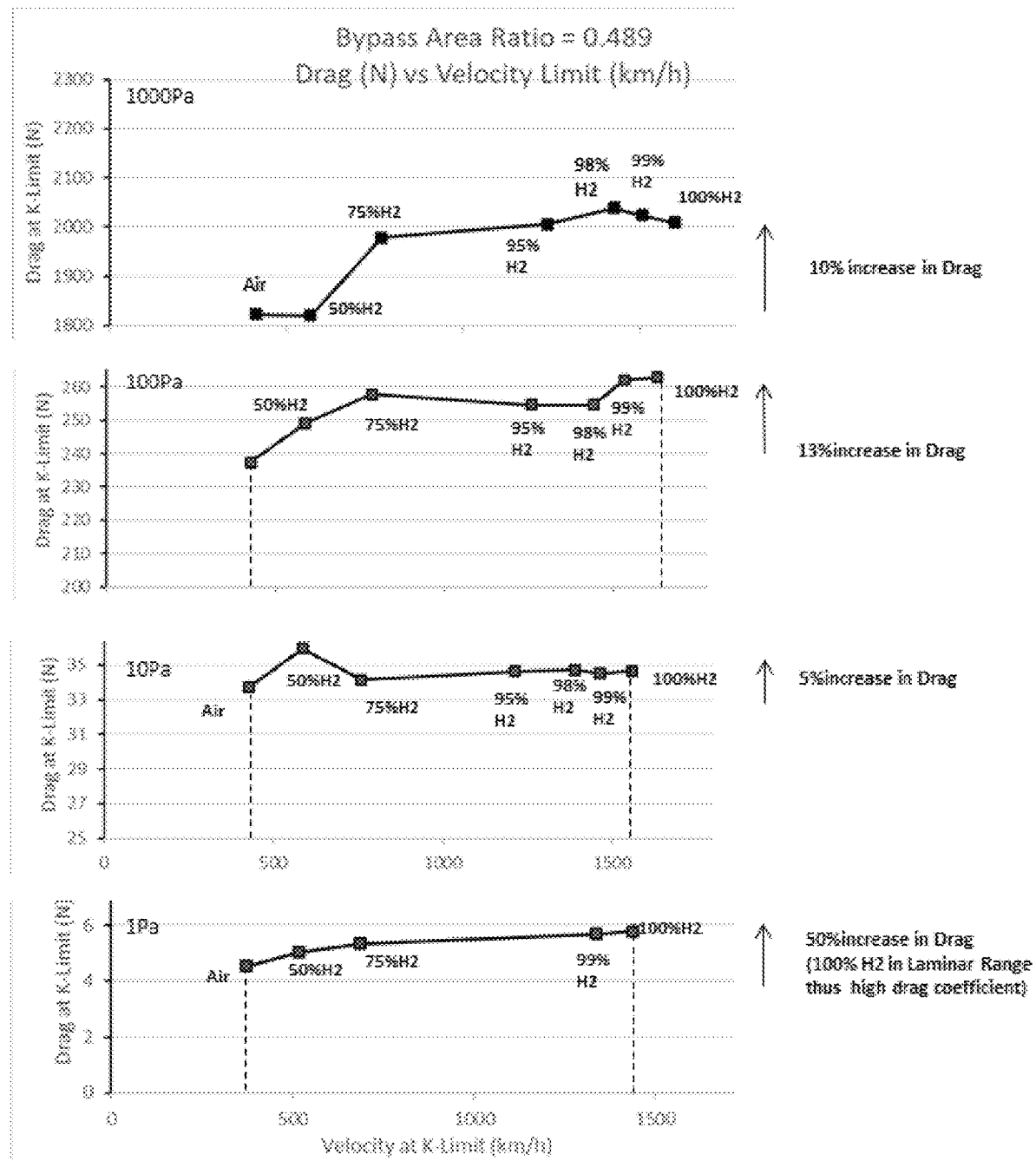
FIG. 40 illustrates a comparison of drag versus velocity, at the Kantrowitz limit, graphs for four basic tube pressures from 1-1000 Pa along with percentages of hydrogen in air.

FIG. 40 illustrates a comparison of drag versus velocity graphs for four basic tube pressures from 1-1000 Pa along with percentages of hydrogen in air. These pressure comparisons are first made on the basis of drag and are most interesting for the lowest pressure regime, 1 Pa, where the low pressure and high hydrogen percentage transforms the flow to laminar, thus increasing drag 50% in the 1-100% hydrogen range. The 1000 Pa tube is also seen to create very high drag despite all combinations of air and hydrogen. This will certainly result in high propulsive power requirements leading to impractical capsule onboard energy storage systems.

It is seen from the 1 Pa pressure graph that drag, in spite of laminar flow, is quite low and power requirements will also be low. But, the pumping power to achieve that vacuum level, combined with expected air leakage rates (45 SLM (standard liter per minute)/km), will result in that pressure not being viable without major, and more than offsetting, costs in capital expenditures.

At lower pressures, such as 10 Pa, we see that the drag increases minimally as the vehicle speed more than doubles. This is a critical point to consider. Drag is one of the key consumers of power that must be overcome by the propulsion system, the others being acceleration and gravity. Once the vehicle is at operational speed and running on level terrain, drag is the major drain on power consumption for propulsion purposes. Thus, economic operation depends on minimizing drag at the highest operation speeds and attainable vacuum levels. Notice above that aerodynamic drag is shown to be increasing at a low rate (<5%) with significant speed increases. Operation at higher speeds is achievable with only incremental drag increases. Current high-speed rail does not have this advantage and thus is constrained to lower speeds or much higher power requirements or both.

Figure 41:
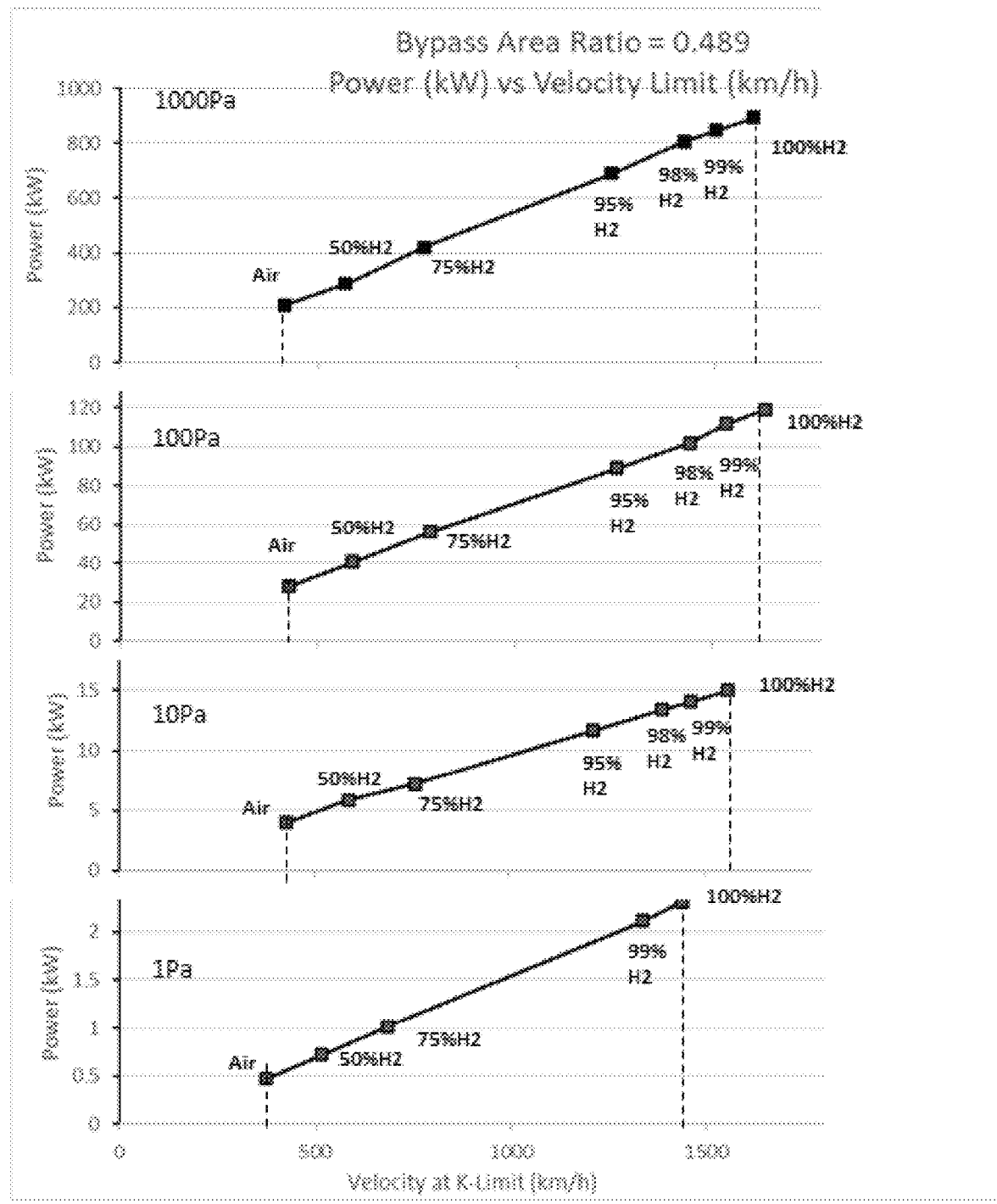
FIG. 41 illustrates a power versus velocity graph where the power requirements are reviewed for various pressures and various air-hydrogen mixtures to identify optimal operational ranges.

FIG. 41 illustrates a power versus velocity graph where the power requirements are reviewed for various pressures and various air-hydrogen mixtures to identify optimal operational ranges. Aerodynamic power consumption graphs with varying hydrogen percentages at pressures of 1, 10, 100 and 1000 Pascals are shown.

Based on extensive CFD runs, proven gas properties and behavior at various pressures, we can narrow our operating ranges based on power requirements. This is the primary factor in determining operating costs—how much energy is required and practical—to operate at high speeds. The power ranges depicted in FIG. 41 for 100 Pa and 10 Pa are achievable with current battery technology for onboard storage systems. Existing Li-Ion batteries used in cars have capacity of 30-100 kwh and thus with several of these packs would be suitable to sustain capsule propulsion (to overcome shown aerodynamic drag) for smooth and straight routes and have suitable safety reserves. As mentioned previously, variations in elevation and curve radii will all affect the power requirements, as will drag due to other elements of propulsion, life-support, etc. Due to limited volume and available weight for battery storage capacity on board the capsule, the opportunity to reduce battery power is closely examined and must be compared to the increased vacuum pumping power to obtain those lower pressures. At this very large scale, low power regimes can be achieved with modest percentages of hydrogen and at reasonable vacuum levels.

The present invention identifies that hydrogen percentages in air ranging from 75%-99% are practical and effective for increasing capsule speeds from a base of 400 kph in pure air to as high as 1,500 kph in a mix of 99% H2 and 1% air at just 100 Pa. Lower percentages of hydrogen also provide improvements as shown, but due to the relative low cost of hydrogen, do not provide optimum or most cost effective operating points. Hydrogen percentages in the 75%-99% range are practical to control with current state-of-the-art mass flow controllers, sensors and control systems.

The present invention also shows optimum tube pressures which are economical to achieve, ranging from 10-1000 Pa. Pressures below 10 Pa, such as 1-10 Pa, show promise in reducing drag, but move into the range of laminar flow and transition to a lower maximum speed at K limit. It is apparent, however, that even at these very low-pressure ranges below 1-10 Pa, hydrogen shows an increase in attainable speeds and thus this operational environment will gain improvement from the addition of hydrogen from the speed perspective. But, it is similarly interesting that the change in power requirements is very little compared to a pure air system. Thus, the range of power at 1 Pa with and without hydrogen is only 0.5 to 2.5 kW. A light-weighted gas system does not derive much incremental advantage at these pressure ranges (1-10 Pa) in the drag/power regimes. However, top speeds do enjoy a large incremental increase of 400 kph to 1,150 kph and thus it is expected that operations below 10 Pa will also include large percentages of hydrogen similar to the ranges at 10 to 100 Pa.

All of the previous analysis was performed with a bypass ratio of 0.489 (4 m tube diameter and 6.4 m$^2$ pod area) and showing examples of pressures and hydrogen percentages for optimum performance. Now, a different bypass ratio is analyzed.

Figure 42:
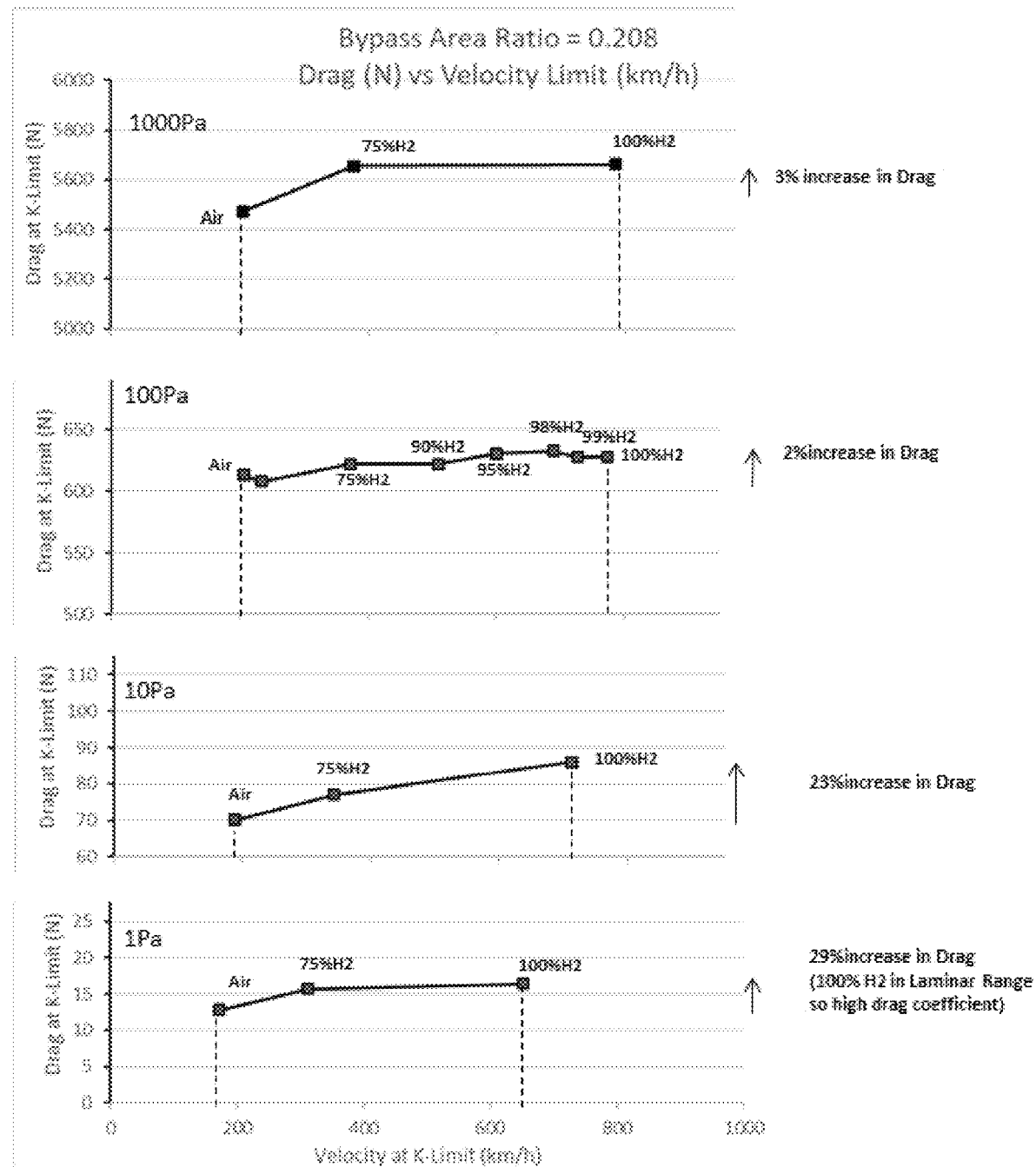
FIG. 42 illustrates a drag versus velocity graph, just as FIG. 40, but for a lower bypass ratio of 0.208.

FIG. 42 illustrates a drag versus velocity graph, just as FIG. 40, but for a lower bypass ratio of 0.208. FIG. 42 depicts a low bypass system of 0.208 (4 m tube diameter and 10 m$^2$ pod area) and its aerodynamic drag improvements due to use of light-weighted gas mixtures. The advantages of larger bypass ratio can be clearly seen in any of the above pressure graphs as the attainable speeds are more than double with the 0.489 bypass vs 0.208. Top speed will be a major advantage on long routes and thus larger bypass ratios preferred, but on short routes the speed advantage is diminished, and smaller ratios may be acceptable. Likewise, smaller bypass ratios may be relevant for low-speed cargo operations during off hours and enables the use of larger cargo capsules in the same tube. Although top speeds are reduced with the smaller bypass ratio, the advantages over pure air systems are still attained.

It is worth noting that for these two quite different bypass ratios of 0.489 and 0.208, the power requirements stay within similar ranges. The different bypass ratios impact the maximum speed more than the power. As capsule power may be limited (e.g., due to battery energy density and space available), the low bypass system will be capable of operating under such limited power, but at the disadvantage of much reduced speeds.

Figure 43:
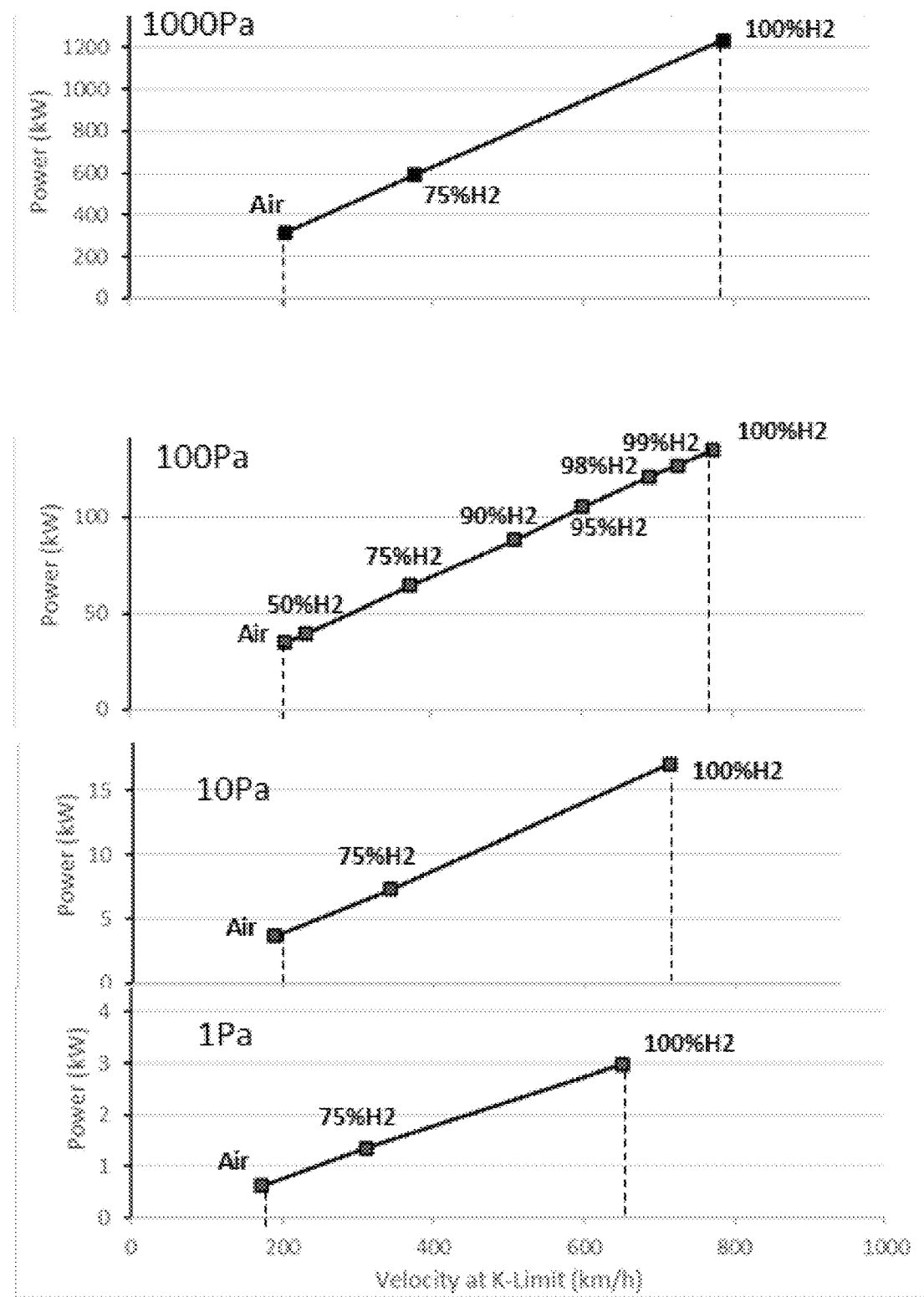
FIG. 43 illustrates a power versus velocity graph, just as FIG. 41, but for the lower bypass ratio of 0.208.

FIG. 43 illustrates a power versus velocity graph, just as FIG. 41, but for the lower bypass ratio of 0.208. Just as in FIG. 41, the power requirements may be reviewed for various pressures and various Air-hydrogen mixtures to identify optimal operational ranges. Due the higher drag of the low ratio systems at same speeds, more power is required to attain the same speed. However, with the 0.208 bypass system, maximum speeds are still significantly increased over 100% air systems.

As noted earlier, FIG. 21 illustrates a comparison of two non-limiting bypass ratio examples used in this disclosure, along with a sample calculation of how the bypass ratio is calculated in each instance. It should be noted that while this disclosure uses two bypass ratios, i.e., 0.489 bypass ratio for a capsule to transport humans and 0.208 bypass ratio for a cargo capsule, these ratios should in no way be used to limit the scope of the present invention, as the teaching of the present invention can be applied to other bypass ratios.

Figure 44:
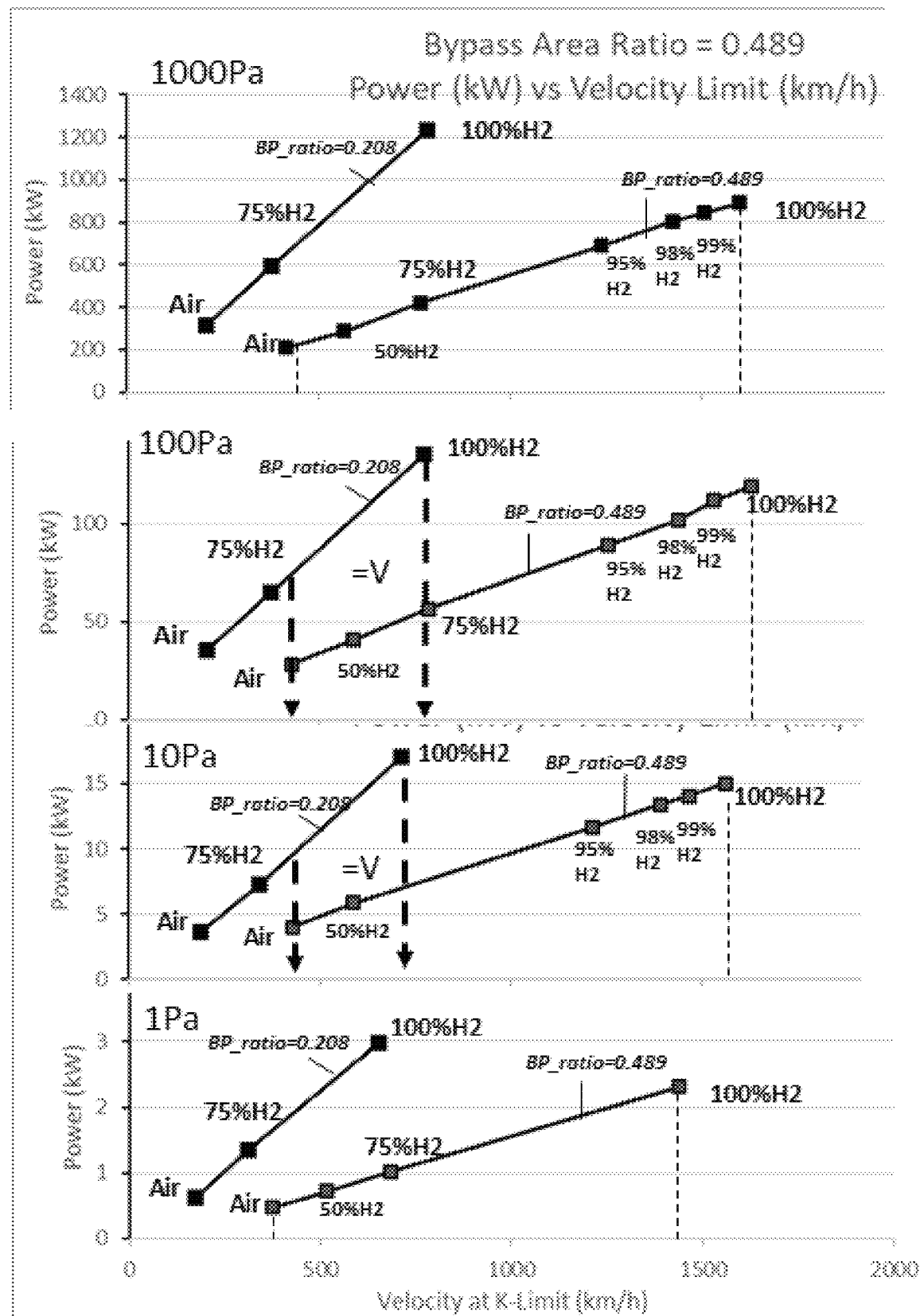
FIG. 44 illustrates hydrogen in the low bypass system (0.208) does allow speeds compared to the high bypass (0.489) region for certain gaseous mixtures of hydrogen and air.

As seen in FIG. 44, using hydrogen in the low bypass system (0.208) does allow speeds compared to the high bypass (0.489) region for certain mixes, as indicated by the velocities bounded by the dotted lines in both the 10 Pa and 100 Pa graphs.

Much can be deduced about optimum operating conditions from comparing the power for the two different bypass ratios as seen in FIG. 44. First of all, the maximum speed attainable (before K-limit) with low bypass is severely reduced. Even at the lowest of tube pressures (1 and 10 Pa) it is seen that even with 100% hydrogen, the attainable velocity is only half of the velocity with lower H2 percentages that incorporate the higher bypass ratio. Second, for the smaller bypass ratio, those lower velocities are all at nearly three times the power than similar speeds utilizing a higher bypass ratio. It is, therefore, noted that optimizations of capsule-to-tube geometry, creating the largest bypass possible, result in much greater speed with much less power.

Greater system operational flexibility for speed and power is achieved by adding specific mixtures of Air and hydrogen for either of the described bypass ratios. For lower bypass ratios (i.e., 0.208) equivalent speeds to high bypass ratios (i.e., 0.489) can be obtained as seen in the figures above between the vertical dashed arrows.

At tube pressures of 10 Pa and 100 Pa, ranges of equal speed for both bypass ratios are shown. At 100 Pa, the drag in the small bypass ratio scenario increases almost three times at the same speed, but only by adding 75-100% hydrogen. For larger bypass, equal speeds are attainable, but with about 40% of the drag. Adding hydrogen helps significantly for the small bypass system scenario (versus a pure air system), where such an addition can be leveraged for larger capsules, such as cargo types. Such addition of hydrogen allows over three times the speed (when to compared to a pure air system), with only marginal increases in drag. A significant speed penalty is paid for by the smaller bypass system as the maximum speed is limited to about half of that of the larger bypass system. Using much lower pressures (e.g., down to even 1 Pa) does not overcome the overwhelming advantages of large bypass systems.

A key to putting H2-Air mixtures for high-speed tube travel into practical use is narrowing the proper mixture percentages based on an economic model. That process is outlined next and identifies clearly why many higher percentages of H2 are not optimal, and which ranges are not even achievable.

While higher percentages (e.g., 99% or 100%) of hydrogen are preferred, it should be noted that such higher percentages are not possible with commercial pipe construction, due to residual air leakage through welds, joints, feedthroughs, and material imperfections. The amount of air leakage does not change with tube pressure as each leak can be modeled like an orifice. In this model, each orifice follows standard gas laws and chokes at pressures drops above approximately 0.53 ΔP and will be limited to flow at sonic speeds. The choking of each orifice maintains constant flow up to a tube pressure approximately 53,700 Pa. Tube pressures in the region of 1-1000 Pa essentially creates equal air leaks. Thus, each of these orifices will contribute small amount of Air into the vacuum vessel which must continuously be pumped if base pressure is to be maintained. This continuous leakage makes achieving 100% H2 content impossible unless a perfectly leak tight tube can be designed. However, practical implementations of such tube-based transportation systems will suffer from the effects of these leaks, making reaching 100% hydrogen not a practical solution.

A range of leaks that can be expected per km of tube is noted based on experience of experts in the field and under conditions seen with other large tube vacuum systems. For this patent disclosures, the upper range of 50 slm/km (standard liter per minute/km) is chosen as a worst case, and 5 slm/km a best case. FIG. 45 illustrates a table depicting volume loading at 50 slm/km by percentage of hydrogen. FIG. 46 illustrates a table depicting volume loading at 5 slm/km by percentage of hydrogen. Such leak rates are merely provided as examples and should not be used to limit the scope of the invention. A discussion is now presented regarding how this leak rate must be accounted for in calculating preferred hydrogen ratios as well as ideal operating pressure.

This leak rate is directly related to methods and materials of construction of the tube, where with knowledge of such methods and materials, one can populate table in FIG. 45 or 46 with more accurate numbers. The leak rate may be calculated using standard vacuum system practices and should be measured for each part of the route. Such estimated data associated with different portions of the route is critical in estimating base tube pressures and percentages of hydrogen that can be reasonably achieved within each portion of the route.

As seen above in FIGS. 45 and 46, with increasing hydrogen percentages, the Added Volume column increases geometrically at constant leak rates. Very high percentages of hydrogen require increasing amounts of injected hydrogen where such injected amounts approach infinity as the hydrogen requirement reaches 100%. This added volume of air/hydrogen mixture must be pumped out to maintain required vacuum levels, and thus may load the pumps beyond their capacity. Although from earlier discussions it appears that higher percentages of hydrogen are always preferred there is a counter trend of increasing pump loads that must also be considered.

Figure 47:
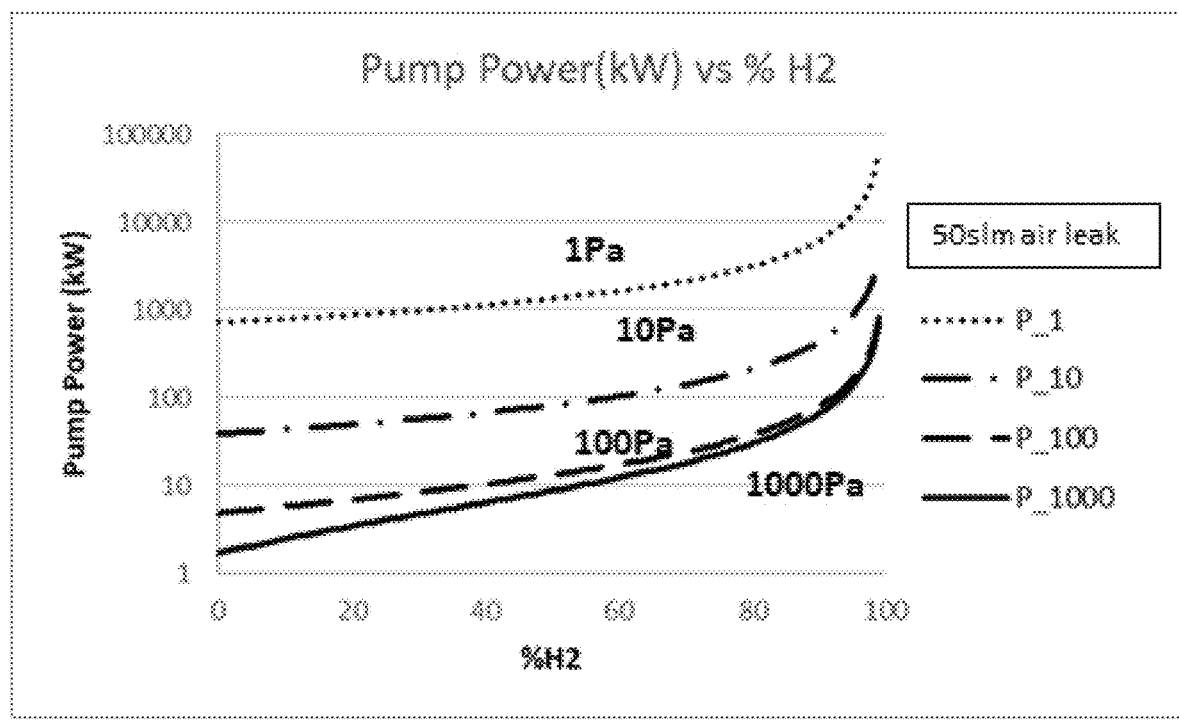
FIG. 47 depicts a graph of pump power (in kW) versus the percentage of hydrogen for various pressures.

FIG. 47 depicts a graph of pump power (in kW) versus the percentage of hydrogen for various pressures. As can be seen from FIG. 47, vacuum pumps are very sensitive to volumetric flow rates with power (kW), increasing in a geometric fashion at H2-Air percentages beyond approximately 90%. These pumping power curves show the diminishing returns of trying to maintain high percentages of hydrogen with respect to pumping power (kW). This deleterious effect is most pronounced at low tube pressures which is counter to the desire to operate at low pressure to reduce drag. FIG. 47 shows the negative effects of high hydrogen percentages versus necessary pump power to maintain those percentages. More is not better. The present invention leverages this effect to achieve optimum performance within a tube-based transportation system. In one embodiment, the most economical operating percentages can be deduced when coupling this result with the power required to overcome aerodynamic drag.

There is a complex interaction of tube pressure, speed, bypass ratio, Air leakage, H2-Air %, drag and pump power which heretofore has not been presented in an organized manner in the prior art. All these physical parameters constrain the ideal operating speed. Those key tradeoffs have been analyzed in several typical regimes and now can present a system and method of finding optimum operating conditions. The number of combinations is vast, but by simulation and using physical properties, while operating in typical or expected ranges of those regimes, one can formulate the most practical and economic use of a tube-based transportation system.

The present invention discloses a system and method for identifying optimum H2-Air ranges based on the economics of power usage, both for pumping the tube to vacuum, and also for overcoming drag at operational speeds. Ideally, 100% H2 results in the lowest drag and highest speeds due to its reduced molecular size (improved speed) and lower density (reduced drag). The calculations following show that 100% hydrogen not possible in a single wall tubular system.

First, particular pump curves are required to be derived for a 1 km long, 4-meter diameter steel pipe at various base pressures. These curves include an allowance for air leakage of a 50 slm of Air per km. As noted earlier, such a leakage rate is merely provided as an example and should not be used to limit the scope of the present invention. Since the basis for optimization is power consumption, the curves show the amount of pumping power required to keep the tube at constant pressure (as depicted in FIG. 47), based on a given leak rate. Different leak rates will change the graph, but the conclusion will always show that at higher H2 ratios the pumps must operate at higher and higher power to evacuate the increasing volume of the H2-Air injected. As the percentage of hydrogen required within the tube increases, incrementally larger amounts of H2 must be injected to maintain the ratio. The higher the percentage of hydrogen, the more power the pumps require.

Figure 48A:
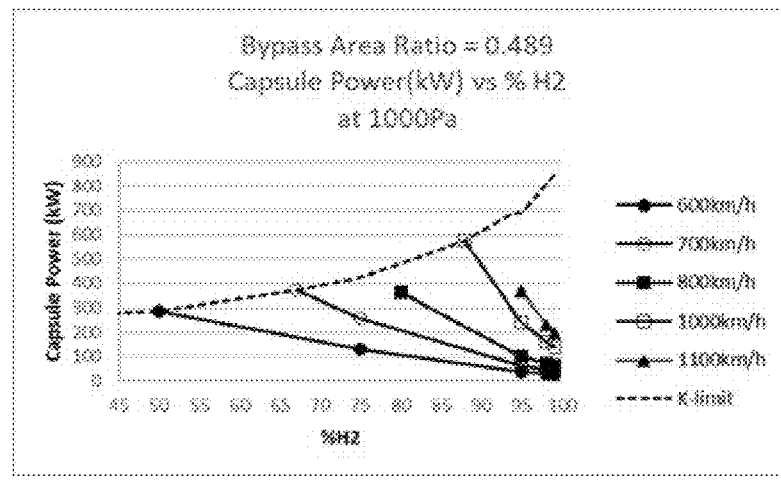
FIGS. 48A-C show a summary of power requirements (kW) to balance aerodynamic drag at a pressures of 1000 Pa, 100 Pa and 10 Pa, respectively, for various capsule speeds versus percentages of hydrogen and Air.
Figure 48B:
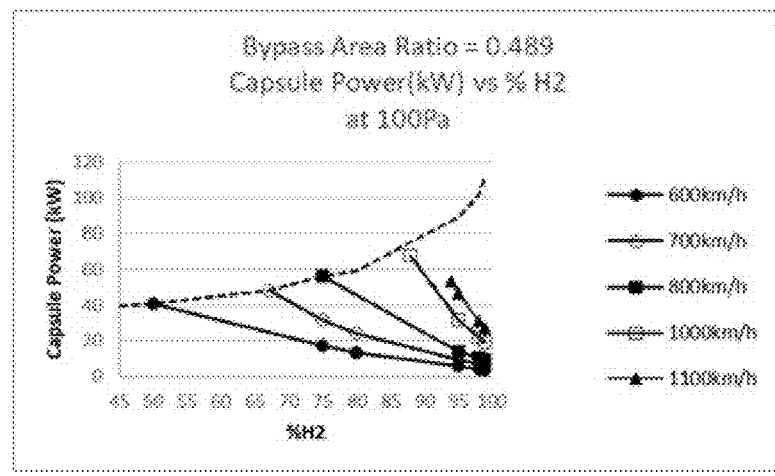
Figure 48C:
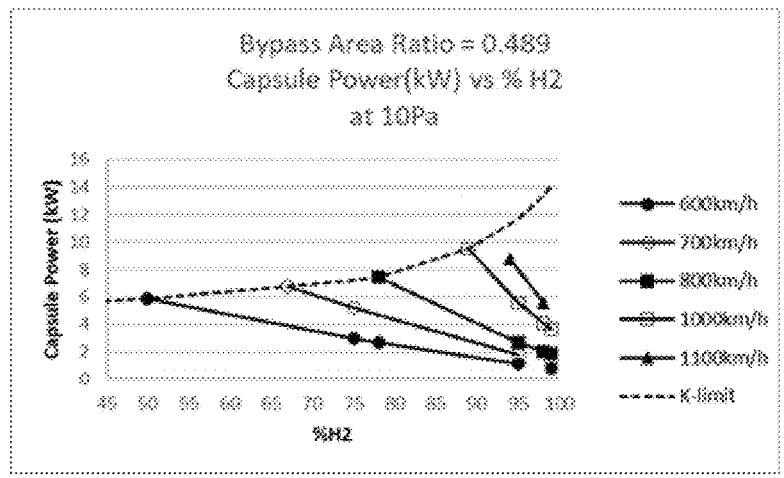
Figure 49:
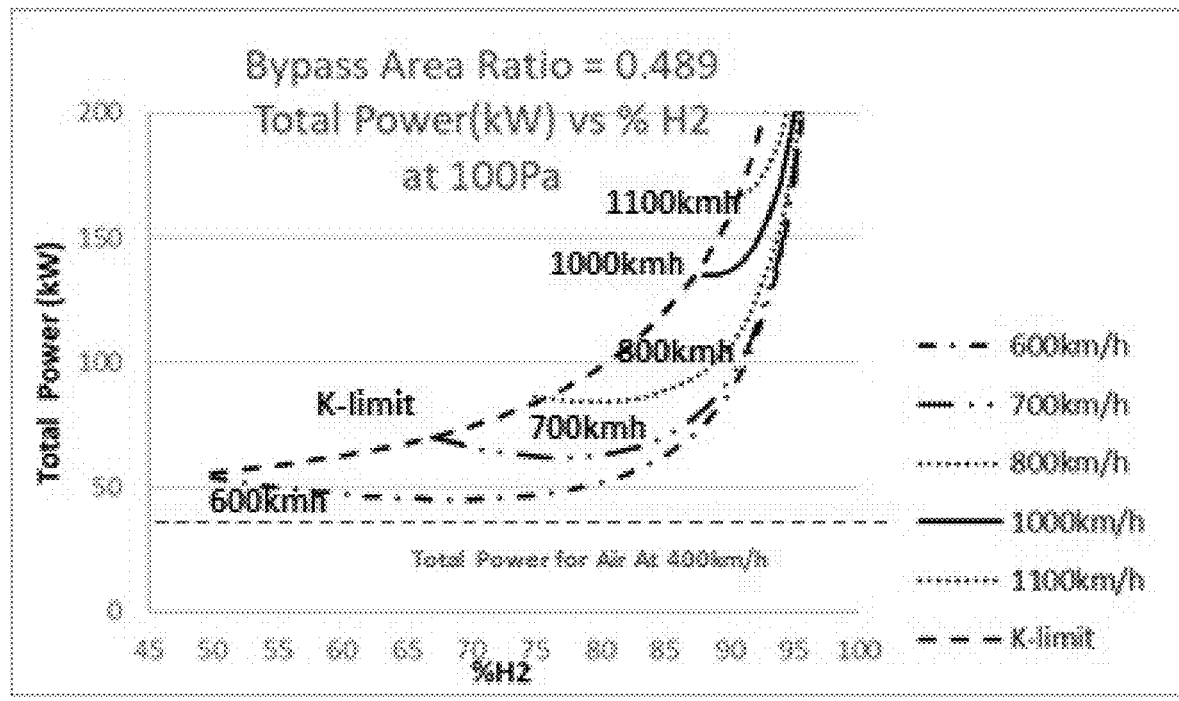
FIG. 49 depicts a graph of total power (in kW) (combining pumping power and aerodynamic power) versus the percentage of hydrogen for various velocities at 100 Pa.

Next, the power required to overcome drag at various speed and percentages is examined. FIGS. 48A-C show a summary of power requirements (kW) to balance aerodynamic drag at a pressures of 1000 Pa, 100 Pa and 10 Pa, respectively, for various capsule speeds versus percentages of hydrogen and Air. As noted previously, the highest speeds can only be attained with the highest percentages of hydrogen. It is seen here that capsule/propulsion power (aerodynamic drag×velocity) is reduced significantly at the highest percentages of hydrogen. But as shown in FIG. 47, those hydrogen rich environments come at the cost of much added pump power. These two interactions need to be combined to formulate the least power and best operating points. FIG. 49 depicts such a combination by way of a graph of total power (in kW) (combining pumping power at a given leak rate and aerodynamic power) versus the percentage of hydrogen for various velocities at 100 Pa.

Before continuing it may be helpful to discuss the impact of varying air leak rates on the present invention's optimization system and method. Leaks affect the pump capacity in two key areas. An order of magnitude smaller leak can allow an order of magnitude lower pressure attainable in the system. Thus, lowering the leak rate is a very efficient method of achieving lower tube pressures. The same relation is seen between pump power and leak rate as the power can be reduced (theoretically) an order of magnitude at the same pressure if the leak rate is reduced by a factor of 10. The present invention's disclosure uses a non-limiting example of 50 slm/km air leakage, but the specific air leakage number should not be used to limit the scope of the present invention. However, it should be noted that the teachings of the present invention may be applied to another leak rate, e.g. 5 slm/km, without departing from the scope of the invention.

Figure 50A:
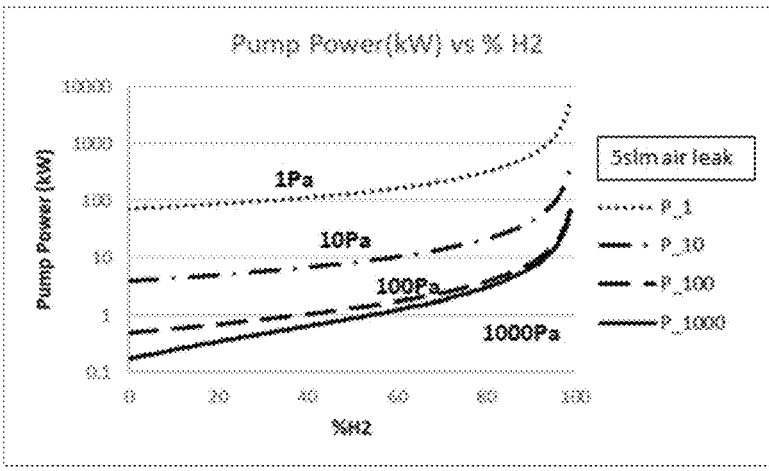
FIGS. 50A-C depict a non-limiting example, where the same analysis as FIGS. 47-49 is performed for a leak of 5 slm/km.
Figure 50B:
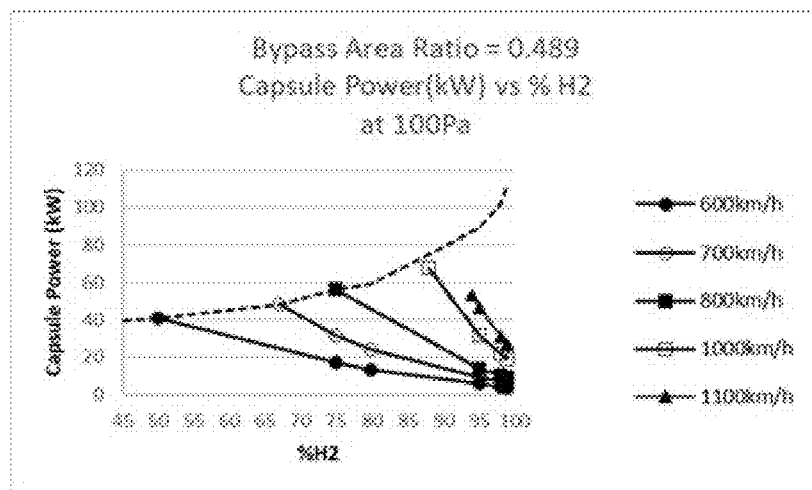
Figure 50C:
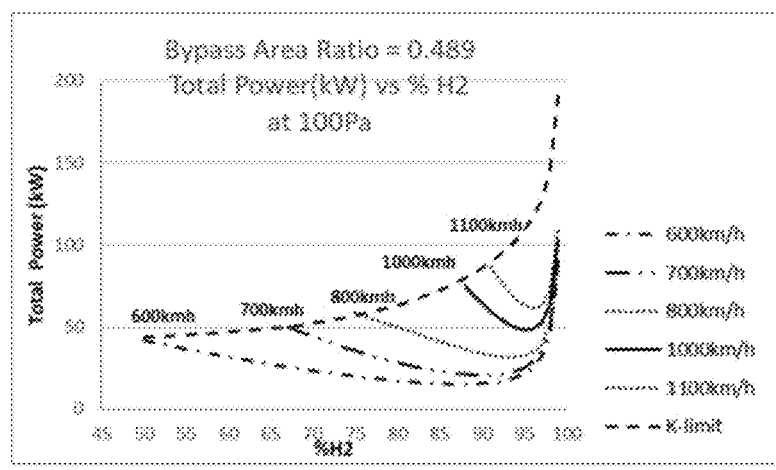

FIGS. 50A-C depict such a non-limiting example, where the same analysis as FIGS. 47-49 is performed for a leak of 5 slm/km. FIG. 50A depicts a graph of pump power (in kW) versus the percentage of hydrogen for various pressures for an air leak of 5 slm/km. FIG. 50B depicts a graph of the capsule power (in kW) at 100 Pa. Since capsule power is not dependent on leak rate, this is the same as graph FIG. 48B, previously shown. FIG. 50C depicts a graph of total power (in kW) (combining pumping power and aerodynamic power) versus the percentage of hydrogen for various velocities at 100 Pa for an air leak of 5 slm/km. These calculations for the 5 slm/km leak rate validate the effect on the optimization model.

It should be noted that graphs depicted in FIGS. 47-49 relate to a bypass ratio of 0.489 but, similar, but smaller effects, may be obtained for bypass ratios lower than 0.489. The basis of the method is to separate the various inputs, look at the effect of H2-Air mixtures on those inputs, then to combine the inputs into a simple graph showing ideal operating conditions. The graphs shown in FIG. 49 summarize results presented in FIGS. 47-48A-C by combining them to allow finding the optimum hydrogen-Air percentages. These are done for expected velocities with pressure of 100 Pa and 0.489 bypass ratio, including as assumption of a 50 slm/km leak.

The graphs in FIG. 49 depict fairly flat power requirements at 600, 700 and 800 km/h up to 90% H2 mixtures. Looking closely at the graph in FIG. 49 (and using the data behind the graph to identify more precisely), it is seen that 75%-85% hydrogen in the tube appears acceptable. An operator would not want to operate at 75% H2 and 800 km/h, however, as there would be very little safety margin before reaching the K-limit and ensuing shock in the bypass area.

Figure 51:
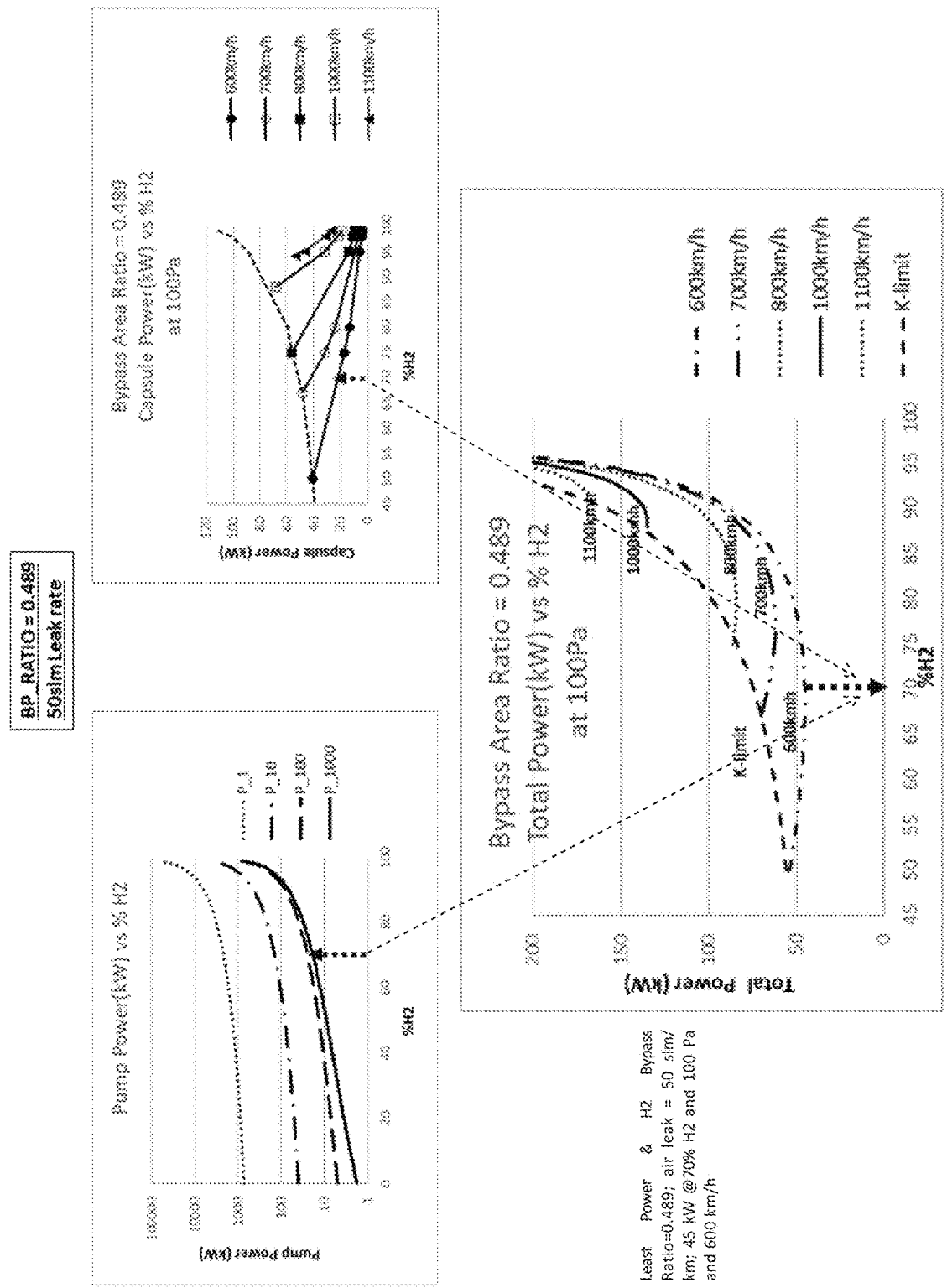
FIG. 51 illustrates how the graphs depicted in FIGS. 47-49 may be combined to provide optimum operating points for power (cost) and hydrogen-air ratios.

FIG. 51 illustrates how the graphs depicted in FIGS. 47-49 may be combined to provide optimum operating points for power (ie., cost) and hydrogen-Air ratios. FIG. 51 shows an optimum hydrogen operating point at 600 kph based solely on power requirements—least cost per km for tube pressures of 100 Pa for this set of speeds. This could be considered the most economic (or eco mode) at that pressure and set of speeds. An example optimization is shown by the arrows at 70% H2 done at 600 kph and requiring approximately 45 kW least total power. Other H2 mixes for least total power can easily be determined by inspecting the lowest point on any speed curve and then dropping down to the associated hydrogen percentage required.

We see nearly a maximum operating speed of 1,100 kph requiring just under four times the power when compared to 600 kph (175 vs 45 kW), and requiring a 90% hydrogen and 10% air mixture, but which will result in reducing transit times by 45% (based on increasing the speed from 600 km/h to 1,100 km/h).

The restrictions of operating at 1,000-1,100 km/h can be identified by witnessing the need for vastly increased power while also being very sensitive to small changes in the hydrogen-air mixture. While these very high speeds are achievable for this condition, bypass ratio, and pressure, such high speeds may not be not ideal. A practitioner would prefer to reduce the tube pressure or increase the bypass ratio if they wanted to safely and reliability operate in that region. It should be noted that while FIG. 51 is provided merely as an example for specific pressures, velocities, and bypass ratios, similar graphs can be created for other pressures, velocities, specific geometries, to derive the optimum conditions for other operating points in a similar manner.

It is seen that hydrogen concentrations in the high range are desirable but come at a higher cost with respect to power. Also, in one embodiment, the present invention envisions maintaining, or creating, ideal hydrogen-air ratios from both a safety and profit point of views. In the described examples, power consumption has been used as an analog for profit, however, there are several operating power points which may be chosen depending on the motives of the operator. For example, minimum power does not occur at maximum speeds, and thus lengthens the trip time. Some operators (military, medical transport, etc.) may choose the 'optimum' power to attain maximum speeds. The methods as per the present invention identify what percentages of hydrogen are required to achieve such maximum speeds. On the other extreme is operation at minimum power which provides the longest capsule battery life and allows longer routes where trackside power is not available. There will often be a mid-power range, an 'affordable' power that allows some higher speed operations but still allows increase in the route length. Route calculations rely on the length, curvature and elevation changes within the route and the source of propulsion power. Differing motives of operation will dictate what percentage of hydrogen is ideal based on the route and whether operating at 'optimum', 'minimum' or 'affordable' conditions.

In order to optimize for this embodiment, one needs to focus not only on hydrogen percentages, but also on the hydrogen distribution in the tube, and methods to control such distribution. Similar optimizations can be done for 1-1000 Pa and large to small bypass ratios using examples as shown earlier. Power requirements for all combinations of pressure, bypass ratio, leakage, air-hydrogen percentages and velocities can be computed based on the teachings of the present invention. In one embodiment, this process is fully automated with software, whereby optimum speeds and hydrogen-air ratios are quickly determined. As compared with the effort to: change the capsule or tube size (which affects bypass ratio), increase the number and size of vacuum pumps (to reduce pressure), add a compressor to the front of the capsule (to improve bypass ratio), or change tube construction methods (to reduce air leakage), the process of adding a light-weight gas to the tube is certainly a very cost effective and simple method of improving tube-based transportation system performance. Using hydrogen to optimize improves both capital and operational economics. Using these new techniques, identifying and operating in these optimum spots, and even varying the percentage of hydrogen based on changing operations (passenger vs cargo), can be automated and implemented during daily operations.

It is seen that the percentage of hydrogen is a major determinant of maximum speed and least power along with bypass ratio, air leakage, and tube pressure. Thus, the distribution and percentages of the light-weight gas within the length of the tube is an important consideration to maintain these advantages. The ability to maintain that percentage of hydrogen and homogeneity within the tube is important to achieving these advantages. However, we also see that much higher percentages of the light-weight gas are sometimes desired or required. Different portions of a route may be speed constrained due to curves, stations, elevations changes, etc., while other portions of the route will allow maximum speeds. A homogeneous mixture must be attainable, but there are several conditions under which the most hydrogen rich mixture economically attainable is preferred, such as high-speed sections of the route. Methods of achieving both homogeneous and enriched H2 atmospheres are described below.

A description of the technologies that enable to maintain a homogeneous, or light-weight enriched, mixture of gases in the tube is provided.

First, consider some standard components of the transportation system:
1. The vehicle which carries passengers or cargo
2. The tube that guides and encloses the vehicles
3. The pump that maintains low pressure in the tube and compensates for Air leaks (from atmosphere to the tube)

The present invention proposes additional components to create and to maintain a homogeneous mixture of gases and additionally how to improve some tube areas resulting in increased local percentages of light-weight gases.

A list of components necessary to achieve the system is given below:
1. A source of gas (other than air)
    a. One or many gas tanks integrated on the tube side, distributed along the tube length whose position may be determined by the capsule speed in that tube location,
    b. A series of pipes connected from the gas sources to the tube sides, with injection points distributed along the tube length whose position may be determined by the capsule speed in that tube location,
    c. One or many gas tanks in each vehicle or in some vehicles, located at known critical geometry locations on the capsule which are most prone to shock or disturbances from high speed flow surrounding the capsule. These specifically are near the nose such that light-weighted gas concentration can be increased as the flow begins its movement over the capsule body, along the capsule body at points where flows are near the critical K-limit, near the tail to reduce shock waves and instability created therein, and finally at the tail to increase the gas concentration in preparation for any following capsule.
2. A system to inject light-weighted gases that is comprised of a valve, regulator, mass flow controller, electronic controls and injector nozzles located in any of several locations within the hyperloop system. This system is under control of the operations control center which is continuously monitoring gas concentrations within the tube and supplying commands to the injection system on proper amounts to inject in order to maintain optimum gas ratios.
3. A system to recycle gas. A system integrated into the pumping system, which separates light-weighted gases from the air/gas mix, so that they are not exhausted to atmosphere but are recycled back into the tube. This is comprised of an air separation unit or membrane style gas separation unit which takes the vacuum pump exhaust from the tube and separates out the light-weighted gases for recycling into the gas injection system or to a storage system for future use when the preferred gas ratio is out of balance.
4. A system to monitor gas pressure and gas concentrations including gas sensors, a data feedback and logging function plus a data control system.
    a. A network of pressure transducers and gas concentration transducers integrated along the tube and/or in the vehicles.

b. The output from these transducers is sent to the OCC unit which uses software algorithms to compare measured vs ideal concentrations and responds with control outputs to the gas injection system.
c. The gas control system further has optimization routines to provide closed loop control of required gas concentrations and homogeneity based on sensor output.
d. Off the shelf gas type sensors may be used, where they could be located on the capsule, at points along the tube, or on the vacuum piping at the pump stations. Their output would be directed toward an Operations Control Center (OCC) to track deviations from ideal, changes to perform by gas injection equipment, and results of those changes.

It should be noted that the actual implementation can be as modular as possible, to combine a plurality of the aforementioned components.

The methods used to place the preferred gases into the tube is an area to optimize. Multiple methods are envisioned for filling the tube with these gases. Individual and/or combined methods such as injection through the tube wall, injection from the capsule, from valves placed onto the tube or tube attachments, from the capsule, or potentially from the vacuum pumping system all are viable methods.

Injecting the small diameter gas through various critical points in the capsule has some potential significant advantages to enrichen the light-weighted content in localized areas around the capsule to reduce shock waves, turbulence, and possible capsule instability due to these factors. It can also be surmised that capsules in the tube behind a lead injecting capsule may benefit significantly by these same factors. Such a method of optimized capsule shell injection is another advantage of the present invention.

One important challenge is to compensate for Air leaks, coming from the atmosphere. Air leaks tend both to increase the tube pressure and to change the concentration of gases (increasing the concentration of air). At these vacuum levels, there are conventional air leak rates that have been identified for welded steel piping. As mentioned previously, the estimate from one expert in this science, Leybold Vacuum, is a rate of 45 standard liters per minute based on a 4 m diameter tube of 1 km length. Thus, achieving a 100% light-weighted gas filled tube is not practical using accepted large scale fabrication and material processes. Dual containment tubing systems are used to transport certain toxic gases and are able to reduce leaks to extremely low levels, but may not be practical nor economical on such a large scale. Comparing that leak rate of 45 slm/km (0.05512 kg/km) to the volume of hydrogen in the tube provides a qualitative answer to the level of hydrogen purity attainable.

Fortunately, there is no leak of gases escaping from the tube to the atmosphere because the tube pressure is so low compared to atmospheric air. The only way the gases can leave the tube is due to the pumping system that pumps the tube fluid to decrease its pressure. At the same time, it removes the gas from the tube.

One must carefully design the whole system so that the gases can be recycled and re-injected in the tube, as needed. For example, a gas separator can be coupled to the pumping system. It would separate air and re-inject the recuperated gas. Concerning the previous example of hydrogen, there exist Air/hydrogen separators on the market, although today their practical applications are limited.

Novel methods of capturing the vacuum pump exhaust and separating out the smaller diameter gases through typical air separation units or other types of separation could be used to recycle the gas back into the tube and are also envisioned as part of the present invention.

Additionally, there are certain methods to introduce the gas into the tube that are preferred, such as to evacuate the tube and refill it partially with the preferred gas. Several repetitions of this pump and backfill can be done until the percentage of preferred gas or gas mixture is at the proper level. Such methods are also envisioned as part of the present invention.

Mixture homogeneity is another challenge. Homogeneity can be ensured by the uniformly spaced reservoirs of gas, or gas tanks. Homogeneity can also be ensured by the motion of the vehicle, possibly creating vortices and/or turbulence in their wake that mix the gases.

Lastly, the diffusion coefficient is a good indicator of the ability of a gas to mix into air. The diffusion coefficient of a gas in air is the capacity of a gas to homogenize in still air, without stirring or turbulence. FIG. 30, discussed previously, depicts a graph of the diffusion coefficients for various gas in air (source: Engineering Toolbox website). FIG. 30 shows that light-weight gases, such as helium and hydrogen, have much higher diffusion coefficients in air than other gases. At ambient temperature, helium and hydrogen have a diffusion coefficient almost four times higher than methane or water vapor with hydrogen being slightly superior. This makes helium and hydrogen the best candidates to obtain and maintain a homogeneous mixture within the tubes.

Figure 52:
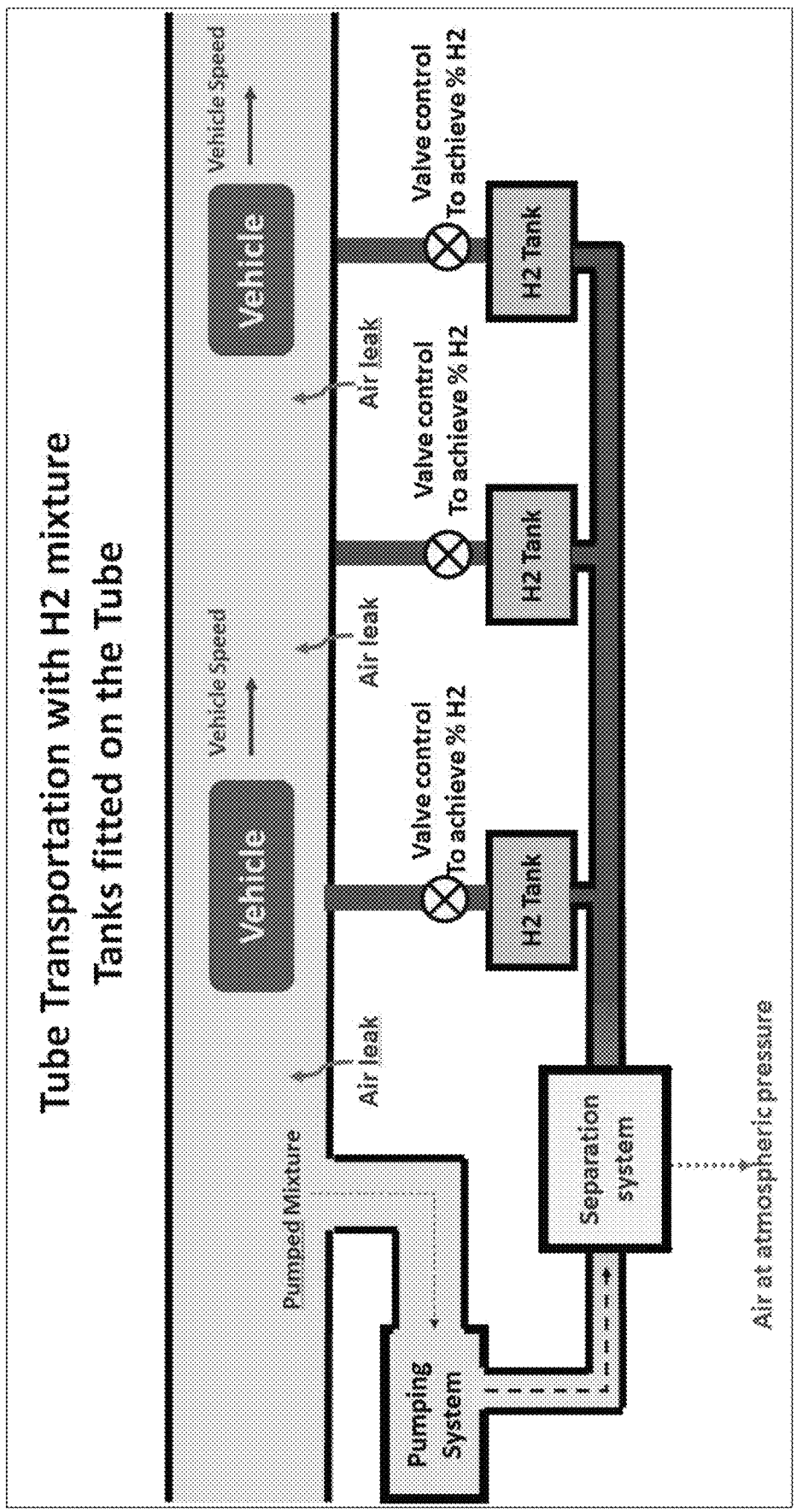
FIG. 52 depicts a first implementation that includes a set of hydrogen tanks uniformly fitted along the tube length, where hydrogen is injected with controlled valves that open or close to maintain the desired level of hydrogen.

Described below are two possible implementations of a tube with hydrogen/air mixture. FIG. 52 depicts a first implementation that includes a set of hydrogen tanks uniformly fitted along the tube length, where hydrogen is injected with controlled valves that open or close to maintain the desired level of hydrogen. The pumping system is linked to a separator system that removes air and re-injects hydrogen in the tank. For a system without losses, the hydrogen that left the tube because of the pump is constantly refilled in the tank.

Figure 53:
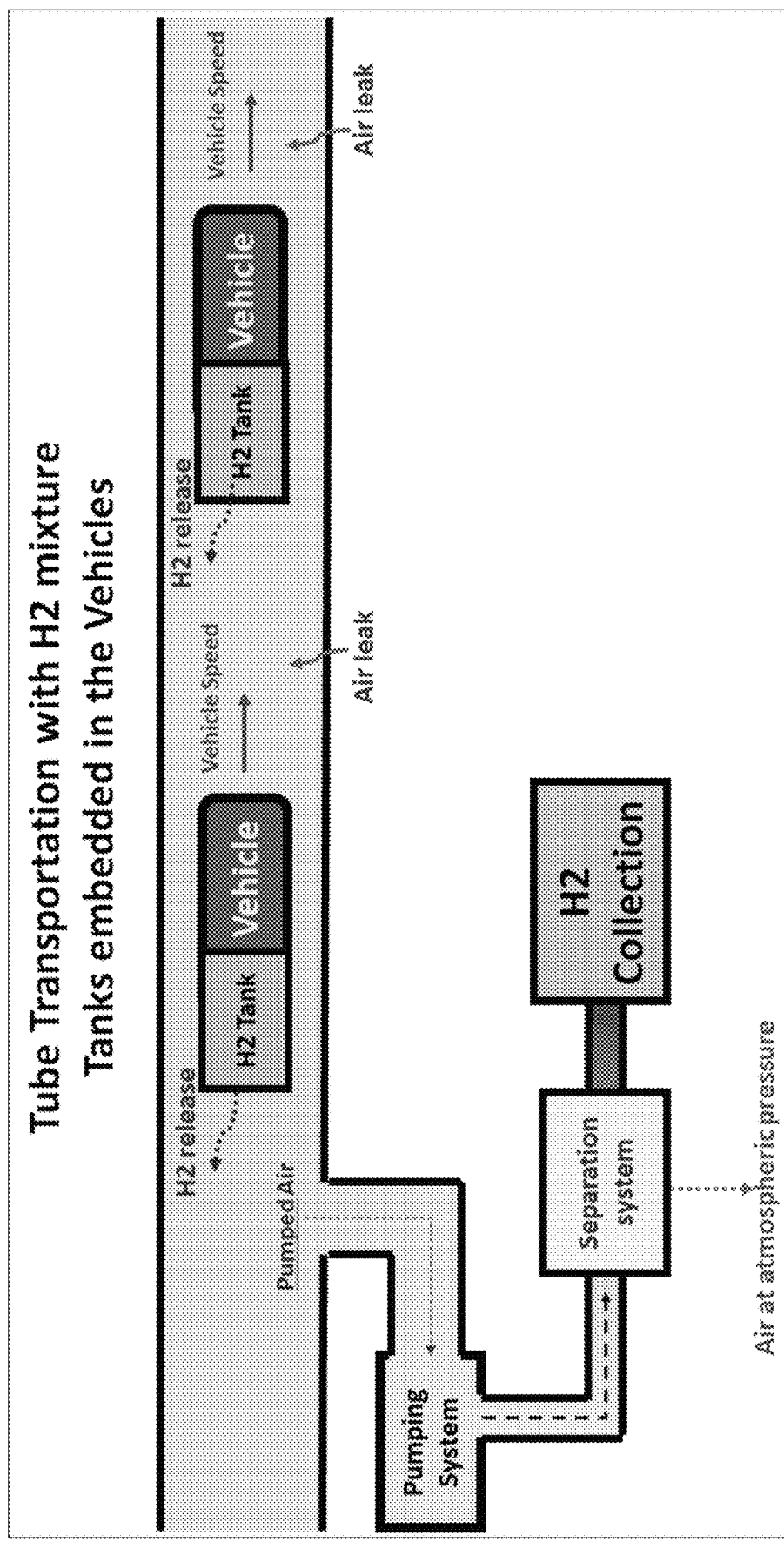
FIG. 53 depicts a second implementation that includes hydrogen tanks embedded in the vehicles.

FIG. 53 depicts a second implementation that includes hydrogen tanks embedded in the vehicles. The tanks open hydrogen release via command control. The hydrogen can be released in the wake of the vehicle, taking advantage of the vortices for good mixing. The hydrogen tank can be filled when vehicles are docked. Hydrogen is collected by the separation system integrated in the Pumping System.

Figure 54:
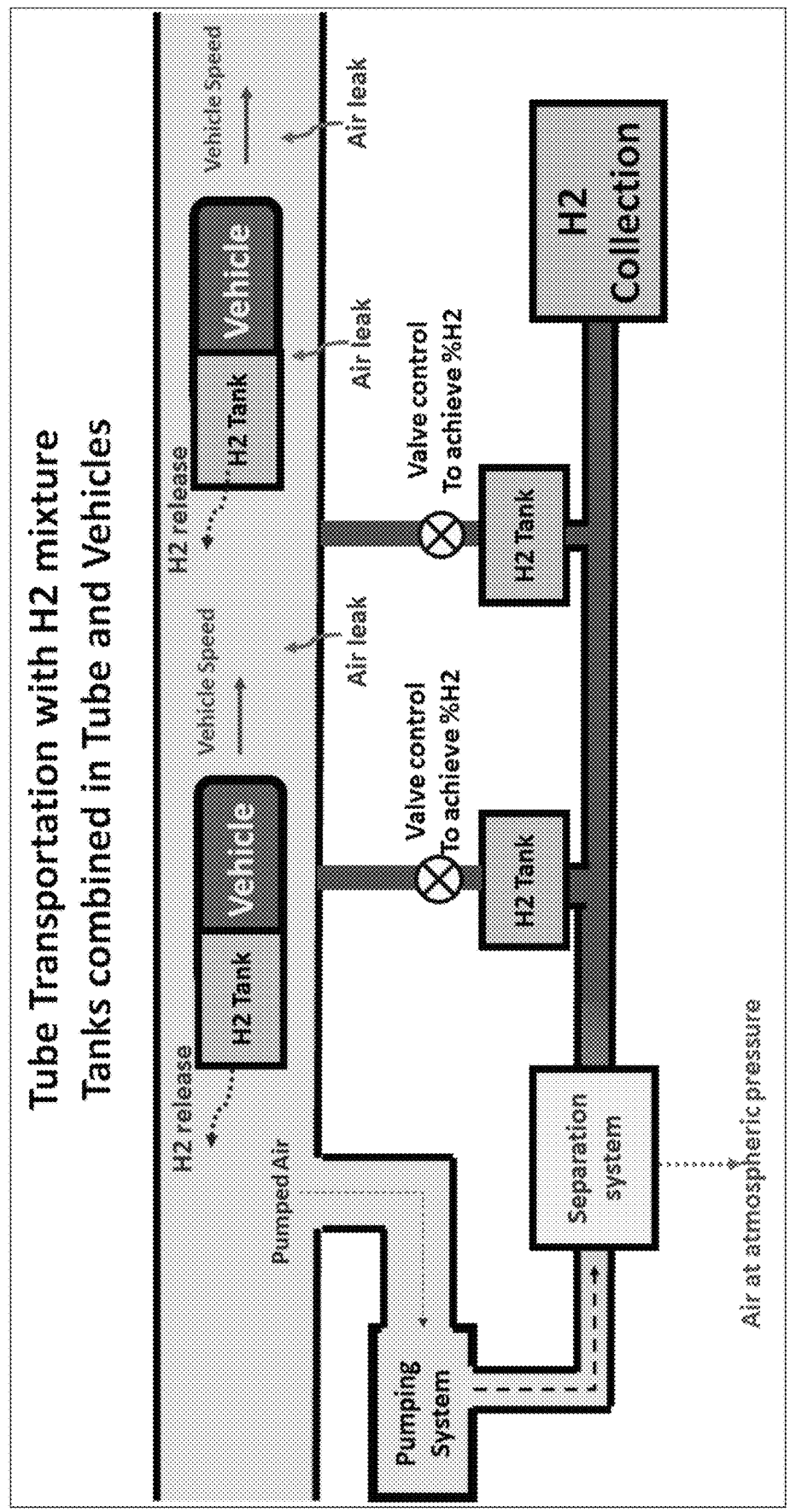
FIG. 54 depicts an approach that combines the approaches of FIGS. 52 and 53.

Since the present invention's approach is modular, it is possible to combine the first and the second implementations to get a third one with hydrogen tanks, both along the tube and in the vehicles. FIG. 54 depicts an approach that combines the approaches of FIGS. 52 and 53.

The embodiment depicted in FIG. 52 involves injection of the gases or mixtures directly into the tube via ports connected to mass flow controllers and valves, supplied by gas lines or compressed gas bottles, to precisely control the amounts of each gas introduced. The amount will be dependent on analysis of the gases within the tube and controlled by the Operations Control Center (OCC). The spacing of these injection points needs to be engineered. It may be that injecting H2 into the tube just in front of the moving capsule will aid the capsule aerodynamics. Injecting H2, such that its percentage is very high as the capsule approaches the injection point could aid in reducing shock waves and in reducing drag.

In one non-limiting example implementation, the present invention provides an injection system for injecting and maintaining a gaseous composition within a tube, where the gaseous composition comprising at least hydrogen and air and where the tube is a part of a tubular transportation system for transporting one or more passengers or one or more cargos via a capsule. The tube is arranged along at least one predetermined route and is pumped to a pressure that is below atmospheric pressure until the tube is substantially evacuated. In this non-limiting example, the system comprising: (a) at least one hydrogen gas source (e.g., one or more $H_2$ tanks shown in FIG. 52); (b) at least one injection nozzle to inject hydrogen (e.g., injected from one or more $H_2$ tanks shown in FIG. 52) into the tube; (c) a valve connecting the at least one hydrogen gas source to the at least one injection nozzle (see one or more valves connected to the $H_2$ tanks in FIG. 52); (d) at least one sensor (not shown but could be disposed anywhere within the tube) monitoring hydrogen concentration within the tube; (e) a controller (not shown) controlling the valve to release hydrogen into the tube when the hydrogen concentration is below a predetermined hydrogen concentration, and wherein the predetermined hydrogen concentration is picked based on a predetermined power value and a leak rate associated with the tube.

In another non-limiting example, the system comprises: (a) at least one hydrogen gas source (e.g., one or more H2 tanks shown in FIG. 52); (b) at least one injection nozzle to inject hydrogen into the tube (e.g., injected from one or more H2 tanks shown in FIG. 52); (c) a valve connecting the at least one hydrogen gas source to the at least one injection nozzle (see one or more valves connected to the H2 tanks in FIG. 52); (d) at least one sensor (not shown but could be disposed anywhere within the tube) monitoring hydrogen concentration within the tube; (e) a controller (not shown) communicating with a remote operations command center (OCC) and reporting the hydrogen concentration within the tube as measured by the at least one sensor and, when the hydrogen concentration is below a predetermined hydrogen concentration, receiving at least one instruction from the OCC which, upon execution by the controller, controls the valve to release hydrogen into the tube to raise the hydrogen concentration in the tube to the predetermined hydrogen concentration, and wherein the predetermined hydrogen concentration is picked based on a predetermined power value and a leak rate associated with the tube.

The embodiment depicted in FIG. 53, i.e., capsule body injection, uses, in one embodiment, compressed gas bottles inside the capsule to inject the gas or gas mixture in front, along the body, at the rear or a combination of points along the capsule. This design would more precisely inject the gases to areas most susceptible to drag and shock around the capsule.

In yet another non-limiting example, the present invention's comprises: (a) a source of hydrogen gas located on board the capsule (e.g., $H_2$ Tank shown in FIG. 53 located onboard the vehicle); (b) an injection nozzle (which releases hydrogen in the depicted $H_2$ tanks) to inject hydrogen from the source into the tube (release into the tube noted as "$H_2$ release" in FIG. 53); and (c) a controller (not shown) on board the capsule controlling a release of hydrogen into the tube when a detected hydrogen concentration within the tube is below a predetermined hydrogen concentration, the detected hydrogen concentration in the tube determined via at least one sensor (not shown but could be disposed anywhere within the tube in FIG. 53) located within the tube and reported to a remote operations command center (OCC), wherein the OCC communicates with the controller on board the capsule and, when the detected hydrogen concentration within the tube is below the predetermined hydrogen concentration, receives at least one instruction from the OCC which, upon execution by the controller on board the capsule, controls the release of hydrogen from the source of hydrogen located on board the capsule into the tube to raise the hydrogen concentration in the tube.

The embodiment depicted in FIG. 54 combines the teachings of the embodiments depicted in FIG. 30 and FIG. 52.

Figure 55:
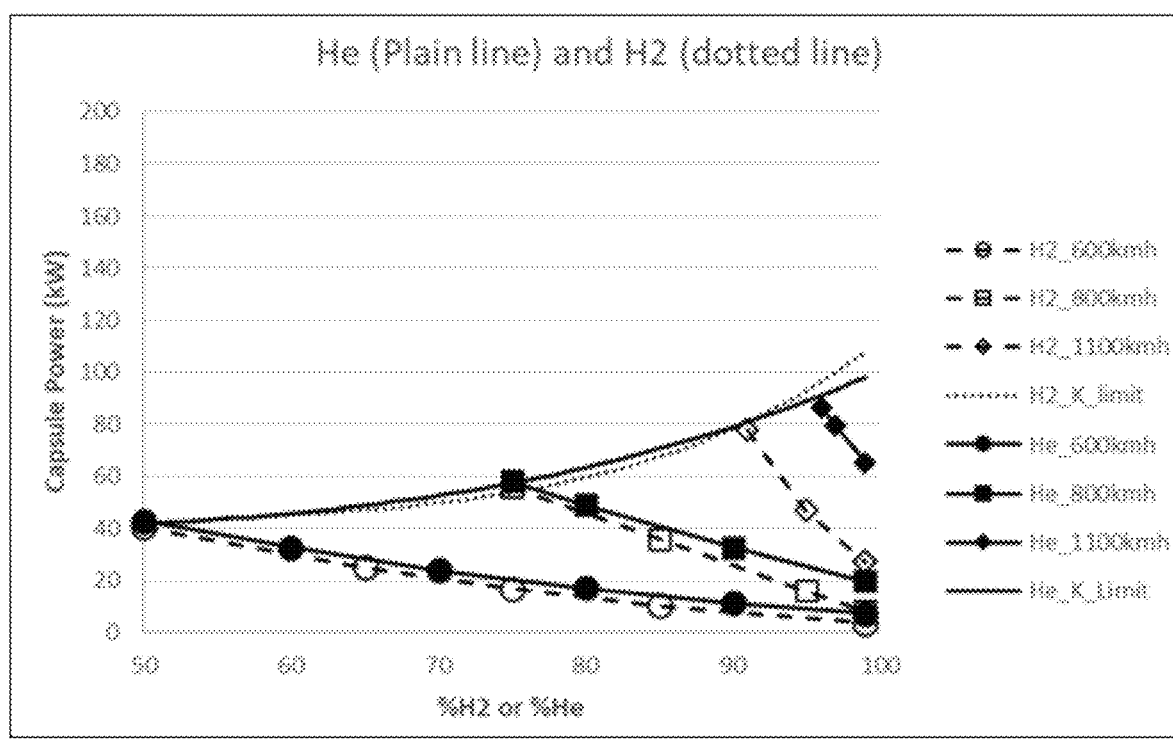
FIG. 55 depicts a comparison of H2 and He performance under same conditions.

FIG. 55 depicts a comparison of H2 and He performance under same conditions. Hereafter, it is demonstrated that H2 performs better than He regarding drag power thanks to lower density (reduction in drag) and higher speed of sound (choking limit attained at higher vehicle speed).

The science behind reducing hydrogen flammability has been researched versus pressures, ignition energy, temperature and different gas mixtures. It is thus evident that there is a history of research for improving hydrogen safety to acceptable commercial levels by applying new methods and processes to the novel enclosed hyperloop tube environment. The present disclosure address, albeit in a limited fashion, hydrogen flammability issues in the presence of air. The present invention envisions mitigating flammability risks by controlling the gaseous environment such that ignition cannot occur. For example, should the pressure within the tube be maintained within 100 pascals, flammability of H2 is not an issue.

Figure 56:
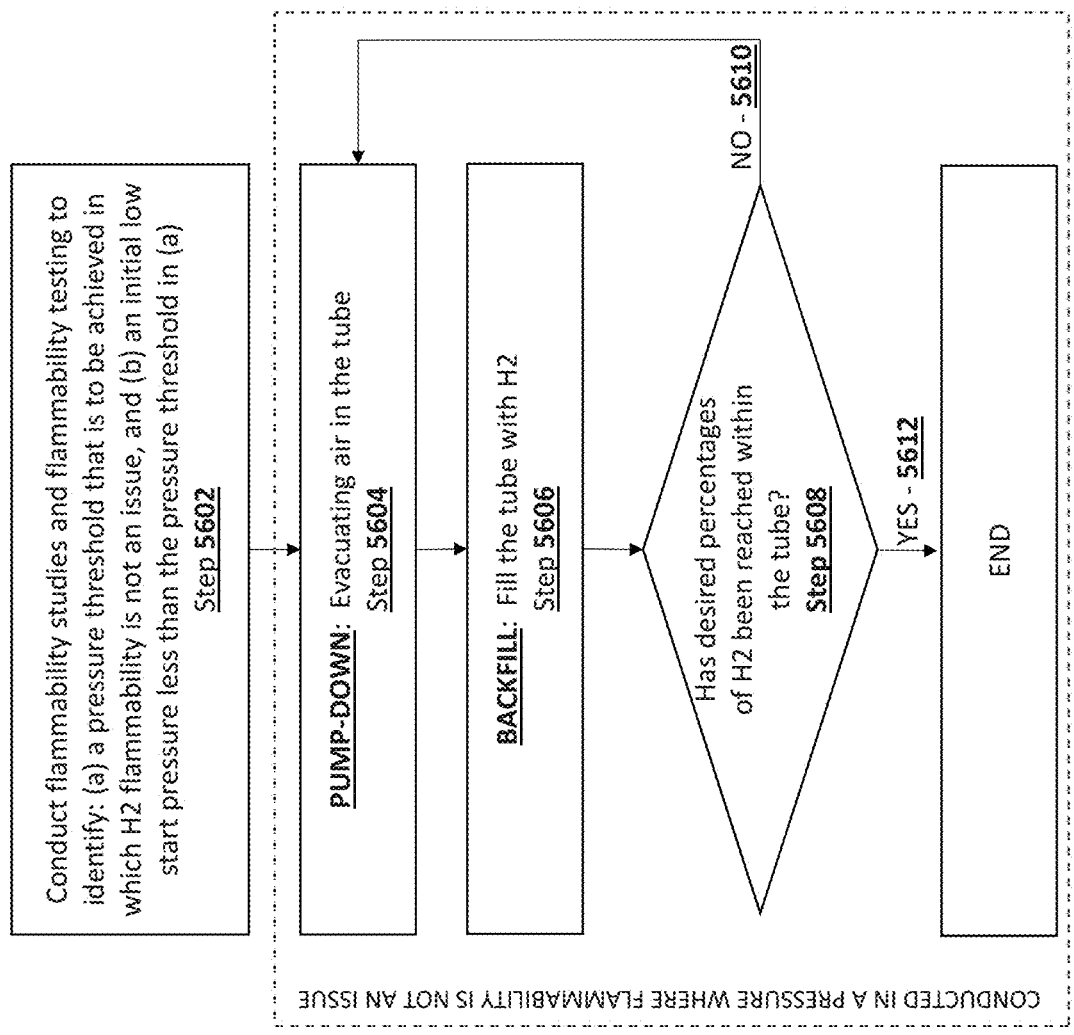
FIG. 56 depicts a pump-down and backfill mechanism that is used to avoid the flammability zone where the introduction of H2 could pose a problem.

As one non-limiting example, a pump-down and backfill mechanism may be used to avoid the flammability zone where H2 could pose a problem. Such a method is depicted in FIG. 56. In such a non-limiting example, flammability studies combined with flammability testing are first conducted (step 5602) to identify two pressures: (a) a pressure threshold that is to be achieved (e.g., 100 Pa) in which H2 flammability is not an issue, and (b) an initial low start pressure (e.g., 10 Pa) (the precise low start pressure may be defined by the efficiency of pumping and/or the pumping cost).

Next, a pump-down method (step 5604) is used to pump the tube down to lower pressure. For example, in the first pump-down, air in the tube is evacuated (using pumps) to achieve the initial start pressure, which is considerably less (e.g., 10 Pa) than the pressure threshold that is to be achieved (e.g., 100 Pa).

Next, a backfill mechanism (step 5606) is used to fill the tube with H2 (to keep increasing the % of H2 in the tube to a desired %), which increases the pressure (e.g., 60 Pa) from the initial start pressure (e.g., 10 Pa). The increase in pressure is monitored so that it does not go beyond a desired limit in the first iteration (e.g., 60 Pa). To combat this increase in pressure, another pump-down mechanism is initiated to pump the pressure back down (e.g., 40 Pa). Following this pump-down mechanism, another backfill mechanism may be initiated to fill the tube with more H2 which, again, increases the pressure.

The pump-down and backfill mechanisms described herein are iteratively executed such that the pressure is kept below the pressure threshold while also achieving a desired H2 percentage in the tube (e.g., 90% H2 and 10% air). A check is performed (step 5608) to see if the desired H2 percentage has been reached, and if so (step 5612), the method ends. If the check (step 5608) indicates the desired level of H2 has not been reached (step 5610), the method repeats the pump-down (step 5604) and backfill (step 5606) until the desired percentage is achieved. Because steps 5604, 5606, 5608 are done while the pressure is maintained in a region where flammability is not an issue, no harmful effects of H2 are encountered.

During a large breach or fast repressurization, the pressure of the tube rises rapidly. Because the pressure rises rapidly, the flammability region is crossed rapidly, where flammability is not an issue.

During a small breach or slow repressurization, there are two scenarios—one where the pumps can handle the pressure increase (and pump out the air) and one where pumps cannot handle the pressure increase where the pumps cannot keep the pressure increase outside of flammability range. A pressure sensor is able to detect such a small breach or slow repressurization, and when the pumps cannot handle the pressure increase, a fast pressurization process is used to rapidly rise the pressure, whereby the flammability region is crossed rapidly, where flammability is not an issue.

Since the pressure maintained within the tube is very low, the mass of H2 in the tube is low as well. Therefore, even under flammability conditions, the energy released by the small amount of H2 is very minimal and will be absorbed by the walls of the tube.

Another method of reducing hydrogen flammability is by adding to the hydrogen-air mixture an amount of a retardant gas. Certain gases, one non-exclusive example such as Helium, acts to reduce the flammability of Hydrogen at low pressures. Although diluting the hydrogen-air mixture with such retardant gasses will reduce the maximum speed, its ability to improve the safety may make it a commercially superior mixture. Safety in a hydrogen atmosphere is paramount to attain wide commercial acceptance and thus there will be some optimum hydrogen-air-helium mix which, although may not be optimal in reducing power, is preferred over a simple hydrogen-air mixture due to the increase in safety that it provides.

Finally, a comparison of H2 and He performance under same conditions is provided below. Hereafter, it is demonstrated that H2 performs better than He regarding drag power thanks to lower density (reduction in drag) and higher speed of sound (choking limit attained at higher vehicle speed).

FIG. 55 shows Drag Power vs Light Gas Concentration at a tube pressure of 100 Pa for a set of speeds (600 kph, 800 kph, 1100 kph). The figure shows curves for both H2 and He and allows to compare the performance of these gases at similar conditions (pressure, velocity, concentration). The figure shows that, at the same concentration and capsule speed, H2 has a lower drag power than He. Hence, H2 performs better than He from the drag point of view. This conclusion holds for all speeds studied (600 kph, 700 kph, 800 kph, 1000 kph, 1100 kph), which are not all shown in the figure for the sake of clarity.

Moreover, it is clear that hydrogen becomes remarkably beneficial at high speed, above 800 kph, and high percentages, above 85%. As an example, at a speed of 1100 kph and a concentration of 95%, H2 has a drag power about 50% (or 40 kW) lower than that of He. At the same speed and a percentage 99%, H2 has a drag power about 60% lower than He. Note also that H2 can achieve a speed of 1100 kph at lower percentages (90%) without the choking problem, while He can only achieve that speed for percentage higher than 96%.

This demonstrates that, especially at high speed and high percentages, H2 has significant advantage over He. Note that these conclusions hold for all ranges of pressures studied (1 Pa, 10 Pa, 100 Pa, 1000 Pa), which are not illustrated for brevity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems and processes can be implemented using hardware components, software components, and/or combinations thereof.

For example, the feature of maintaining within each tube (in a plurality of substantially evacuated tubes) particular percentages of hydrogen and air can be implemented in software process where a processor (or controller) executes instructions to control mechanisms, such as valves, to release specific percentages of hydrogen or release specific percentages of hydrogen and air. Also, as another example, the feature of picking a percentage hydrogen based on a predetermined power value and a leak rate associated with each tube can be implemented in software process where a processor (or controller) executes instructions stored in storage to identify such a percentage of hydrogen. As another example, the feature of picking a percentage hydrogen based on a predetermined power value that is a function of both pump power and power to overcome drag and a leak rate associated with each tube can be implemented in software process where a processor (or controller) executes instructions stored in storage to identify such a percentage of hydrogen. As yet another example, the feature of picking a percentage hydrogen based on a predetermined power value, a desired speed of the capsule, and a leak rate associated with each tube can be implemented in software process where a processor (or controller) executes instructions stored in storage to identify such a percentage of hydrogen. One of skill in the art will see that many other features described above may be implemented using hardware, software, or a combination of both.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a controller, a programmable logic controller, just to name a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

Furthermore, it is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

CONCLUSION

A system and method has been shown in the above embodiments for the effective implementation of tube transportation systems using a gaseous mixture of air and hydrogen. While various preferred embodiments have been shown and described, it will be understood that there is no intent to limit the invention by such disclosure, but rather, it is intended to cover all modifications and alternate constructions falling within the spirit and scope of the invention, as defined in the appended claims.

The invention claimed is:

1. A tubular transportation system for transporting one or more passengers or one or more cargos via a capsule along a predetermined route, the tubular transportation system comprising:
    a plurality of substantially evacuated tubes arranged along the predetermined route, each tube in the plurality of substantially evacuated tubes maintained at a pressure that is below atmospheric pressure;
    means for maintaining within each tube in the plurality of substantially evacuated tubes, a gaseous composition comprising a mixture of a first percentage, x, of hydrogen and a second percentage, (100-x), of air, and
    wherein the first percentage, x, of hydrogen is picked based on a predetermined power value and a leak rate associated with each tube.

2. The system of claim 1, wherein the predetermined power value is any of the following: affordable power, minimum power, or acceptable power.

3. The system of claim 1, wherein the predetermined power value is a function of a first power to pump each tube to the substantially evacuated state and a second power to overcome aerodynamic drag.

4. The system of claim 1, wherein the pressure is picked from the following range: 1 Pa to 100 Pa.

5. The system of claim 1, wherein $50\% \leq x \leq 99\%$.

6. The system of claim 1, wherein either hydrogen or a combination of hydrogen and air in the gaseous composition is injected into at least one tube through a wall associated with the at least one tube.

7. The system of claim 1, wherein either hydrogen or a combination of hydrogen and air in the gaseous composition is injected into at least one tube by the capsule.

8. The system of claim 1, wherein either hydrogen or a combination of hydrogen and air in the gaseous composition is injected into at least one tube through a wall associated with the at least one tube and either hydrogen or a combination of hydrogen and air in the gaseous composition is injected into the at least one tube from the capsule.

9. The system of claim 1, wherein each of the tubes in the system further comprises a recirculation mechanism for capturing the gaseous composition in each tube and recirculating some of those gases back into the same tube.

10. The system of claim 9, wherein the recirculation mechanism further comprises at least a separation unit, concentrating the gases prior to recirculating them back into the tube.

11. The system of claim 1, wherein a pump down and backfill mechanism is used such that required gas concentrations is efficiently achieved.

12. A tubular transportation system for transporting one or more passengers or one or more cargos via a capsule along a predetermined route, the tubular transportation system comprising:
    a plurality of substantially evacuated tubes arranged along the predetermined route, each tube in the plurality of substantially evacuated tubes maintained at a pressure that is below atmospheric pressure;
    means for maintaining within each tube in the plurality of substantially evacuated tubes, a gaseous composition comprising a mixture of a first percentage, x, of hydrogen and a second percentage, (100-x), of air; and
    wherein the first percentage, x, of hydrogen is picked based on a predetermined power value and a leak rate associated with each tube, wherein the predetermined power value is a function of a first power to pump each tube to the substantially evacuated state and a second power to overcome aerodynamic drag.

13. The system of claim 12, wherein the predetermined power value is any of the following: affordable power, minimum power, or acceptable power.

14. The system of claim 12, wherein the pressure is picked from the following range: 1 Pa to 100 Pa.

15. The system of claim 12, wherein $50\% \leq x \leq 99\%$.

16. The system of claim 12, wherein either hydrogen or a combination of hydrogen and air in the gaseous composition is injected into at least one tube through a wall associated with the at least one tube.

17. The system of claim 12, wherein either hydrogen or a combination of hydrogen and air in the gaseous composition is injected into at least one tube by the capsule.

18. The system of claim 12, wherein either hydrogen or a combination of hydrogen and air in the gaseous composition is injected into at least one tube through a wall associated with the at least one tube and either hydrogen or a combination of hydrogen and air in the gaseous composition is injected into the at least one tube from the capsule.

19. The system of claim 12, wherein each of the tubes in the system further comprises a recirculation mechanism for capturing the gaseous composition in each tube and recirculating some of those gases back into the same tube.

20. The system of claim 19, wherein the recirculation mechanism further comprises at least a separation unit, concentrating the gases prior to recirculating them back into the tube.

21. A tubular transportation system for transporting one or more passengers or one or more cargos via a capsule along a predetermined route, the tubular transportation system comprising:
    a plurality of substantially evacuated tubes arranged along the predetermined route, each tube in the plurality of substantially evacuated tubes maintained at a pressure that is below atmospheric pressure;
    means for maintaining within each tube in the plurality of substantially evacuated tubes, a gaseous composition comprising a mixture of a first percentage, x, of hydrogen and a second percentage, (100-x), of air, and
    wherein the first percentage, x, of hydrogen is picked based on a predetermined power value, a desired speed of the capsule, and a leak rate associated with each tube.

22. The system of claim 21, wherein the predetermined power value is any of the following: affordable power, minimum power, or acceptable power.

23. The system of claim 21, wherein the predetermined power value is a function of a first power to pump each tube to the substantially evacuated state and a second power to overcome aerodynamic drag.

24. The system of claim 21, wherein the pressure is picked from the following range: 1 Pa to 100 Pa.

25. The system of claim 21, wherein $50\% \leq x \leq 99\%$.

26. The system of claim 21, wherein either hydrogen or a combination of hydrogen and air in the gaseous composition is injected into at least one tube through a wall associated with the at least one tube.

27. The system of claim 21, wherein either hydrogen or a combination of hydrogen and air in the gaseous composition is injected into at least one tube by the capsule.

28. The system of claim 21, wherein either hydrogen or a combination of hydrogen and air in the gaseous composition is injected into at least one tube through a wall associated with the at least one tube and either hydrogen or a combination of hydrogen and air in the gaseous composition is injected into the at least one tube from the capsule.

29. The system of claim 21, wherein each of the tubes in the system further comprises a recirculation mechanism for capturing the gaseous composition in each tube and recirculating some of those gases back into the same tube.

30. The system of claim 29, wherein the recirculation mechanism further comprises at least a separation unit, concentrating the gases prior to recirculating them back into the tube.

\* \* \* \* \*

UNITED STATES PATENT AND TRADEMARK OFFICE
CERTIFICATE OF CORRECTION

PATENT NO. : 11,235,787 B2
APPLICATION NO. : 16/456711
DATED : February 1, 2022
INVENTOR(S) : Alexandre Neophytou et al.

It is certified that error appears in the above-identified patent and that said Letters Patent is hereby corrected as shown below:

In the Specification

Column 2, Line 22, delete "$D=C_D\ ½\ P_{tube}V_{pod}{}^2S_{pod}$" and insert therefore -- $D = C_D\ \frac{1}{2}\ \rho_{tube}V^2_{pod}S_{pod}$ --.

Column 2, Line 26, delete "$V_{pod}{}^2$" and insert therefore -- $V^2_{pod}$ --.

Column 13, Line 54, delete "$D=C_D\ ½\ P_{tube}V_{pod}{}^2S_{pod}$" and insert therefore -- $D = C_D\ \frac{1}{2}\ \rho_{tube}V^2_{pod}S_{pod}$ --.

Column 13, Line 58, delete "½ $P_{tube}V_{pod}{}^2S_{pod}$" and insert therefore -- ½ $P_{tube}V^2_{pod}S_{pod}$ --.

Column 14, Line 9, delete "½ $P_{tube}V_{pod}{}^2S_{pod}$" and insert therefore -- ½ $P_{tube}V^2_{pod}S_{pod}$ --.

Column 29, Line 29, delete "$D=C_D\ 1/2\ P_{tube}\ V_{pod}{}^2\ S_{pod}$" and insert therefore -- D = CD 1/2 $P_{tube}V^2_{pod}S_{pod}$ --.

Column 29, Line 33, delete "1/2 $P_{tube}V_{pod}{}^2S_{pod}$" and insert therefore -- 1/2 $P_{tube}V^2_{pod}S_{pod}$ --.

Column 29, Line 51, delete "1/2 $P_{tube}V_{pod}{}^2S_{pod}$" and insert therefore -- 1/2 $P_{tube}V^2_{pod}S_{pod}$ --.

Signed and Sealed this
Thirtieth Day of May, 2023

Katherine Kelly Vidal
*Director of the United States Patent and Trademark Office*